(12) United States Patent
Sasaki

(10) Patent No.: US 7,483,574 B2
(45) Date of Patent: Jan. 27, 2009

(54) IMAGE PROCESSING APPARATUS, IMAGE TRANSMISSION APPARATUS, IMAGE RECEPTION APPARATUS, AND IMAGE PROCESSING METHOD

(75) Inventor: Daigo Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 780 days.

(21) Appl. No.: 10/488,748

(22) PCT Filed: Sep. 11, 2002

(86) PCT No.: PCT/JP02/09272

§ 371 (c)(1),
(2), (4) Date: Mar. 9, 2004

(87) PCT Pub. No.: WO03/025897

PCT Pub. Date: Mar. 27, 2003

(65) Prior Publication Data

US 2004/0252891 A1 Dec. 16, 2004

(30) Foreign Application Priority Data

Sep. 14, 2001 (JP) ............................. 2001-280646
Jul. 15, 2002 (JP) ............................. 2002-206186

(51) Int. Cl.
*G06K 9/36* (2006.01)
(52) U.S. Cl. .................................... 382/232
(58) Field of Classification Search ................. 382/232
See application file for complete search history.

(56) References Cited

U.S. PATENT DOCUMENTS 4,888,645 A * 12/1989 Mitchell et al. ............. 382/235
5,125,045 A * 6/1992 Murakami et al. .......... 382/270
5,222,159 A * 6/1993 Kawamura et al. ......... 382/283
5,553,200 A * 9/1996 Accad ........................ 358/1.9

(Continued)

FOREIGN PATENT DOCUMENTS

EP 0 766 223 A2 4/1997

(Continued)

OTHER PUBLICATIONS

Japanese Office Action dated Aug. 9, 2005, with partial English translation.

(Continued)

*Primary Examiner*—Samir A Ahmed
*Assistant Examiner*—Michael Vanchy, Jr.
(74) *Attorney, Agent, or Firm*—McGinn IP Law Group, PLLC

(57) ABSTRACT

To provide an image processing apparatus and an image transmission apparatus capable of image display as excellent as a normal raster image even when the memory capacity is reduced in a display having a built-in memory, and an image processing method.

The image processing apparatus of the present invention performs multi-valued dither processing at an image processing former stage 4 when a raster image 1 is input to a memory 2, and the raster image output from the memory 2 is subjected to reverse processing to the multi-valued dither processing in an image processing latter stage 5. With this construction, it is possible to obtain a display apparatus capable of suppressing a grainy feeling and pseudo colors, thereby realizing high quality images.

51 Claims, 47 Drawing Sheets

U.S. PATENT DOCUMENTS

| | | | | |
|---|---|---|---|---|
| 5,600,764 | A * | 2/1997 | Kakutani | 345/591 |
| 5,699,079 | A * | 12/1997 | Gossett | 345/605 |
| 5,828,788 | A * | 10/1998 | Chiang et al. | 382/239 |
| 5,894,300 | A | 4/1999 | Takizawa | |
| 6,026,196 | A * | 2/2000 | Shannon et al. | 382/237 |
| 6,137,589 | A * | 10/2000 | Obrador et al. | 358/1.16 |
| 6,272,257 | B1 * | 8/2001 | Prokop | 382/246 |
| 6,289,138 | B1 * | 9/2001 | Yip et al. | 382/307 |
| 6,928,461 | B2 * | 8/2005 | Tuli | 709/203 |
| 2002/0012453 | A1 * | 1/2002 | Hashimoto et al. | 382/112 |
| 2002/0057446 | A1 * | 5/2002 | Long et al. | 358/1.13 |
| 2002/0064313 | A1 * | 5/2002 | Cheng | 382/239 |

FOREIGN PATENT DOCUMENTS

| | | |
|---|---|---|
| EP | 0 775 983 A2 | 5/1997 |
| JP | 57-174983 | 10/1982 |
| JP | 63-146567 | 6/1988 |
| JP | 2-8493 | 2/1990 |
| JP | 6-149223 | 5/1994 |
| JP | 9-97043 | 4/1997 |
| JP | 10-26965 | 1/1998 |
| JP | 10-506767 | 6/1998 |
| JP | 10-207425 | 8/1998 |
| JP | 2000-206951 | 7/2000 |
| JP | 2001-28749 | 1/2001 |
| JP | 2001-103374 | 4/2001 |
| WO | WO 96/27261 | 9/1996 |

OTHER PUBLICATIONS

Japanese Office Action dated Nov. 15, 2005, with partial English translation.

International Preliminary Examination Report dated Jun. 24, 2004, w/copies of translation for PCT/JP02/09272.

* cited by examiner

FIG.3

| Input Signal | Output Value of Threshold Value Generator / Signal Stored in Memory | | | | Output Signal (Present Invention) | | | | Average Value | Standard Deviation | Output Signal (Prior Art) | | | | Average Value | Standard Deviation |
|---|---|---|---|---|---|---|---|---|---|---|---|---|---|---|---|---|
| | 0 | 1 | 2 | 3 | 0 | 1 | 2 | 3 | | | 0 | 1 | 2 | 3 | | |
| 0 | 0 | 0 | 0 | 0 | 0 | 1 | 2 | 3 | 1.50 | 1.12 | 0 | 0 | 0 | 0 | 0.00 | 0.00 |
| 1 | 0 | 0 | 0 | 0 | 0 | 1 | 2 | 3 | 1.50 | 1.12 | 0 | 0 | 0 | 0 | 0.00 | 0.00 |
| 2 | 0 | 0 | 0 | 0 | 0 | 1 | 2 | 3 | 1.50 | 1.12 | 0 | 0 | 0 | 0 | 0.00 | 0.00 |
| 3 | 0 | 0 | 0 | 0 | 0 | 1 | 2 | 3 | 1.50 | 1.12 | 0 | 0 | 0 | 0 | 0.00 | 0.00 |
| 4 | 1 | 0 | 0 | 0 | 6 | 1 | 2 | 3 | 3.00 | 1.87 | 4 | 0 | 0 | 0 | 1.00 | 1.73 |
| 5 | 1 | 1 | 0 | 0 | 6 | 7 | 2 | 3 | 4.50 | 2.06 | 4 | 4 | 0 | 0 | 2.00 | 2.00 |
| 6 | 1 | 1 | 1 | 0 | 6 | 7 | 8 | 3 | 6.00 | 1.87 | 4 | 4 | 4 | 0 | 3.00 | 1.73 |
| 7 | 1 | 1 | 1 | 1 | 6 | 7 | 8 | 9 | 7.50 | 1.12 | 4 | 4 | 4 | 4 | 4.00 | 0.00 |
| 8 | 2 | 1 | 1 | 1 | 10 | 7 | 8 | 9 | 8.50 | 1.12 | 8 | 4 | 4 | 4 | 5.00 | 1.73 |
| 9 | 2 | 2 | 1 | 1 | 10 | 11 | 8 | 9 | 9.50 | 1.12 | 8 | 8 | 4 | 4 | 6.00 | 2.00 |
| 10 | 2 | 2 | 2 | 1 | 10 | 11 | 12 | 9 | 10.50 | 1.12 | 8 | 8 | 8 | 4 | 7.00 | 1.73 |
| 11 | 2 | 2 | 2 | 2 | 10 | 11 | 12 | 13 | 11.50 | 1.12 | 8 | 8 | 8 | 8 | 8.00 | 0.00 |
| 12 | 3 | 2 | 2 | 2 | 14 | 11 | 12 | 13 | 12.50 | 1.12 | 12 | 8 | 8 | 8 | 9.00 | 1.73 |
| 13 | 3 | 3 | 2 | 2 | 14 | 15 | 12 | 13 | 13.50 | 1.12 | 12 | 12 | 8 | 8 | 10.00 | 2.00 |
| 14 | 3 | 3 | 3 | 2 | 14 | 15 | 16 | 13 | 14.50 | 1.12 | 12 | 12 | 12 | 8 | 11.00 | 1.73 |
| 15 | 3 | 3 | 3 | 3 | 14 | 15 | 16 | 17 | 15.50 | 1.12 | 12 | 12 | 12 | 12 | 12.00 | 0.00 |
| 16 | 4 | 3 | 3 | 3 | 18 | 15 | 16 | 17 | 16.50 | 1.12 | 16 | 12 | 12 | 12 | 13.00 | 1.73 |
| 17 | 4 | 4 | 3 | 3 | 18 | 19 | 16 | 17 | 17.50 | 1.12 | 16 | 16 | 12 | 12 | 14.00 | 2.00 |
| 18 | 4 | 4 | 4 | 3 | 18 | 19 | 20 | 17 | 18.50 | 1.12 | 16 | 16 | 16 | 12 | 15.00 | 1.73 |
| 19 | 4 | 4 | 4 | 4 | 18 | 19 | 20 | 21 | 19.50 | 1.12 | 16 | 16 | 16 | 16 | 16.00 | 0.00 |
| 20 | 5 | 4 | 4 | 4 | 22 | 19 | 20 | 21 | 20.50 | 1.12 | 21 | 16 | 16 | 16 | 17.25 | 2.17 |
| 21 | 5 | 5 | 4 | 4 | 22 | 23 | 20 | 21 | 21.50 | 1.12 | 21 | 21 | 16 | 16 | 18.50 | 2.50 |

← Average Value − Input Signal Value →

FIG.4

| Input Signal | Signal Stored in Memory | | | | Output Signal (Present Invention) | | | | Average Value | Standard Deviation | Output Signal (Prior Art) | | | | Average Value | Standard Deviation |
|---|---|---|---|---|---|---|---|---|---|---|---|---|---|---|---|---|
| 22 | 5 | 5 | 5 | 4 | 22 | 22 | 23 | 24 | 22.50 | 1.12 | 21 | 21 | 21 | 16 | 19.75 | 2.17 |
| 23 | 5 | 5 | 5 | 5 | 22 | 22 | 23 | 24 | 22.50 | 1.12 | 21 | 21 | 21 | 21 | 21.00 | 0.00 |
| 24 | 6 | 5 | 5 | 5 | 26 | 22 | 23 | 24 | 23.50 | 1.12 | 21 | 21 | 21 | 21 | 21.00 | 0.00 |
| 25 | 6 | 6 | 5 | 5 | 26 | 26 | 23 | 24 | 24.50 | 1.12 | 25 | 21 | 21 | 21 | 22.00 | 1.73 |
| 26 | 6 | 6 | 6 | 5 | 26 | 26 | 27 | 24 | 25.50 | 1.12 | 25 | 25 | 21 | 21 | 23.00 | 2.00 |
| 27 | 6 | 6 | 6 | 6 | 26 | 26 | 27 | 28 | 26.50 | 1.12 | 25 | 25 | 25 | 21 | 24.00 | 1.73 |
| 28 | 7 | 6 | 6 | 6 | 30 | 26 | 27 | 28 | 27.50 | 1.12 | 25 | 25 | 25 | 25 | 25.00 | 0.00 |
| 29 | 7 | 7 | 6 | 6 | 30 | 30 | 27 | 28 | 28.50 | 1.12 | 29 | 25 | 25 | 25 | 26.00 | 1.73 |
| 30 | 7 | 7 | 7 | 6 | 30 | 30 | 31 | 28 | 29.50 | 1.12 | 29 | 29 | 25 | 25 | 27.00 | 2.00 |
| 31 | 7 | 7 | 7 | 7 | 30 | 30 | 31 | 32 | 30.50 | 1.12 | 29 | 29 | 29 | 25 | 28.00 | 1.73 |
| 32 | 8 | 7 | 7 | 7 | 34 | 30 | 31 | 32 | 31.50 | 1.12 | 29 | 29 | 29 | 29 | 29.00 | 0.00 |
| 33 | 8 | 8 | 7 | 7 | 34 | 34 | 31 | 32 | 32.50 | 1.12 | 33 | 29 | 29 | 29 | 30.00 | 1.73 |
| 34 | 8 | 8 | 8 | 7 | 34 | 34 | 35 | 32 | 33.50 | 1.12 | 33 | 33 | 29 | 29 | 31.00 | 2.00 |
| 35 | 8 | 8 | 8 | 8 | 34 | 34 | 35 | 36 | 34.50 | 1.12 | 33 | 33 | 33 | 29 | 32.00 | 1.73 |
| 36 | 9 | 8 | 8 | 8 | 38 | 34 | 35 | 36 | 35.50 | 1.12 | 33 | 33 | 33 | 33 | 33.00 | 0.00 |
| 37 | 9 | 9 | 8 | 8 | 38 | 38 | 35 | 36 | 36.50 | 1.12 | 37 | 33 | 33 | 33 | 34.00 | 1.73 |
| 38 | 9 | 9 | 9 | 8 | 38 | 38 | 39 | 36 | 37.50 | 1.12 | 37 | 37 | 33 | 33 | 35.00 | 2.00 |
| 39 | 9 | 9 | 9 | 9 | 38 | 38 | 39 | 40 | 38.50 | 1.12 | 37 | 37 | 37 | 33 | 36.00 | 1.73 |
| 40 | 10 | 9 | 9 | 9 | 42 | 38 | 39 | 40 | 39.50 | 1.12 | 37 | 37 | 37 | 37 | 37.00 | 0.00 |
| 41 | 10 | 10 | 9 | 9 | 42 | 42 | 39 | 40 | 40.50 | 1.12 | 42 | 37 | 37 | 37 | 38.25 | 2.17 |
| 42 | 10 | 10 | 10 | 9 | 42 | 42 | 43 | 40 | 41.50 | 1.12 | 42 | 42 | 37 | 37 | 39.50 | 2.50 |
| 42 | 10 | 10 | 10 | 9 | 42 | 42 | 43 | 44 | 42.50 | 1.12 | 42 | 42 | 42 | 37 | 40.75 | 2.17 |

FIG.5

| INPUT SIGNAL | OUTPUT VALUE OF THRESHOLD VALUE GENERATOR — SIGNAL STORED IN MEMORY | | | | OUTPUT SIGNAL (PRESENT INVENTION) | | | | AVERAGE VALUE | STANDARD DEVIATION | OUTPUT SIGNAL (PRIOR ART) | | | | AVERAGE VALUE | STANDARD DEVIATION |
|---|---|---|---|---|---|---|---|---|---|---|---|---|---|---|---|---|
| 43 | 10 | 10 | 10 | 10 | 42 | 43 | 44 | 45 | 43.50 | 1.12 | 42 | 42 | 42 | 42 | 42.00 | 0.00 |
| 44 | 11 | 10 | 10 | 10 | 46 | 43 | 44 | 45 | 44.50 | 1.12 | 46 | 42 | 42 | 42 | 43.00 | 1.73 |
| 45 | 11 | 11 | 10 | 10 | 46 | 47 | 44 | 45 | 45.50 | 1.12 | 46 | 46 | 42 | 42 | 44.00 | 2.00 |
| 46 | 11 | 11 | 11 | 10 | 46 | 47 | 48 | 45 | 46.50 | 1.12 | 46 | 46 | 46 | 42 | 45.00 | 1.73 |
| 47 | 11 | 11 | 11 | 11 | 46 | 47 | 48 | 49 | 47.50 | 1.12 | 46 | 46 | 46 | 46 | 46.00 | 0.00 |
| 48 | 12 | 11 | 11 | 11 | 50 | 47 | 48 | 49 | 48.50 | 1.12 | 50 | 46 | 46 | 46 | 47.00 | 1.73 |
| 49 | 12 | 12 | 11 | 11 | 50 | 51 | 48 | 49 | 49.50 | 1.12 | 50 | 50 | 46 | 46 | 48.00 | 2.00 |
| 50 | 12 | 12 | 12 | 11 | 50 | 51 | 52 | 49 | 50.50 | 1.12 | 50 | 50 | 50 | 46 | 49.00 | 1.73 |
| 51 | 12 | 12 | 12 | 12 | 50 | 51 | 52 | 53 | 51.50 | 1.12 | 50 | 50 | 50 | 50 | 50.00 | 0.00 |
| 52 | 13 | 12 | 12 | 12 | 54 | 51 | 52 | 53 | 52.50 | 1.12 | 54 | 50 | 50 | 50 | 51.00 | 1.73 |
| 53 | 13 | 13 | 12 | 12 | 54 | 55 | 52 | 53 | 53.50 | 1.12 | 54 | 54 | 50 | 50 | 52.00 | 2.00 |
| 54 | 13 | 13 | 13 | 12 | 54 | 55 | 56 | 53 | 54.50 | 1.12 | 54 | 54 | 54 | 50 | 53.00 | 1.73 |
| 55 | 13 | 13 | 13 | 13 | 54 | 55 | 56 | 57 | 55.50 | 1.12 | 54 | 54 | 54 | 54 | 54.00 | 0.00 |
| 56 | 14 | 13 | 13 | 13 | 58 | 55 | 56 | 57 | 56.50 | 1.12 | 58 | 54 | 54 | 54 | 55.00 | 1.73 |
| 57 | 14 | 14 | 13 | 13 | 58 | 59 | 56 | 57 | 57.50 | 1.12 | 58 | 58 | 54 | 54 | 56.00 | 2.00 |
| 58 | 14 | 14 | 14 | 13 | 58 | 59 | 60 | 57 | 58.50 | 1.12 | 58 | 58 | 58 | 54 | 57.00 | 1.73 |
| 59 | 14 | 14 | 14 | 14 | 58 | 59 | 60 | 61 | 59.50 | 1.12 | 58 | 58 | 58 | 58 | 58.00 | 0.00 |
| 60 | 15 | 14 | 14 | 14 | 62 | 59 | 60 | 61 | 60.50 | 1.12 | 63 | 58 | 58 | 58 | 59.25 | 2.17 |
| 61 | 15 | 15 | 14 | 14 | 62 | 63 | 60 | 61 | 61.50 | 1.12 | 63 | 63 | 58 | 58 | 60.50 | 2.50 |
| 62 | 15 | 15 | 15 | 14 | 62 | 63 | 63 | 61 | 62.25 | 0.83 | 63 | 63 | 63 | 58 | 61.75 | 2.17 |
| 63 | 15 | 15 | 15 | 15 | 62 | 63 | 63 | 63 | 62.75 | 0.43 | 63 | 63 | 63 | 63 | 63.00 | 0.00 |

AVERAGE VALUE − INPUT SIGNAL VALUE:
0.5, 0.5, 0.5, 0.5, 0.5, 0.5, 0.5, 0.5, 0.5, 0.5, 0.5, 0.5, 0.5, 0.5, 0.5, 0.5, 0.5, 0.5, 0.5, 0.25, −0.25

AVERAGE VALUE − INPUT SIGNAL VALUE (PRIOR ART):
−1.00, −1.00, −1.00, −1.00, −1.00, −1.00, −1.00, −1.00, −1.00, −1.00, −1.00, −1.00, −1.00, −1.00, −1.00, −1.00, −1.00, −0.75, −0.50, −0.25, 0.00

FIG.8

| x mod 2 | y mod 2 | OUTPUT VALUE |
|---------|---------|--------------|
| 0 | 0 | 0 0 |
| 0 | 1 | 1 0 |
| 1 | 0 | 1 1 |
| 1 | 1 | 0 1 |

F I G. 9
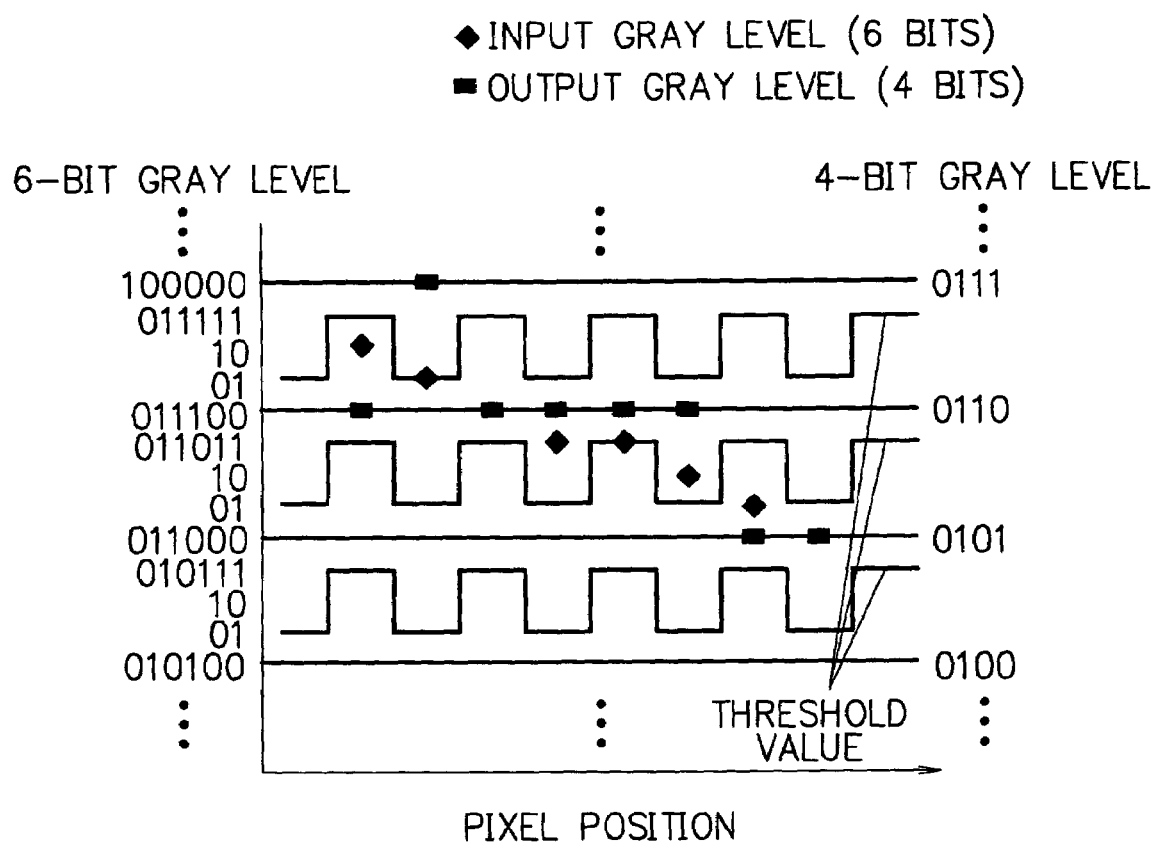

F I G. 11
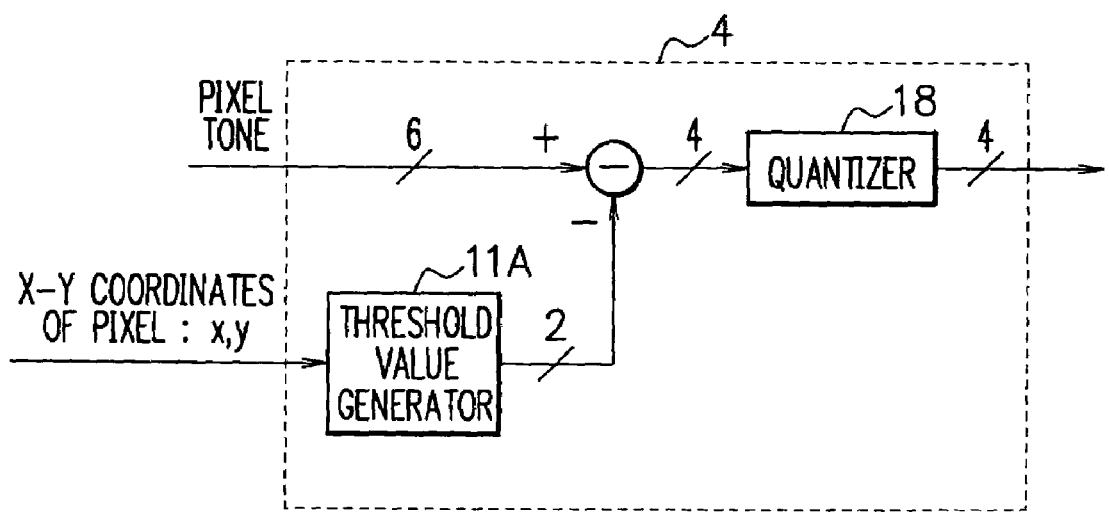

F I G. 15
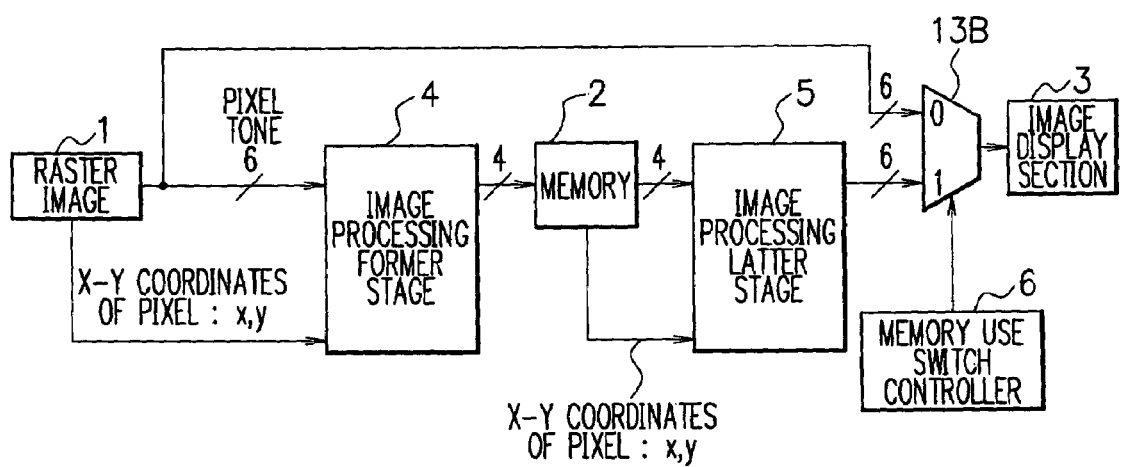

F I G. 16
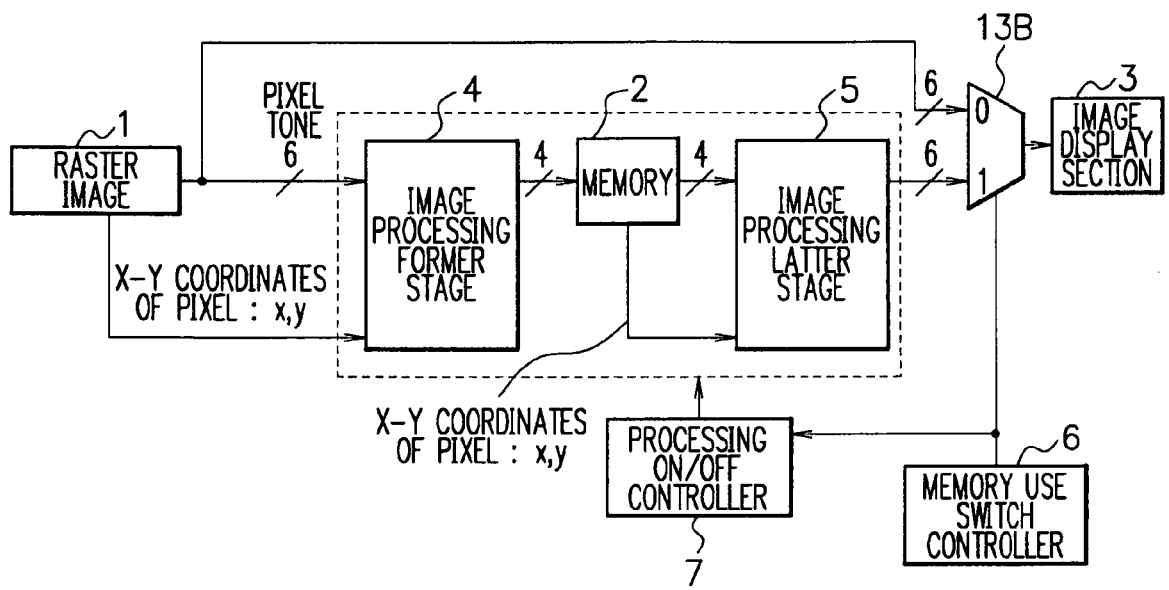

F I G. 18
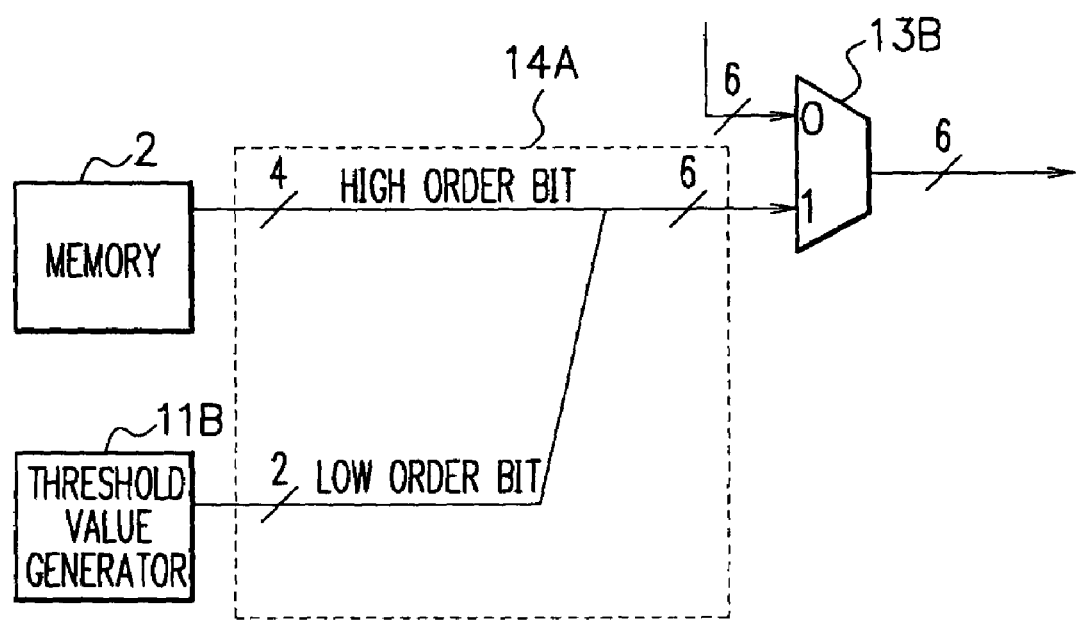

FIG.19

| INPUT SIGNAL | SIGNAL STORED IN MEMORY | | | | OUTPUT SIGNAL | | | | OUTPUT VALUE OF THRESHOLD VALUE GENERATOR |
|---|---|---|---|---|---|---|---|---|---|
| | 0 | 1 | 2 | 3 | 0 | 1 | 2 | 3 | 3 |
| 0 | 0 | 0 | 0 | 0 | 0 | 1 | 2 | 3 | |
| 1 | 0 | 0 | 0 | 0 | 0 | 1 | 2 | 3 | |
| 2 | 0 | 0 | 0 | 0 | 0 | 1 | 2 | 3 | |
| 3 | 0 | 0 | 0 | 0 | 0 | 1 | 2 | 3 | |
| 4 | 1 | 0 | 0 | 0 | 4 | 1 | 2 | 3 | |
| 5 | 1 | 1 | 0 | 0 | 4 | 5 | 2 | 3 | |
| 6 | 1 | 1 | 1 | 0 | 4 | 5 | 6 | 3 | |
| 7 | 1 | 1 | 1 | 1 | 4 | 5 | 6 | 7 | |
| 8 | 2 | 1 | 1 | 1 | 8 | 5 | 6 | 7 | |
| 9 | 2 | 2 | 1 | 1 | 8 | 9 | 6 | 7 | |
| 10 | 2 | 2 | 2 | 1 | 8 | 9 | 10 | 7 | |
| 11 | 2 | 2 | 2 | 2 | 8 | 9 | 10 | 11 | |
| 12 | 3 | 2 | 2 | 2 | 12 | 9 | 10 | 11 | |
| 13 | 3 | 3 | 2 | 2 | 12 | 13 | 10 | 11 | |
| 14 | 3 | 3 | 3 | 2 | 12 | 13 | 14 | 11 | |
| 15 | 3 | 3 | 3 | 3 | 12 | 13 | 14 | 15 | |
| 16 | 4 | 3 | 3 | 3 | 16 | 13 | 14 | 15 | |
| 17 | 4 | 4 | 3 | 3 | 16 | 17 | 14 | 15 | |
| 18 | 4 | 4 | 4 | 3 | 16 | 17 | 18 | 15 | |
| 19 | 4 | 4 | 4 | 4 | 16 | 17 | 18 | 19 | |
| 20 | 5 | 4 | 4 | 4 | 20 | 17 | 18 | 19 | |
| 21 | 5 | 5 | 4 | 4 | 20 | 21 | 18 | 19 | |

FIG.21

| INPUT SIGNAL | SIGNAL STORED IN MEMORY | | | | OUTPUT SIGNAL | | | | OUTPUT VALUE OF THRESHOLD VALUE GENERATOR |
|---|---|---|---|---|---|---|---|---|---|
| 43 | 10 | | | | 40 | | | | 43 |
| 44 | 11 | 10 | 10 | 10 | 44 | 41 | 42 | 43 | |
| 45 | 11 | 11 | 10 | 10 | 44 | 41 | 42 | 43 | |
| 46 | 11 | 11 | 11 | 10 | 44 | 45 | 42 | 43 | |
| 47 | 11 | 11 | 11 | 11 | 44 | 45 | 46 | 43 | |
| 48 | 12 | 12 | 11 | 11 | 48 | 45 | 46 | 47 | |
| 49 | 12 | 12 | 12 | 11 | 48 | 49 | 46 | 47 | |
| 50 | 12 | 12 | 12 | 12 | 48 | 49 | 50 | 47 | |
| 51 | 12 | 13 | 12 | 12 | 48 | 49 | 50 | 51 | |
| 52 | 13 | 13 | 13 | 12 | 52 | 49 | 50 | 51 | |
| 53 | 13 | 13 | 13 | 13 | 52 | 53 | 50 | 51 | |
| 54 | 13 | 13 | 13 | 13 | 52 | 53 | 54 | 51 | |
| 55 | 14 | 14 | 14 | 13 | 52 | 53 | 54 | 55 | |
| 56 | 14 | 14 | 14 | 14 | 56 | 53 | 54 | 55 | |
| 57 | 14 | 14 | 14 | 14 | 56 | 57 | 54 | 55 | |
| 58 | 14 | 14 | 14 | 14 | 56 | 57 | 58 | 55 | |
| 59 | 15 | 15 | 15 | 14 | 56 | 57 | 58 | 59 | |
| 60 | 15 | 15 | 15 | 15 | 60 | 57 | 58 | 59 | |
| 61 | 15 | 15 | 15 | 15 | 60 | 61 | 58 | 59 | |
| 62 | 15 | 15 | 15 | 15 | 60 | 61 | 62 | 59 | |
| 63 | 15 | | | | 60 | 61 | 62 | 63 | |

F I G. 22
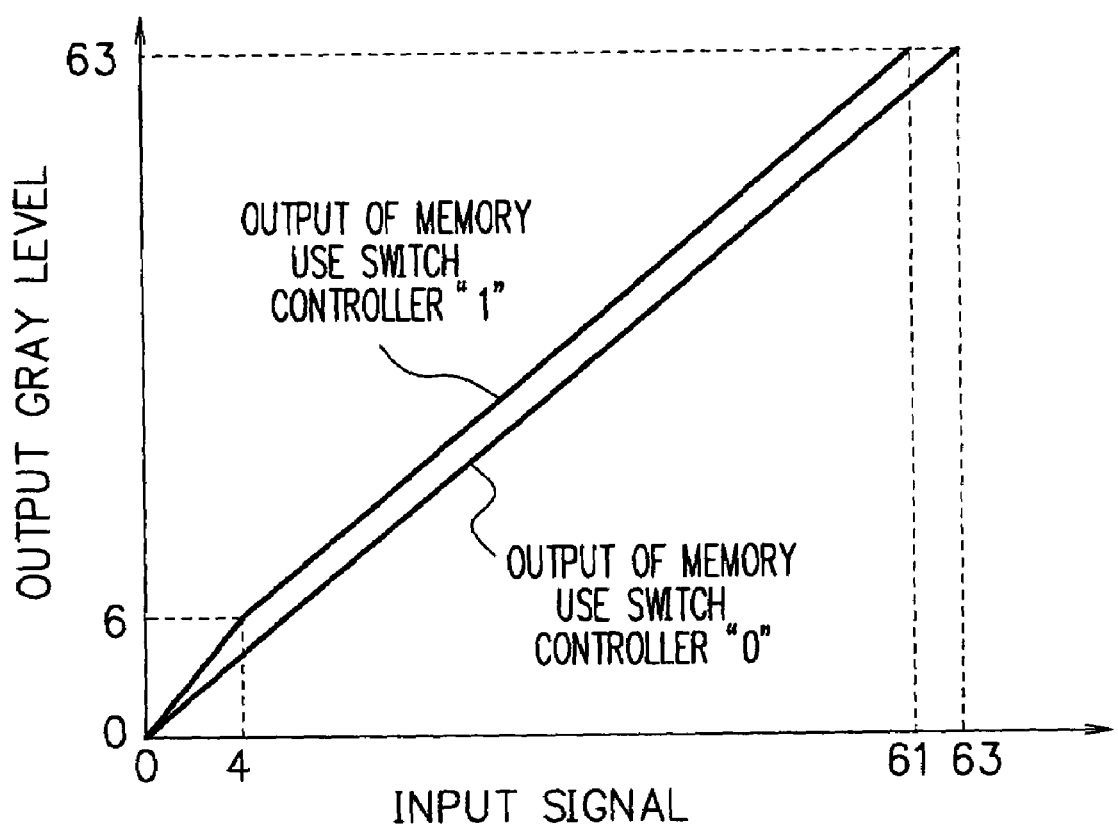

FIG.24

| INPUT SIGNAL | SIGNAL STORED IN MEMORY | | | | | | | | OUTPUT SIGNAL (PRESENT INVENTION) | | | | | | | | AVERAGE VALUE | STANDARD DEVIATION | OUTPUT SIGNAL (PRIOR ART) | | | | | | | | AVERAGE VALUE | STANDARD DEVIATION |
|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 0 | 1 | 2 | 3 | 4 | 5 | 6 | 7 | | | 0 | 1 | 2 | 3 | 4 | 5 | 6 | 7 | | |
| 0 | 0 | 0 | 0 | 0 | 0 | 0 | 0 | 0 | 0 | 1 | 2 | 3 | 4 | 5 | 6 | 7 | 3.50 | 2.29 | 0 | 0 | 0 | 0 | 0 | 0 | 0 | 0 | 0.00 | 0.00 |
| 1 | 0 | 0 | 0 | 0 | 0 | 0 | 0 | 0 | 0 | 1 | 2 | 3 | 4 | 5 | 6 | 7 | 3.50 | 2.29 | 0 | 0 | 0 | 0 | 0 | 0 | 0 | 0 | 0.00 | 0.00 |
| 2 | 0 | 0 | 0 | 0 | 0 | 0 | 0 | 0 | 0 | 1 | 2 | 3 | 4 | 5 | 6 | 7 | 3.50 | 2.29 | 0 | 0 | 0 | 0 | 0 | 0 | 0 | 0 | 0.00 | -1.00 |
| 3 | 0 | 0 | 0 | 0 | 0 | 0 | 0 | 0 | 0 | 1 | 2 | 3 | 4 | 5 | 6 | 7 | 3.50 | 2.29 | 0 | 0 | 0 | 0 | 0 | 0 | 0 | 0 | 0.00 | -2.00 |
| 4 | 0 | 0 | 0 | 0 | 0 | 0 | 0 | 0 | 0 | 1 | 2 | 3 | 4 | 5 | 6 | 7 | 3.50 | 2.29 | 0 | 0 | 0 | 0 | 0 | 0 | 0 | 0 | 0.00 | -3.00 |
| 5 | 0 | 0 | 0 | 0 | 0 | 0 | 0 | 0 | 0 | 1 | 2 | 3 | 4 | 5 | 6 | 7 | 3.50 | 2.29 | 0 | 0 | 0 | 0 | 0 | 0 | 0 | 0 | 0.00 | -4.00 |
| 6 | 0 | 0 | 0 | 0 | 0 | 0 | 0 | 0 | 0 | 1 | 2 | 3 | 4 | 5 | 6 | 7 | 3.50 | 2.29 | 0 | 0 | 0 | 0 | 0 | 0 | 0 | 0 | 0.00 | -5.00 |
| 7 | 0 | 0 | 0 | 0 | 0 | 0 | 0 | 0 | 0 | 1 | 2 | 3 | 4 | 5 | 6 | 7 | 3.50 | 2.29 | 0 | 0 | 0 | 0 | 0 | 0 | 0 | 0 | 0.00 | -6.00 |
| 8 | 1 | 0 | 0 | 0 | 0 | 0 | 0 | 0 | 12 | 1 | 2 | 3 | 4 | 5 | 6 | 7 | 5.00 | 3.24 | 0 | 0 | 0 | 0 | 0 | 0 | 0 | 0 | 0.00 | -7.00 |
| 9 | 1 | 1 | 0 | 0 | 0 | 0 | 0 | 0 | 12 | 13 | 2 | 3 | 4 | 5 | 6 | 7 | 6.50 | 3.77 | 9 | 0 | 0 | 0 | 0 | 0 | 0 | 0 | 1.13 | -6.88 |
| 10 | 1 | 1 | 1 | 0 | 0 | 0 | 0 | 0 | 12 | 13 | 14 | 3 | 4 | 5 | 6 | 7 | 8.00 | 4.06 | 9 | 9 | 0 | 0 | 0 | 0 | 0 | 0 | 2.25 | -6.75 |
| 11 | 1 | 1 | 1 | 1 | 0 | 0 | 0 | 0 | 12 | 13 | 14 | 15 | 4 | 5 | 6 | 7 | 9.50 | 4.15 | 9 | 9 | 9 | 0 | 0 | 0 | 0 | 0 | 3.38 | -6.63 |
| 12 | 1 | 1 | 1 | 1 | 1 | 0 | 0 | 0 | 12 | 13 | 14 | 15 | 16 | 5 | 6 | 7 | 11.00 | 4.06 | 9 | 9 | 9 | 9 | 0 | 0 | 0 | 0 | 4.50 | -6.50 |
| 13 | 1 | 1 | 1 | 1 | 1 | 1 | 0 | 0 | 12 | 13 | 14 | 15 | 16 | 17 | 6 | 7 | 12.50 | 3.77 | 9 | 9 | 9 | 9 | 9 | 0 | 0 | 0 | 5.63 | -6.37 |
| 14 | 1 | 1 | 1 | 1 | 1 | 1 | 1 | 0 | 12 | 13 | 14 | 15 | 16 | 17 | 18 | 7 | 14.00 | 3.24 | 9 | 9 | 9 | 9 | 9 | 9 | 0 | 0 | 6.75 | -6.25 |
| 15 | 1 | 1 | 1 | 1 | 1 | 1 | 1 | 1 | 12 | 13 | 14 | 15 | 16 | 17 | 18 | 19 | 15.50 | 2.29 | 9 | 9 | 9 | 9 | 9 | 9 | 9 | 0 | 7.88 | -6.13 |
| 16 | 2 | 1 | 1 | 1 | 1 | 1 | 1 | 1 | 20 | 13 | 14 | 15 | 16 | 17 | 18 | 19 | 16.50 | 2.29 | 18 | 9 | 9 | 9 | 9 | 9 | 9 | 9 | 9.00 | -6.00 |
| 17 | 2 | 2 | 1 | 1 | 1 | 1 | 1 | 1 | 20 | 21 | 14 | 15 | 16 | 17 | 18 | 19 | 17.50 | 2.29 | 18 | 18 | 9 | 9 | 9 | 9 | 9 | 9 | 10.13 | -5.88 |
| 18 | 2 | 2 | 2 | 1 | 1 | 1 | 1 | 1 | 20 | 21 | 22 | 15 | 16 | 17 | 18 | 19 | 18.50 | 2.29 | 18 | 18 | 18 | 9 | 9 | 9 | 9 | 9 | 11.25 | -5.75 |
| 19 | 2 | 2 | 2 | 2 | 1 | 1 | 1 | 1 | 20 | 21 | 22 | 23 | 16 | 17 | 18 | 19 | 19.50 | 2.29 | 18 | 18 | 18 | 18 | 9 | 9 | 9 | 9 | 12.38 | -5.63 |
| 20 | 2 | 2 | 2 | 2 | 2 | 1 | 1 | 1 | 20 | 21 | 22 | 23 | 24 | 17 | 18 | 19 | 20.50 | 2.29 | 18 | 18 | 18 | 18 | 18 | 9 | 9 | 9 | 13.50 | -5.50 |
| 21 | 2 | 2 | 2 | 2 | 2 | 2 | 1 | 1 | 20 | 21 | 22 | 23 | 24 | 25 | 18 | 19 | 21.50 | 2.29 | 18 | 18 | 18 | 18 | 18 | 18 | 9 | 9 | 14.63 | -5.38 |

FIG.25

| INPUT SIGNAL | OUTPUT VALUE OF THRESHOLD VALUE GENERATOR | | | | | | OUTPUT SIGNAL (PRESENT INVENTION) | | | | | | | | | AVERAGE VALUE | STANDARD DEVIATION | OUTPUT SIGNAL (PRIOR ART) | | | | | | | | | AVERAGE VALUE | STANDARD DEVIATION |
|---|---|---|---|---|---|---|---|---|---|---|---|---|---|---|---|---|---|---|---|---|---|---|---|---|---|---|---|---|
| | SIGNAL STORED IN MEMORY | | | | | | | | | | | | | | | | | | | | | | | | | | | |
| 22 | 2 | 2 | 2 | 2 | 2 | 1 | 20 | 21 | 22 | 23 | 24 | 25 | 26 | 19 | 22.50 | 2.29 | 18 | 18 | 18 | 18 | 18 | 18 | 18 | 9 | 16.88 | 2.98 | -5.13 |
| 23 | 2 | 2 | 2 | 2 | 2 | 2 | 20 | 21 | 22 | 23 | 24 | 25 | 26 | 27 | 23.50 | 2.29 | 18 | 18 | 18 | 18 | 18 | 18 | 18 | 18 | 18.00 | 0.00 | -5.00 |
| 24 | 3 | 2 | 2 | 2 | 2 | 2 | 28 | 21 | 22 | 23 | 24 | 25 | 26 | 27 | 24.50 | 2.29 | 27 | 18 | 18 | 18 | 18 | 18 | 18 | 18 | 19.13 | 2.98 | -4.88 |
| 25 | 3 | 3 | 2 | 2 | 2 | 2 | 28 | 29 | 22 | 23 | 24 | 25 | 26 | 27 | 25.50 | 2.29 | 27 | 27 | 18 | 18 | 18 | 18 | 18 | 18 | 20.25 | 3.90 | -4.75 |
| 26 | 3 | 3 | 3 | 2 | 2 | 2 | 28 | 29 | 30 | 23 | 24 | 25 | 26 | 27 | 26.50 | 2.29 | 27 | 27 | 27 | 18 | 18 | 18 | 18 | 18 | 21.38 | 4.35 | -4.63 |
| 27 | 3 | 3 | 3 | 3 | 2 | 2 | 28 | 29 | 30 | 31 | 24 | 25 | 26 | 27 | 27.50 | 2.29 | 27 | 27 | 27 | 27 | 18 | 18 | 18 | 18 | 22.50 | 4.50 | -4.50 |
| 28 | 3 | 3 | 3 | 3 | 3 | 2 | 28 | 29 | 30 | 31 | 32 | 25 | 26 | 27 | 28.50 | 2.29 | 27 | 27 | 27 | 27 | 27 | 18 | 18 | 18 | 23.63 | 4.35 | -4.38 |
| 29 | 3 | 3 | 3 | 3 | 3 | 3 | 28 | 29 | 30 | 31 | 32 | 33 | 26 | 27 | 29.50 | 2.29 | 27 | 27 | 27 | 27 | 27 | 27 | 18 | 18 | 24.75 | 3.90 | -4.25 |
| 30 | 3 | 3 | 3 | 3 | 3 | 3 | 28 | 29 | 30 | 31 | 32 | 33 | 34 | 27 | 30.50 | 2.29 | 27 | 27 | 27 | 27 | 27 | 27 | 27 | 18 | 25.88 | 2.98 | -4.13 |
| 31 | 3 | 3 | 3 | 3 | 3 | 3 | 36 | 29 | 30 | 31 | 32 | 33 | 34 | 35 | 31.50 | 2.29 | 27 | 27 | 27 | 27 | 27 | 27 | 27 | 27 | 27.00 | 0.00 | -4.00 |
| 32 | 4 | 3 | 3 | 3 | 3 | 3 | 36 | 37 | 30 | 31 | 32 | 33 | 34 | 35 | 32.50 | 2.29 | 36 | 27 | 27 | 27 | 27 | 27 | 27 | 27 | 28.13 | 2.98 | -3.88 |
| 33 | 4 | 4 | 3 | 3 | 3 | 3 | 36 | 37 | 38 | 31 | 32 | 33 | 34 | 35 | 33.50 | 2.29 | 36 | 36 | 27 | 27 | 27 | 27 | 27 | 27 | 29.25 | 3.90 | -3.75 |
| 34 | 4 | 4 | 4 | 3 | 3 | 3 | 36 | 37 | 38 | 39 | 32 | 33 | 34 | 35 | 34.50 | 2.29 | 36 | 36 | 36 | 27 | 27 | 27 | 27 | 27 | 30.38 | 4.35 | -3.63 |
| 35 | 4 | 4 | 4 | 4 | 3 | 3 | 36 | 37 | 38 | 39 | 40 | 33 | 34 | 35 | 35.50 | 2.29 | 36 | 36 | 36 | 36 | 27 | 27 | 27 | 27 | 31.50 | 4.50 | -3.50 |
| 36 | 4 | 4 | 4 | 4 | 4 | 3 | 36 | 37 | 38 | 39 | 40 | 41 | 34 | 35 | 36.50 | 2.29 | 36 | 36 | 36 | 36 | 36 | 27 | 27 | 27 | 32.63 | 4.35 | -3.38 |
| 37 | 4 | 4 | 4 | 4 | 4 | 4 | 36 | 37 | 38 | 39 | 40 | 41 | 42 | 35 | 37.50 | 2.29 | 36 | 36 | 36 | 36 | 36 | 36 | 27 | 27 | 33.75 | 3.90 | -3.25 |
| 38 | 4 | 4 | 4 | 4 | 4 | 4 | 36 | 37 | 38 | 39 | 40 | 41 | 42 | 35 | 38.50 | 2.29 | 36 | 36 | 36 | 36 | 36 | 36 | 36 | 27 | 34.88 | 2.98 | -3.13 |
| 39 | 4 | 4 | 4 | 4 | 4 | 4 | 36 | 37 | 38 | 39 | 40 | 41 | 42 | 43 | 39.50 | 2.29 | 36 | 36 | 36 | 36 | 36 | 36 | 36 | 36 | 36.00 | 0.00 | -3.00 |
| 40 | 5 | 4 | 4 | 4 | 4 | 4 | 44 | 37 | 38 | 39 | 40 | 41 | 42 | 43 | 40.50 | 2.29 | 45 | 36 | 36 | 36 | 36 | 36 | 36 | 36 | 37.13 | 2.98 | -2.88 |
| 41 | 5 | 5 | 4 | 4 | 4 | 4 | 44 | 45 | 38 | 39 | 40 | 41 | 42 | 43 | 41.50 | 2.29 | 45 | 45 | 36 | 36 | 36 | 36 | 36 | 36 | 38.25 | 3.90 | -2.75 |
| 42 | 5 | 5 | 5 | 4 | 4 | 4 | 44 | 45 | 46 | 39 | 40 | 41 | 42 | 43 | 42.50 | 2.29 | 45 | 45 | 45 | 36 | 36 | 36 | 36 | 36 | 39.38 | 4.35 | -2.63 |

AVERAGE VALUE − INPUT SIGNAL VALUE

FIG.26

| INPUT SIGNAL | OUTPUT VALUE OF THRESHOLD VALUE GENERATOR (SIGNAL STORED IN MEMORY) | | | | | | | | | OUTPUT SIGNAL (PRESENT INVENTION) | | | | | | | | | AVERAGE VALUE | STANDARD DEVIATION | OUTPUT SIGNAL (PRIOR ART) | | | | | | | | | AVERAGE VALUE | STANDARD DEVIATION |
|---|---|---|---|---|---|---|---|---|---|---|---|---|---|---|---|---|---|---|---|---|---|---|---|---|---|---|---|---|---|---|---|
| 43 | 5 | 5 | 5 | 4 | 4 | 4 | 4 | 4 | 4 | 44 | 45 | 46 | 47 | 40 | 41 | 42 | 43 | 43 | 43.50 | 0.50 | 45 | 45 | 45 | 45 | 36 | 36 | 36 | 36 | 36 | 40.50 | 4.50 |
| 44 | 5 | 5 | 5 | 5 | 4 | 4 | 4 | 4 | 4 | 44 | 45 | 46 | 47 | 48 | 41 | 42 | 43 | 43 | 44.50 | 2.29 | 45 | 45 | 45 | 45 | 45 | 36 | 36 | 36 | 36 | 41.63 | 4.35 |
| 45 | 5 | 5 | 5 | 5 | 5 | 4 | 4 | 4 | 4 | 44 | 45 | 46 | 47 | 48 | 49 | 42 | 43 | 43 | 45.50 | 2.29 | 45 | 45 | 45 | 45 | 45 | 45 | 36 | 36 | 36 | 42.75 | 3.90 |
| 46 | 5 | 5 | 5 | 5 | 5 | 5 | 4 | 4 | 4 | 44 | 45 | 46 | 47 | 48 | 49 | 50 | 43 | 43 | 46.50 | 2.29 | 45 | 45 | 45 | 45 | 45 | 45 | 45 | 36 | 36 | 43.88 | 2.98 |
| 47 | 5 | 5 | 5 | 5 | 5 | 5 | 5 | 4 | 4 | 44 | 45 | 46 | 47 | 48 | 49 | 50 | 51 | 43 | 47.50 | 2.29 | 45 | 45 | 45 | 45 | 45 | 45 | 45 | 45 | 36 | 45.00 | 0.00 |
| 48 | 5 | 5 | 5 | 5 | 5 | 5 | 5 | 5 | 4 | 52 | 45 | 46 | 47 | 48 | 49 | 50 | 51 | 43 | 48.50 | 2.29 | 45 | 45 | 45 | 45 | 45 | 45 | 45 | 45 | 45 | 46.13 | 2.98 |
| 49 | 5 | 5 | 5 | 5 | 5 | 5 | 5 | 5 | 5 | 52 | 53 | 46 | 47 | 48 | 49 | 50 | 51 | 43 | 49.50 | 2.29 | 54 | 45 | 45 | 45 | 45 | 45 | 45 | 45 | 45 | 47.25 | 3.90 |
| 50 | 6 | 5 | 5 | 5 | 5 | 5 | 5 | 5 | 5 | 52 | 53 | 54 | 47 | 48 | 49 | 50 | 51 | 43 | 50.50 | 2.29 | 54 | 54 | 45 | 45 | 45 | 45 | 45 | 45 | 45 | 48.38 | 4.35 |
| 51 | 6 | 6 | 5 | 5 | 5 | 5 | 5 | 5 | 5 | 52 | 53 | 54 | 55 | 48 | 49 | 50 | 51 | 51 | 51.50 | 2.29 | 54 | 54 | 54 | 45 | 45 | 45 | 45 | 45 | 45 | 49.50 | 4.50 |
| 52 | 6 | 6 | 6 | 5 | 5 | 5 | 5 | 5 | 5 | 52 | 53 | 54 | 55 | 56 | 49 | 50 | 51 | 51 | 52.50 | 2.29 | 54 | 54 | 54 | 54 | 45 | 45 | 45 | 45 | 45 | 50.63 | 4.35 |
| 53 | 6 | 6 | 6 | 6 | 5 | 5 | 5 | 5 | 5 | 52 | 53 | 54 | 55 | 56 | 57 | 50 | 51 | 51 | 53.50 | 2.29 | 54 | 54 | 54 | 54 | 54 | 45 | 45 | 45 | 45 | 51.75 | 3.90 |
| 54 | 6 | 6 | 6 | 6 | 6 | 5 | 5 | 5 | 5 | 52 | 53 | 54 | 55 | 56 | 57 | 58 | 51 | 51 | 54.50 | 2.29 | 54 | 54 | 54 | 54 | 54 | 54 | 45 | 45 | 45 | 52.88 | 2.98 |
| 55 | 6 | 6 | 6 | 6 | 6 | 6 | 5 | 5 | 5 | 52 | 53 | 54 | 55 | 56 | 57 | 58 | 59 | 51 | 55.50 | 2.29 | 54 | 54 | 54 | 54 | 54 | 54 | 54 | 45 | 45 | 54.00 | 0.00 |
| 56 | 6 | 6 | 6 | 6 | 6 | 6 | 6 | 5 | 5 | 60 | 53 | 54 | 55 | 56 | 57 | 58 | 59 | 51 | 56.50 | 2.29 | 54 | 54 | 54 | 54 | 54 | 54 | 54 | 54 | 45 | 55.13 | 2.98 |
| 57 | 6 | 6 | 6 | 6 | 6 | 6 | 6 | 6 | 5 | 60 | 61 | 54 | 55 | 56 | 57 | 58 | 59 | 51 | 57.50 | 2.29 | 63 | 54 | 54 | 54 | 54 | 54 | 54 | 54 | 54 | 56.25 | 3.90 |
| 58 | 6 | 6 | 6 | 6 | 6 | 6 | 6 | 6 | 6 | 60 | 61 | 62 | 55 | 56 | 57 | 58 | 59 | 51 | 58.50 | 2.29 | 63 | 63 | 54 | 54 | 54 | 54 | 54 | 54 | 54 | 57.38 | 4.35 |
| 59 | 7 | 6 | 6 | 6 | 6 | 6 | 6 | 6 | 6 | 60 | 61 | 62 | 63 | 56 | 57 | 58 | 59 | 59 | 59.50 | 2.29 | 63 | 63 | 63 | 54 | 54 | 54 | 54 | 54 | 54 | 58.50 | 4.50 |
| 60 | 7 | 7 | 6 | 6 | 6 | 6 | 6 | 6 | 6 | 60 | 61 | 62 | 63 | 63 | 57 | 58 | 59 | 59 | 60.38 | 2.12 | 63 | 63 | 63 | 63 | 54 | 54 | 54 | 54 | 54 | 59.63 | 4.35 |
| 61 | 7 | 7 | 7 | 6 | 6 | 6 | 6 | 6 | 6 | 60 | 61 | 62 | 63 | 63 | 63 | 58 | 59 | 59 | 61.13 | 1.83 | 63 | 63 | 63 | 63 | 63 | 54 | 54 | 54 | 54 | 60.75 | 3.90 |
| 62 | 7 | 7 | 7 | 7 | 6 | 6 | 6 | 6 | 6 | 60 | 61 | 62 | 63 | 63 | 63 | 63 | 59 | 59 | 61.75 | 1.48 | 63 | 63 | 63 | 63 | 63 | 63 | 54 | 54 | 54 | 61.88 | 2.98 |
| 63 | 7 | 7 | 7 | 7 | 7 | 6 | 6 | 6 | 6 | 60 | 61 | 62 | 63 | 63 | 63 | 63 | 63 | 63 | 62.25 | 1.09 | 63 | 63 | 63 | 63 | 63 | 63 | 63 | 54 | 54 | 63.00 | 0.00 |

AVERAGE VALUE − INPUT SIGNAL VALUE

FIG.28

THRESHOLD VALUE GENERATOR 11G

| x mod 2 | y mod 2 | OUTPUT VALUE |
|---|---|---|
| 0 | 0 | 0 |
| 0 | 1 | 1 |
| 1 | 0 | 1 |
| 1 | 1 | 0 |

THRESHOLD VALUE GENERATOR 11B

| x mod 4 | y mod 4 | OUTPUT VALUE |
|---|---|---|
| 00 | 00 | 000 |
| 00 | 01 | 110 |
| 00 | 11 | 111 |
| 00 | 10 | 001 |
| 01 | 00 | 100 |
| 01 | 01 | 010 |
| 01 | 11 | 011 |
| 01 | 10 | 101 |
| 11 | 00 | 101 |
| 11 | 01 | 011 |
| 11 | 11 | 010 |
| 11 | 10 | 100 |
| 10 | 00 | 001 |
| 10 | 01 | 111 |
| 10 | 11 | 110 |
| 10 | 10 | 000 |

FIG.31

| PRESENT STATE | NEXT STATE(=OUTPUT VALUE) | |
| --- | --- | --- |
| | VSync=1 | VSync=0 |
| 00 | 11 | 00 |
| 11 | 01 | 11 |
| 01 | 10 | 01 |
| 10 | 00 | 10 |

FIG.32

| THRESHOLD VALUE | COUNTER OUTPUT VALUE | | | |
|---|---|---|---|---|
| | 00 | 11 | 01 | 10 |
| 00 | 0 | 0 | 0 | 0 |
| 01 | 1 | 0 | 0 | 0 |
| 11 | 1 | 0 | 1 | 1 |
| 10 | 1 | 0 | 1 | 0 |

FIG.33

| INPUT SIGNAL | SIGNAL STORED IN MEMORY | | | | OUTPUT SIGNAL (PRESENT INVENTION) | | | | AVERAGE VALUE | STANDARD DEVIATION | OUTPUT SIGNAL (PRIOR ART) | | | | AVERAGE VALUE | STANDARD DEVIATION |
|---|---|---|---|---|---|---|---|---|---|---|---|---|---|---|---|---|
| | 0 | 1 | 2 | 3 | 0 | 1 | 2 | 3 | | | 0 | 1 | 2 | 3 | | |
| 0 | 0 | 0 | 0 | 0 | 0 | 1 | 2 | 3 | 1.5 | 1.50 | 0 | 0 | 0 | 0 | 0.00 | 0.00 |
| 1 | 0 | 0 | 0 | 0 | 0 | 1 | 2 | 3 | 1.5 | 0.50 | 0 | 0 | 0 | 0 | 0.00 | 0.00 |
| 2 | 0 | 0 | 0 | 0 | 0 | 1 | 2 | 3 | 1.5 | -0.50 | 0 | 0 | 0 | 0 | 0.00 | 0.00 |
| 3 | 0 | 0 | 0 | 0 | 0 | 1 | 2 | 3 | 1.5 | -1.50 | 0 | 0 | 0 | 0 | 0.00 | 0.00 |
| 4 | 1 | 0 | 0 | 0 | 4 | 1 | 2 | 3 | 2.5 | -1.50 | 4 | 0 | 0 | 0 | 1.00 | 1.73 |
| 5 | 1 | 1 | 0 | 0 | 4 | 5 | 2 | 3 | 3.5 | -1.50 | 4 | 4 | 0 | 0 | 2.00 | 2.00 |
| 6 | 1 | 1 | 1 | 0 | 4 | 5 | 6 | 3 | 4.5 | -1.50 | 4 | 4 | 4 | 0 | 3.00 | 1.73 |
| 7 | 1 | 1 | 1 | 1 | 4 | 5 | 6 | 7 | 5.5 | -1.50 | 4 | 4 | 4 | 4 | 4.00 | 0.00 |
| 8 | 2 | 1 | 1 | 1 | 8 | 5 | 6 | 7 | 6.5 | -1.50 | 8 | 4 | 4 | 4 | 5.00 | 1.73 |
| 9 | 2 | 2 | 1 | 1 | 8 | 9 | 6 | 7 | 7.5 | -1.50 | 8 | 8 | 4 | 4 | 6.00 | 2.00 |
| 10 | 2 | 2 | 2 | 1 | 8 | 9 | 10 | 7 | 8.5 | -1.50 | 8 | 8 | 8 | 4 | 7.00 | 1.73 |
| 11 | 2 | 2 | 2 | 2 | 8 | 9 | 10 | 11 | 9.5 | -1.50 | 8 | 8 | 8 | 8 | 8.00 | 0.00 |
| 12 | 3 | 2 | 2 | 2 | 12 | 9 | 10 | 11 | 10.5 | -1.50 | 12 | 8 | 8 | 8 | 9.00 | 1.73 |
| 13 | 3 | 3 | 2 | 2 | 12 | 13 | 10 | 11 | 11.5 | -1.50 | 12 | 12 | 8 | 8 | 10.00 | 2.00 |
| 14 | 3 | 3 | 3 | 2 | 12 | 13 | 14 | 11 | 12.5 | -1.50 | 12 | 12 | 12 | 8 | 11.00 | 1.73 |
| 15 | 3 | 3 | 3 | 3 | 12 | 13 | 14 | 15 | 13.5 | -1.50 | 12 | 12 | 12 | 12 | 12.00 | 0.00 |
| 16 | 4 | 3 | 3 | 3 | 16 | 13 | 14 | 15 | 14.5 | -1.50 | 16 | 12 | 12 | 12 | 13.00 | 1.73 |
| 17 | 4 | 4 | 3 | 3 | 16 | 17.25 | 14 | 15 | 15.563 | -1.44 | 16 | 16 | 12 | 12 | 14.00 | 2.00 |
| 18 | 4 | 4 | 4 | 3 | 16 | 17.25 | 18.5 | 15 | 16.688 | -1.31 | 16 | 16 | 16 | 12 | 15.00 | 1.73 |
| 19 | 4 | 4 | 4 | 4 | 16 | 17.25 | 18.5 | 19.75 | 17.875 | -1.13 | 16 | 16 | 16 | 16 | 16.00 | 0.00 |
| 20 | 5 | 4 | 4 | 4 | 21 | 17.25 | 18.5 | 19.75 | 19.125 | -0.88 | 21 | 16 | 16 | 16 | 17.25 | 2.17 |
| 21 | 5 | 5 | 4 | 4 | 21 | 22 | 18.5 | 19.75 | 20.313 | -0.69 | 21 | 21 | 16 | 16 | 18.50 | 2.50 |

OUTPUT VALUE OF THRESHOLD VALUE GENERATOR

FIG.34

| Input Signal | Output value of threshold value generator — Signal stored in memory | | | | Output signal (present invention) | | | | Average value | Standard deviation | Output signal (prior art) | | | | Average value | Standard deviation |
|---|---|---|---|---|---|---|---|---|---|---|---|---|---|---|---|---|
| 22 | 5 | 5 | 5 | 4 | 21 | 22 | 23 | 19.75 | 21.438 | 1.20 | 21 | 21 | 21 | 16 | 19.75 | 2.17 |
| 23 | 5 | 5 | 5 | 5 | 21 | 22 | 23 | 24 | 22.5 | 1.12 | 21 | 21 | 21 | 21 | 21.00 | 0.00 |
| 24 | 6 | 5 | 5 | 5 | 25 | 22 | 23 | 24 | 23.5 | 1.12 | 25 | 21 | 21 | 21 | 22.00 | 1.73 |
| 25 | 6 | 6 | 5 | 5 | 25 | 26 | 23 | 24 | 24.5 | 1.12 | 25 | 25 | 21 | 21 | 23.00 | 2.00 |
| 26 | 6 | 6 | 6 | 5 | 25 | 26 | 27 | 24 | 25.5 | 1.12 | 25 | 25 | 25 | 21 | 24.00 | 1.73 |
| 27 | 6 | 6 | 6 | 6 | 25 | 26 | 27 | 28 | 26.5 | 1.12 | 25 | 25 | 25 | 25 | 25.00 | 0.00 |
| 28 | 7 | 6 | 6 | 6 | 29 | 26 | 27 | 28 | 27.5 | 1.12 | 29 | 25 | 25 | 25 | 26.00 | 1.73 |
| 29 | 7 | 7 | 6 | 6 | 29 | 30 | 27 | 28 | 28.5 | 1.12 | 29 | 29 | 25 | 25 | 27.00 | 2.00 |
| 30 | 7 | 7 | 7 | 6 | 29 | 30 | 31 | 28 | 29.5 | 1.12 | 29 | 29 | 29 | 25 | 28.00 | 1.73 |
| 31 | 7 | 7 | 7 | 7 | 29 | 30 | 31 | 32 | 30.5 | 1.12 | 29 | 29 | 29 | 29 | 29.00 | 0.00 |
| 32 | 8 | 7 | 7 | 7 | 33 | 30 | 31 | 32 | 31.5 | 1.12 | 33 | 29 | 29 | 29 | 30.00 | 1.73 |
| 33 | 8 | 8 | 7 | 7 | 33 | 34 | 31 | 32 | 32.5 | 1.12 | 33 | 33 | 29 | 29 | 31.00 | 2.00 |
| 34 | 8 | 8 | 8 | 7 | 33 | 34 | 35 | 32 | 33.5 | 1.12 | 33 | 33 | 33 | 29 | 32.00 | 1.73 |
| 35 | 8 | 8 | 8 | 8 | 33 | 34 | 35 | 36 | 34.5 | 1.12 | 33 | 33 | 33 | 33 | 33.00 | 0.00 |
| 36 | 9 | 8 | 8 | 8 | 37 | 34 | 35 | 36 | 35.5 | 1.12 | 37 | 33 | 33 | 33 | 34.00 | 1.73 |
| 37 | 9 | 9 | 8 | 8 | 37 | 38.25 | 35 | 36 | 36.563 | 1.20 | 37 | 37 | 33 | 33 | 35.00 | 2.00 |
| 38 | 9 | 9 | 9 | 8 | 37 | 38.25 | 39.5 | 36 | 37.688 | 1.32 | 37 | 37 | 37 | 33 | 36.00 | 1.73 |
| 39 | 9 | 9 | 9 | 9 | 37 | 38.25 | 39.5 | 40.75 | 38.875 | 1.40 | 37 | 37 | 37 | 37 | 37.00 | 0.00 |
| 40 | 10 | 9 | 9 | 9 | 42 | 38.25 | 39.5 | 40.75 | 40.125 | 1.40 | 42 | 37 | 37 | 37 | 38.25 | 2.17 |
| 41 | 10 | 10 | 9 | 9 | 42 | 43 | 39.5 | 40.75 | 41.313 | 1.32 | 42 | 42 | 37 | 37 | 39.50 | 2.50 |
| 42 | 10 | 10 | 10 | 9 | 42 | 43 | 44 | 40.75 | 42.438 | 1.20 | 42 | 42 | 42 | 37 | 40.75 | 2.17 |

FIG.35

| Input Signal | Signal Stored in Memory | | | | Output Signal (Present Invention) | | | | Average Value | Standard Deviation | Output Signal (Prior Art) | | | | Average Value | Standard Deviation |
|---|---|---|---|---|---|---|---|---|---|---|---|---|---|---|---|---|
| 43 | 10 | 10 | 10 | 10 | 42 | 43 | 44 | 45 | 43.5 | 1.12 | 42 | 42 | 42 | 42 | 42.00 | 0.00 |
| 44 | 11 | 10 | 10 | 10 | 46 | 43 | 44 | 45 | 44.5 | 1.12 | 46 | 42 | 42 | 42 | 43.00 | 1.73 |
| 45 | 11 | 11 | 10 | 10 | 46 | 47 | 44 | 45 | 45.5 | 1.12 | 46 | 46 | 42 | 42 | 44.00 | 2.00 |
| 46 | 11 | 11 | 11 | 10 | 46 | 47 | 48 | 45 | 46.5 | 1.12 | 46 | 46 | 46 | 42 | 45.00 | 1.73 |
| 47 | 11 | 11 | 11 | 11 | 46 | 47 | 48 | 49 | 47.5 | 1.12 | 46 | 46 | 46 | 46 | 46.00 | 0.00 |
| 48 | 12 | 11 | 11 | 11 | 50 | 47 | 48 | 49 | 48.5 | 1.12 | 50 | 46 | 46 | 46 | 47.00 | 1.73 |
| 49 | 12 | 12 | 11 | 11 | 50 | 51 | 48 | 49 | 49.5 | 1.12 | 50 | 50 | 46 | 46 | 48.00 | 2.00 |
| 50 | 12 | 12 | 12 | 11 | 50 | 51 | 52 | 49 | 50.5 | 1.12 | 50 | 50 | 50 | 46 | 49.00 | 1.73 |
| 51 | 12 | 12 | 12 | 12 | 50 | 51 | 52 | 53 | 51.5 | 1.12 | 50 | 50 | 50 | 50 | 50.00 | 0.00 |
| 52 | 13 | 12 | 12 | 12 | 54 | 51 | 52 | 53 | 52.5 | 1.12 | 54 | 50 | 50 | 50 | 51.00 | 1.73 |
| 53 | 13 | 13 | 12 | 12 | 54 | 55 | 52 | 53 | 53.5 | 1.12 | 54 | 54 | 50 | 50 | 52.00 | 2.00 |
| 54 | 13 | 13 | 13 | 12 | 54 | 55 | 56 | 53 | 54.5 | 1.12 | 54 | 54 | 54 | 50 | 53.00 | 1.73 |
| 55 | 13 | 13 | 13 | 13 | 54 | 55 | 56 | 57 | 55.5 | 1.12 | 54 | 54 | 54 | 54 | 54.00 | 0.00 |
| 56 | 14 | 13 | 13 | 13 | 58 | 55 | 56 | 57 | 56.5 | 1.12 | 58 | 54 | 54 | 54 | 55.00 | 1.73 |
| 57 | 14 | 14 | 13 | 13 | 58 | 59.25 | 56 | 57 | 57.563 | 1.20 | 58 | 58 | 54 | 54 | 56.00 | 2.00 |
| 58 | 14 | 14 | 14 | 13 | 58 | 59.25 | 60.5 | 57 | 58.688 | 1.32 | 58 | 58 | 58 | 54 | 57.00 | 1.73 |
| 59 | 14 | 14 | 14 | 14 | 58 | 59.25 | 60.5 | 61.75 | 59.875 | 1.40 | 58 | 58 | 58 | 58 | 58.00 | 0.00 |
| 60 | 15 | 14 | 14 | 14 | 63 | 59.25 | 60.5 | 61.75 | 61.125 | 1.40 | 63 | 58 | 58 | 58 | 59.25 | 2.17 |
| 61 | 15 | 15 | 14 | 14 | 63 | 63 | 60.5 | 61.75 | 62.063 | 1.04 | 63 | 63 | 58 | 58 | 60.50 | 2.50 |
| 62 | 15 | 15 | 15 | 14 | 63 | 63 | 63 | 61.75 | 62.588 | 0.54 | 63 | 63 | 63 | 58 | 61.75 | 2.17 |
| 63 | 15 | 15 | 15 | 15 | 63 | 63 | 63 | 63 | 63.00 | 0.00 | 63 | 63 | 63 | 63 | 63.00 | 0.00 |

Output value of threshold value generator

IMAGE PROCESSING APPARATUS, IMAGE TRANSMISSION APPARATUS, IMAGE RECEPTION APPARATUS, AND IMAGE PROCESSING METHOD

TECHNICAL FIELD

The present invention relates to an image processing apparatus, an image transmission apparatus and an image processing method, and more specifically to an image processing apparatus, an image transmission apparatus and an image processing method for achieving high quality images in image processing by a display having a memory which stores raster images as well as improving efficiency in the transmission of raster images from a computer to the display.

BACKGROUND ART

At the present day, in order to transmit an image from a computer to a display, a means of transmitting a raster image with respect to each frame frequency is adopted. This means requires a large amount of transmission data, and therefore involves waste of transmission when a still image is being displayed.

As a measure for reducing the amount of transmission data, an image may be compressed into a file format such as JPEG and GIF, and then transmitted. However, it is necessary to have a processor which executes high-speed operations for compressing and decompressing the image with respect to each frame, thereby resulting in an increase in costs.

On the other hand, as a measure for reducing waste of transmission in displaying a still image, a display may be provided with a built-in frame memory which serves as a memory for storing a raster image to suspend the transmission of data when a still image is being displayed. This measure is effective especially for mobile information equipment and the like since it is also possible to reduce electric power consumption.

Reductions in electric power consumption and chip size are important for the display which is installed in mobile information equipment. Accordingly, it is desirable that an image stored in a memory should be displayed when displaying a still image, and that the capacity or size of the memory, which occupies a large proportion of chip size, should be small. By storing an image in a memory as just described, electric power consumption in data transmission can be reduced. Besides, The reduced demand of memory capacity means that chip size can be reduced.

In order to reduce memory capacity, image data may be compressed. However, according to a graphical data compression method utilizing a format such as JPEG and GIF, it is required to have an image processor for decompressing images, which counteracts the effect of reducing electric power consumption and chip size.

Another approach involves reducing the bit-plane number of a raster image. Here, the bit-plane number means the number n of bits of data representing the tone or gray level of a digital image which has been quantized by $2^n$. Examples of the methods for reducing the bit-plane number include the multi-valued dither method and the fixed threshold method. Details regarding these methods are described in "The New Image Electron Handbook" (Tokyo, Corona Publishing Co. Ltd., 1993), pp. 41-51. The multi-valued dither method and the fixed threshold method are different from the graphical data compression method utilizing a format such as JPEG and GIF in that compressed images do not require decompression.

FIG. 1 is a block diagram schematically showing the configuration of a conventional image processing apparatus. With reference to FIG. 1, a description will be given of an example of bit-plane compression of a raster image by the conventional multi-valued dither method, in which an RGB raster image with 6 bits per color component is transmitted from a computer, and an image display section displays an image with 6 bits per color component.

First, low order or least significant 2 bits of 6 bits per color component of a raster image 1 are transmitted to a comparator 12. A threshold value generator 11 generates a dither matrix based on ordered dithering, and outputs a 2-bit value, which is uniquely determined according to the pixel (X-Y coordinate values) of an input image, to the comparator 12.

The comparator 12 compares the low order 2 bits sent from the raster image 1 with the 2-bit value from the threshold value generator 11. When the value received from the threshold value generator 11 is larger than the low order 2 bits, the comparator 12 outputs "1" to a selector 13. Otherwise, the comparator 12 outputs "0" to the selector 13.

The selector 13 outputs high order or most significant 4 bits of the raster image 1 directly or a value obtained by subtracting 1 therefrom to a memory 2 based on the output value from the comparator 12. For an image with 4 bits per color component stored in the memory 2, the value of high order 2 bits of the 4 bits is attached as low order bits to the input 4-bit value by a bit addition section 14, and the image is output to an image display section 3 as a 6-bit image.

With this construction, the bit-plane number is reduced by the multi-valued dither method, and a pseudo image with 6 bits per color component is displayed.

Besides, Japanese Patent Publication No. HEI2-8493(B) (first prior art) has disclosed a digital signal processing apparatus which performs level-compression of a digitized input signal to transmit the signal and level-decompression of a compressed signal transmitted thereto, comprising circuits for detecting a maximum value of a digital signal, performing level-compression after adding a dither value to the digital signal based on the maximum value, performing level-decompression and subtracting the dither value from the digital signal, respectively.

With this construction, it is possible to obtain the output with smaller difference in a digitized audio signal being a one-dimensional signal.

PROBLEMS THAT THE INVENTION IS TO SOLVE

According to the conventional multi-valued dither method and the fixed threshold method, however, the reduction of the bit-plane number causes pseudo outlines and pseudo colors, and produces a grainy picture. Thus, the quality of an image is deteriorated.

There is a display style called superimpose. This is a technique for superimposing a different image such as "text" on a display screen image. In the case of superimpose display, a plurality of images (e.g. a picture or a graphic and text) are necessary as input images, which increases the amount of input image data, and therefore, it becomes difficult to store the input images in a memory and transmit them via a transmission bus which has a limitation in bus width.

Additionally, on a display of, for example, a mobile terminal, which displays graphics with low maximum resolution, it is necessary to scroll an image when the displayed image is large like a map. This scroll display is deceptively simple operation. However, a display memory has to be rewritten many times, and accordingly, electric power consumption is increased.

On the other hand, as shown in FIG. 2 (a), when displaying an image on a display device, etc., an image signal is input to each pixel along a main scanning line as well as a sub scanning line, and this operation is repeated with respect to a plurality of lines so that the image signal can be input to all the pixels.

Here, let it be assumed that the first prior art is applied to image display. Incidentally, in this example, a dither period is set to 4 bits.

As shown in FIG. 2 (b), when the number of pixels in the main scanning direction of a display is 4n+1, dither periodicity appears in both main scanning direction and sub scanning direction, and therefore compression and decompression of an image cause less deterioration in picture quality. The same is true of the case where the number of pixels in the main scanning direction of a display is 4n+2 or 4n+3. That is, in the case where the number of pixels in the main scanning direction of a display does not include the dither period as a factor, compression and decompression of an image cause less deterioration in picture quality.

However, when the number of pixels in the main scanning-direction of a display is 4n, in other words, when the number of pixels in the main scanning direction of a display includes the dither period as a factor, dither periodicity is not observed in sub scanning direction, while it appears in main scanning direction as shown in FIG. 2 (c). Consequently, the deterioration of picture quality caused by compression and decompression of an image is intensified.

In the case of dither processing for a raster image, it is possible to reduce the deterioration in picture quality since a high-frequency minimal noise can be obtained as dither period becomes smaller. However, the number of pixels in the main scanning direction of a display is generally a number including "2" to "6" as a factor (e.g. 480, 720, 840, etc.). Therefore, when applying the first prior art to image display, dither periodicity is not observed in sub scanning direction, while it appears in main scanning direction as can be seen in FIG. 2 (c). Thus, picture quality deteriorates with compression and decompression of an image.

In the case where the dither period is set to a larger value so as not to be a factor of the number of pixels in the main scanning direction of a display, a high-frequency minimal noise, the intended purpose of dither processing, cannot be achieved. Thus, picture quality deteriorates with compression and decompression of an image.

Besides, if the first prior art is directly used, it is required to have a maximum value detecting circuit on a compression side for specifying a bit of a digital signal, which is formed of a plurality of bits, to which a dither value is to be added, and also transmit a signal indicating the place of the most utilized bit of a maximum value with a digital signal as needed. Moreover, in the case of storing a compressed digital signal in a memory or the like, the signal that indicates the place of the most utilized bit has to be stored in the memory together with the digital signal.

The construction for executing such processing needs intricate circuitry, which increases electric power consumption and chip size. Therefore, this construction is not suitable for an image processing apparatus such as a display.

In addition, the first prior art does not teach or suggest the processing method with respect to the maximum value and the minimum value of a digital signal. Consequently, in an image processing apparatus which often provides a "white" or the maximum value display and a "black" or the minimum value display (e.g. text output, geometrical configuration display, etc), picture quality deteriorates. This is because a grainy picture is often produced on the occasion of the "black" and "white" display.

As just described, in the case where the first prior art is directly applied to image processing, compression and decompression of an image cause less deterioration in picture quality.

Therefore, when applying the first prior art to image display, it is necessary to adopt the configuration of a dither matrix suitable for a raster image or a two-dimensional signal. Further, since the tones of pixels deviate according to the types of images (text display or natural image display), it is desirable to perform image processing suitable for a raster image.

Additionally, all images are not always compressed when a display represents an image. For example, in the case of movie display, compression and decompression of an image is carried out with respect to each frame, thereby increasing electric power consumption and the number of operations. For this reason, it is undesirable to compress and decompress images.

It is therefore an object of the present invention to provide an image processing apparatus, an image transmission apparatus, an image reception apparatus and an image processing method for displaying an image as excellent as a normal raster image even when memory capacity is reduced, enabling reductions in transmission capacity as well as memory capacity for transmitting the data of a raster image while suppressing deterioration of image quality. It is another object of the present invention to provide an image processing apparatus, an image transmission apparatus, an image reception apparatus and an image processing method for executing image processing while increasing the efficiency of image transmission and memory utilization, thereby enabling reductions in electric power consumption and the number of operations.

DISCLOSURE OF THE INVENTION

In accordance with the first aspect of the present invention, to achieve the above objects, there is provided an image processing apparatus that reduces the bit-plane number of a raster image, which is an original image, and after that, increases the reduced bit-plane number of the raster image to the number equal to or less than the bit-plane number of the original image.

Preferably, in the first aspect of the present invention, the raster image whose bit-plane number has been reduced is stored in a memory or a storage having small and insufficient memory capacity for the amount of data of the original image, and the stored raster image is read out of the storage. In addition, it is desirable that the raster image whose bit-plane number has been reduced should be transmitted via a transmission bus having a bus width less than the bit-plane number of the original image.

In accordance with the first aspect of the present invention, it is possible to compress and decompress a bitmap image transmitted to a display with less logic elements, thereby enabling reductions in memory capacity and transmission capacity.

In accordance with the second aspect of the present invention, to achieve the above objects, there is provided an image processing apparatus comprising a first image processing means for reducing the bit-plane number of a raster image, which is an original image, and a second image processing means for increasing the bit-plane number of the raster image reduced by the first image processing means.

The image processing apparatus according to the second aspect of the present invention is one selected from the following image processing apparatuses 2-1 to 2-4.

2-1: An image processing apparatus comprising: a first image processing means for performing first image processing to reduce the bit-plane number of a raster image, which is an original image; and a second image processing means for performing reverse processing to the first image processing as second image processing to increase the bit-plane number of the raster image reduced by the first image processing means to the number equal to or less than the bit-plane number of the original image.

2-2: An image processing apparatus that reduces the bit-plane number of a raster image, which is an original image, and after that, increases the reduced bit-plane number of the raster image to the number equal to or less than the bit-plane number of the original image, comprising: a first image processing means for performing multi-valued dither processing with the use of a two-dimensional dither matrix when reducing the bit-plane number of the raster image; and a second image processing means for performing bit addition processing based on the two-dimensional dither matrix used by the first image processing means when increasing the reduced bit-plane number of the raster image.

2-3: An image processing apparatus that reduces the bit-plane number of a raster image, which is an original image, and after that, increases the reduced bit-plane number of the raster image to the number equal to or less than the bit-plane number of the original image, comprising: a first image processing means for performing multi-valued dither processing with the use of a two-dimensional dither matrix when reducing the bit-plane number of the raster image; and a second image processing means for performing frame rate control processing to periodically change tones based on the two-dimensional dither matrix used by the first image processing means when increasing the reduced bit-plane number of the raster image.

2-4: An image processing apparatus that reduces the bit-plane number of a raster image, which is an original image, and after that, increases the reduced bit-plane number of the raster image to the number equal to or less than the bit-plane number of the original image, comprising: a first image processing means for performing multi-valued dither processing with the use of a two-dimensional dither matrix when reducing the bit-plane number of the raster image; and a second image processing means for performing bit addition processing based on the two-dimensional dither matrix used by the first image processing means when increasing the reduced bit-plane number of the raster image, and adding an offset value in order that the difference between the signal value of the original image and the average of all the dither values of the raster image whose bit-plane number has been increased will be the minimum.

Preferably, in any configuration according to the second aspect of the present invention, the raster image whose bit-plane number has been reduced is transmitted via a transmission bus having a bus width less than the bit-plane number of the original image. In addition, it is desirable that the image processing apparatus should further comprise a storage for storing data of the raster image whose bit-plane number has been reduced by the first image processing means, and the second image processing means should read out the data of the raster image stored in the storage to increase its bit-plane number. It is also desirable that the raster image should be an RGB color image having the same number of bit-planes with respect to each color of R, G and B signals, and the largest reduction should be made in the bit-plane number of the B signal while the smallest reduction should be made in the bit-plane number of the G signal. Further, the second image processing means is preferably formed on the substrate where the drive circuit of a display is formed. Still further, the first image processing means is preferably formed on the substrate where the drive circuit of the display is formed.

In accordance with the second aspect of the present invention, the first image processing means reduces the bit-plane number of a raster image, which is an original image, and after that, the second image processing means increases the reduced bit-plane number. Thus, it is possible to compress and decompress a bitmap image transmitted to a display with less logic elements, thereby enabling reductions in memory capacity and transmission capacity.

Besides, in the aforementioned configurations 2-2 to 2-4, multi-valued dither processing is performed with the use of a two-dimensional dither matrix when reducing the bit-plane number of a raster image, and bit addition processing is performed based on the two-dimensional dither matrix which has been used for the multi-valued dither processing when increasing the reduced bit-plane number of the raster image. Consequently, there is a smaller difference between the image which has undergone the bit addition processing and the original image as compared to the multi-valued dither method. Thereby, it is possible to suppress a grainy feeling and pseudo colors seen in the case where there is a large difference between the two images, and realize high quality image display.

Incidentally, in the case where the second aspect of the present invention is applied to the display whose drive circuit is formed on a substrate (e.g. a glass substrate), the image processing apparatus can be formed on the substrate by the same process. Therefore, the application of the image processing apparatus of the third aspect enables reductions in the memory area and electric power consumption.

In accordance with the third aspect of the present invention, to achieve the above objects, there is provided an image processing apparatus capable of determining whether to directly output a raster image, which is an original image, or to output an image whose bit-plane number has been reduced/increased or which has been compressed/decompressed.

The image processing apparatus according to the third aspect of the present invention is one selected from the following image processing apparatuses 3-1 to 3-3.

3-1: An image processing apparatus that reduces the bit-plane number of a first raster image, which is an original image, and after that, produces a second raster image by increasing the reduced bit-plane number of the raster image to the number equal to or less than the bit-plane number of the original image, comprising: a first image processing means for performing multi-valued dither processing with the use of a two-dimensional dither matrix when reducing the bit-plane number of the first raster image; a second image processing means for performing bit addition processing based on the two-dimensional dither matrix used by the first image processing means when increasing the reduced bit-plane number of the raster image; and a selecting means for selecting either the first raster image or the second raster image and outputting the selected image.

3-2: An image processing apparatus that reduces the bit-plane number of a first raster image, which is an original image, and after that, produces a second raster image by increasing the reduced bit-plane number of the raster image to the number equal to or less than the bit-plane number of the original image, comprising: a first image processing means for performing multi-valued dither processing with the use of a two-dimensional dither matrix when reducing the bit-plane number of the raster image; a second image processing means for performing bit addition processing based on the two-dimensional dither matrix used by the first image processing means when increasing the reduced bit-plane number of the raster image, and adding an offset value in order that the difference between the signal value of the original image and the average of all the dither values of the raster image whose bit-plane number has been increased will be the minimum; and a selecting means for selecting either the first raster image or the second raster image, and outputting the selected image.

3-3: An image processing apparatus that compresses data of a first raster image, which is an original image, and after that, produces a second raster image by decompressing data of the raster image, comprising: a first image processing means for compressing the data of the first raster image; a second image processing means for decompressing the data compressed by the first image processing means to produce the second raster image; and a selecting means for selecting either the first raster image or the second raster image and outputting the selected image.

Preferably, in the aforementioned configurations 3-1 and 3-2, the first and second raster images are RGB color images each having the same bit-plane number with respect to each color of R, G and B signals, and the largest reduction is made in the bit-plane number of the B signal while the smallest reduction is made in the bit-plane number of the G signal.

Besides, in any configuration according to the third aspect of the present invention, it is desirable that the image processing apparatus should further comprise a storage for storing data of the raster image obtained by the first image processing means, and the second image processing means should read out the data of the compressed raster image stored in the storage to carry out the image processing. Preferably, the first and second image processing means perform the image processing in a manner such that the maximum value and minimum value of components of the raster image after the image processing are the same as before. Further, the second image processing means is preferably formed on the substrate where the drive circuit of a display is formed. Still further, the first image processing means is preferably formed on the substrate where the drive circuit of the display is formed.

In accordance with the third aspect of the present invention, the image processing apparatus, for example, directly outputs the raster image when the original image is a moving image, and outputs an image whose bit-plane number has been reduced/increased or which has been compressed/decompressed when the original image is a still image. Consequently, the image processing apparatus can display an image without the intervention of the storage (e.g. a memory) when displaying a moving image.

That is, the image processing apparatus of the present invention reduces/increases the bit-plane number and compresses/decompresses an image only if necessary, and stops the operation of the storage, etc. when these processes are not required (e.g. when a moving image is being displayed). Thereby, it is possible to reduce electric power consumption.

Incidentally, in the case where the third aspect of the present invention is applied to the display whose drive circuit is formed on a substrate (e.g. a glass substrate), the image processing apparatus can be formed on the substrate by the same process. Therefore, the application of the image processing apparatus of the third aspect enables reductions in the memory area and electric power consumption.

In accordance with the fourth aspect of the present invention, to achieve the above objects, there is provided an image processing apparatus which compress/decompress an original image in the case where an input raster image cannot be stored in a storage or displayed on a display in its original form.

The image processing apparatus according to the fourth aspect of the present invention is one selected from the following image processing apparatuses 4-1 to 4-3.

4-1: An image processing apparatus in which input image data is stored in a storage, and an image is displayed on a prescribed display based on the image data read out of the storage, comprising: a first image processing means for compressing a first raster image, which is an original image, to produce a compressed raster image; a means for storing the compressed raster image in the storage; a second image processing means for reading out the compressed raster image stored in the storage, and decompressing the compressed raster image to produce a second raster image; and a means for outputting the second raster image to the display; wherein the compressed raster image is produced when the amount of data of the first raster image exceeds the capacity of the storage.

4-2: An image processing apparatus in which data for displaying an input image is stored in a storage, and an image is displayed on a prescribed display based on the data read out of the storage, comprising: a first image processing means for compressing at least one layer of a signal for displaying a first raster image, which has been divided into two or more layers when input, to produce a compressed layer(s); a means for storing the compressed layer(s) and uncompressed layer(s) of the first raster image in the storage; a second image processing means for reading out the compressed layer(s) stored in the storage to decompress the compressed layer(s), and combining the decompressed layer(s) with the uncompressed layer(s) of the first raster image read out of the storage to generate a signal for displaying a second raster image; and a means for outputting the signal for displaying the second raster image to the display; wherein the compressed layer is produced when the amount of data of the signal for displaying the first raster image exceeds the capacity of the storage.

4-3: An image processing apparatus in which input image data is stored in a storage, and an image is displayed on a prescribed display based on the image data read out of the storage, comprising: a first image processing means for compressing a first raster image, which is an original image, to produce a compressed raster image; a means for storing the compressed raster image in the storage; a second image processing means for reading the compressed raster image out of the storage, and decompressing the compressed raster image to produce a second raster image; and a means for outputting the second raster image to the display; wherein the compressed raster image is produced when the first-raster image, which is an original image, is larger than the largest image that the display can display.

Preferably, in the aforementioned configurations 4-1 and 4-2, the first and second image processing means perform the image processing so that the maximum value and minimum value of components of the second raster image match those of the first raster image, respectively.

Besides, in any configuration according to the fourth aspect of the present invention, it is desirable that the image processing apparatus should further comprise a selecting means for determining whether to store the first raster image in the storage without compression or to store the raster image in the storage after compressing it by the first image processing means when the amount of data of the first raster image is within the capacity of the storage. Preferably, the image processing apparatus further comprises a means for outputting the first raster image to the display without the intervention of the first image processing means, the storage and the second image processing means, and a means for selecting either the first raster image or the second raster image to output the selected image. Preferably, the image processing apparatus further comprises a means for stopping the operation of the first image processing means, the storage and the second image processing means when outputting the first raster image to the display. In addition, the second image processing means is preferably formed on the substrate where the drive circuit of the display is formed. Furthermore, the first image processing means is preferably formed on the substrate where the drive circuit of the display is formed.

In accordance with the fourth aspect of the present invention, an image processing apparatus compresses and decompresses an original image in the case where an input raster image cannot be stored in the storage or displayed on the display in its original form. Therefore, an input original image can be stored in the storage regardless of the amount of data or the size of the original image. That is, it is possible to produce the second raster image and output the image to the display regardless of the amount of data or the size of the original image.

For example, the image processing apparatus of the fourth aspect is capable of providing a superimpose display without requiring more memory capacity by compressing and decompressing a natural image by 1 bit and using the obtained 1 bit for text information.

Additionally, in the case of displaying a large image such as a map, which is beyond the maximum resolution of the display, less memory capacity is required to store the image by decreasing and increasing the bit-plane number. Thereby, it is possible to scroll through the image on the display without reacquisition of the image from outside, which reduces electric power consumption.

Incidentally, in the case where the fourth aspect of the present invention is applied to the display whose drive circuit is formed on a substrate (e.g. a glass substrate), the image processing apparatus can be formed on the substrate by the same process. Therefore, the application of the image processing apparatus of the fourth aspect enables reductions in the memory area and electric power consumption.

In accordance with the fifth aspect of the present invention, to achieve the above objects, there is provided an image transmission apparatus for improving the capacity of transmission.

The image transmission apparatus according to the fifth aspect of the present invention is one selected from the following image transmission apparatuses 5-1 to 5-3.

5-1: An image transmission apparatus in which: a raster image being an original image is transmitted from a first unit to a second unit; the first unit performs first image processing for reducing the bit-plane number of the raster image, which is an original image, and transmits the raster image whose bit-plane number has been reduced to the second unit; and the second unit performs second image processing for increasing the bit-plane number of the raster image transmitted from the first unit to the number equal to or less than the bit-plane number of the original image.

5-2: An image transmission apparatus in which: a raster image being an original image is transmitted from a first unit to a second unit; the first unit performs multi-valued dither processing with the use of a two-dimensional dither matrix for the raster image, which is an original image, and transmits the raster image whose bit-plane number has been reduced to the second unit; and the second unit performs bit addition processing based on the two-dimensional dither matrix used for the multi-valued dither processing so that the bit-plane number of the raster image transmitted from the first unit matches the bit-plane number of the original image.

5-3: An image transmission apparatus in which: a raster image being an original image is transmitted from a first unit to a second unit; the first unit performs multi-valued dither processing with the use of a two-dimensional dither matrix for the raster image, which is an original image, and transmits the raster image whose bit-plane number has been reduced to the second unit; and the second unit performs bit addition processing based on the two-dimensional dither matrix used for the multi-valued dither processing so that the bit-plane number of the raster image transmitted from the first unit matches the bit-plane number of the original image, and adding an offset value in order that the difference between the signal value of the original image and the average of all the dither values of the raster image whose bit-plane number has been increased will be the minimum.

Preferably, in the image transmission apparatus according to the fifth aspect of the present invention, the first and second units perform the processing in a manner such that the maximum value and minimum value of components of the raster image after the processing are the same as before.

In accordance with the fifth aspect of the present invention, in the image transmission apparatus in which a raster image is transmitted from the first unit to the second unit, the first unit reduces the bit-plane number of an original image, and transmits the raster image whose bit-plane number has been reduced to the second unit, and the second unit increases the bit-plane number of the raster image transmitted from the first unit to the number equal to or less than the bit-plane number of the original image. Thereby, it is possible to improve the capacity of transmission. Particularly, in the configurations 5-2 and 5-3, multi-valued dither processing is performed with the use of a two-dimensional dither matrix for a raster image, which is an original image, so as to transmit the raster image whose bit-plane number has been reduced, and after that, bit addition processing is performed based on the two-dimensional dither matrix used for the multi-valued dither processing so that the bit-plane number of the raster image matches the bit-plane number of the original image. Thus, it is possible to improve the capacity of transmission.

Consequently, for example, in the case of transmitting an RGB raster image with 6 bits per color component (18 bits in total) via a transmission bus having a bus width of 16 bits, the raster image is compressed by reducing the bit-plane number. Thus, data can be transmitted in parallel.

In accordance with the sixth aspect of the present invention, to achieve the above objects, there is provided an image reception apparatus which receives a raster image whose bit-plane number has been reduced to less than that of an original image, and increases the bit-plane number of the received image.

The image reception apparatus according to the sixth aspect of the present invention is one selected from the following image reception apparatuses 6-1 to 6-3.

6-1: An image reception apparatus which receives a raster image whose bit-plane number has been reduced to less than that of an original image, and performs second image processing to increase the reduced bit-plane number of the raster image to the number equal to or less than the bit-plane number of the original image.

6-2: An image reception apparatus which receives a raster image whose bit-plane number has been reduced to less than that of a raster image being an original image by multi-valued dither processing with the use of a two-dimensional dither matrix, and performs bit addition processing based on the two-dimensional dither matrix used for the multi-valued dither processing so that the reduced bit-plane number of the raster image matches the bit-plane number of the original image.

6-3: An image reception apparatus which receives a raster image whose bit-plane number has been reduced to less than that of a raster image being an original image by multi-valued dither processing with the use of a two-dimensional dither matrix, performs bit addition processing based on the two-dimensional dither matrix used for the multi-valued dither processing so that the reduced bit-plane number of the raster image matches the bit-plane number of the original image, and adds an offset value in order that the difference between the signal value of the original image and the average of all the dither values of the raster image whose bit-plane number has been increased will be the minimum.

Preferably, in the aforementioned configurations 6-2 and 6-3, the processing is performed in a manner such that the maximum value and minimum value of components of the raster image after the processing are the same as before.

In accordance with the sixth aspect of the present invention, it is possible to increase the bit-plane number of the received raster image which has been reduced to less than that of an original image. Thereby, the efficiency of a transmission bus for receiving images can be improved. Particularly, in the configurations 6-2 and 6-3, the image reception apparatus receives a raster image whose bit-plane number has been reduced to less than that of an original image by multi-valued dither processing with the use of a two-dimensional dither matrix, and after that, the image reception apparatus performs bit addition processing based on the two-dimensional dither matrix used for the multi-valued dither processing so that the bit-plane number of the received image matches the bit-plane number of the original image. Thus, it is possible to improve the efficiency of a transmission bus for receiving images.

For example, in the case where an apparatus, which is provided with a transmission bus for receiving images having a bus width of only 16 bits, receives a raster image with 6 bits per color component (18 bits in total), the apparatus receives the raster image whose bit-plane number has been reduced at the sending end, and increases the bit-plane number of the received image. Thereby, the apparatus can receive the respective color components of the image comparable in quality to the original image in parallel.

In accordance with the seventh aspect of the present invention, to achieve the above objects, there is provided an image processing method for reducing the bit-plane number of a raster image, which is an original image, and after that, increasing the reduced bit-plane number of the raster image to the number equal to or less than the bit-plane number of the original image.

Preferably, in the seventh aspect of the present invention, the raster image whose bit-plane number has been reduced is stored in a storage having small and insufficient memory capacity for the amount of data of the original image, and the stored raster image is read out of the storage. In addition, it is desirable that the raster image whose bit-plane number has been reduced should be transmitted via a transmission bus having a bus width less than the bit-plane number of the original image.

In accordance with the seventh aspect of the present invention, it is possible to compress and decompress a bitmap image with less logic elements, thereby enabling reductions in the memory capacity and the transmission capacity of an apparatus that employs the image processing method of the seventh aspect of the present invention.

In accordance with the eighth aspect of the present invention, to achieve the above objects, there is provided an image processing method comprising a first image processing step for reducing the bit-plane number of a raster image, which is an original image, and a second image processing step for increasing the bit-plane number of the raster image.

The image processing method according to the eighth aspect of the present invention is one selected from the following image processing methods 8-1 to 8-4.

8-1: An image processing method comprising: a first image processing step for performing first image processing to reduce the bit-plane number of a raster image, which is an original image; and a second image processing step for performing second image processing to increase the reduced bit-plane number of the raster image to the number equal to or less than the bit-plane number of the original image.

8-2: An image processing method for reducing the bit-plane number of a raster image, which is an original image, and after that, increasing the reduced bit-plane number of the raster image to the number equal to or less than the bit-plane number of the original image, comprising: a first image processing step for performing multi-valued dither processing with the use of a two-dimensional dither matrix when reducing the bit-plane number of the raster image; and a second image processing step for performing bit addition processing based on the two-dimensional dither matrix used during the first image processing step when increasing the bit-plane number of the raster image which has undergone the first image processing step.

8-3: An image processing method for reducing the bit-plane number of a raster image, which is an original image, and after that, increasing the reduced bit-plane number of the raster image to the number equal to or less than the bit-plane number of the original image, comprising: a first image processing step for performing multi-valued dither processing with the use of a two-dimensional dither matrix when reducing the bit-plane number of the raster image; and a second image processing step for performing frame rate control to periodically change tones based on the two-dimensional dither matrix used during the first image processing step when increasing the bit-plane number of the raster image which has undergone the first image processing step.

8-4: An image processing method for reducing the bit-plane number of a raster image, which is an original image, and after that, increasing the reduced bit-plane number of the raster image to the number equal to or less than the bit-plane number of the original image, comprising: a first image processing step for performing multi-valued dither processing with the use of a two-dimensional dither matrix when reducing the bit-plane number of the raster image; and a second image processing step for performing bit addition processing based on the two-dimensional dither matrix used during the first image processing step when increasing the bit-plane number of the raster image which has undergone the first image processing step, and adding an offset value in order that the difference between the signal value of the original image and the average of all the dither values of the raster image whose bit-plane number has been increased will be the minimum.

Preferably, in any image processing method according to the eighth aspect of the present invention, the raster image whose bit-plane number has been reduced is transmitted via a transmission bus having a bus width less than the bit-plane number of the original image. In addition, it is desirable that the image processing method should further comprise a step for storing the first raster image whose bit-plane number has been reduced at the first image processing step in a storage after the first image processing step, and the raster image stored in the storage should be read out to increase its bit-plane number at the second image processing step. It is also desirable that the raster image should be an RGB color image having the same number of bit-planes with respect to each color of R, G and B signals, and the largest reduction should be made in the bit-plane number of the B signal while the smallest reduction should be made in the bit-plane number of the G signal.

In accordance with the eighth aspect of the present invention, the bit-plane number of a raster image, which is an original image, is reduced at the first image processing step, and after that, the reduced bit-plane number is increased at the second image processing step. Thus, it is possible to compress and decompress a bitmap image transmitted to a display with less logic elements, thereby enabling reductions in memory capacity and transmission capacity.

Besides, in the aforementioned image processing methods 8-2 to 8-4, multi-valued dither processing is performed with the use of a two-dimensional dither matrix when reducing the bit-plane number of a raster image, and bit addition processing is performed based on the two-dimensional dither matrix which has been used for the multi-valued dither processing when increasing the reduced bit-plane number of the raster image. Consequently, there is a smaller difference between the image which has undergone the bit addition processing and the original image as compared to the multi-valued dither method. Thereby, it is possible to suppress a grainy feeling and pseudo colors seen in the case where there is a large difference between the two images, and realize high quality image display.

In accordance with the ninth aspect of the present invention, to achieve the above objects, there is provided an image processing method by which it can be determined whether to directly output a raster image being an original image, or to output an image whose bit-plane number has been reduced/increased or which has been compressed/decompressed.

The image processing method according to the ninth aspect of the present invention is one selected from the following image processing methods 9-1 to 9-3.

9-1: An image processing method for reducing the bit-plane number of a first raster image, which is an original image, and after that, producing a second raster image by increasing the reduced bit-plane number of the raster image to the number equal to or less than the bit-plane number of the original image, comprising: a selecting step for selecting either the first raster image or the second raster image to output the selected image; a first image processing step for performing multi-valued dither processing with the use of a two-dimensional dither matrix when reducing the bit-plane number of the first raster image; a second image processing step for performing bit addition processing based on the two-dimensional dither matrix used during the first image processing step when increasing the bit-plane number of the raster image which has undergone the first image processing step; and an outputting step for outputting either the first raster image or the second raster image selected at the selecting step.

9-2: An image processing method for reducing the bit-plane number of a first raster image, which is an original image, and after that, producing a second raster image by increasing the reduced bit-plane number of the raster image to the number equal to or less than the bit-plane number of the original image, comprising: a selecting step for selecting either the first raster image or the second raster image to output the selected image; a first image processing step for performing multi-valued dither processing with the use of a two-dimensional dither matrix when reducing the bit-plane number of the first raster image; a second image processing step for performing bit addition processing based on the two-dimensional dither matrix used during the first image processing step when increasing the bit-plane number of the raster image which has undergone the first image processing step, and adding an offset value in order that the difference between the signal value of the original image and the average of all the dither values of the raster image whose bit-plane number has been increased will be the minimum; and an outputting step for outputting either the first raster image or the second raster image selected at the selecting step.

9-3: An image processing method for compressing data of a first raster image, which is an original image, and after that, producing a second raster image by decompressing the compressed data of the raster image, comprising: a selecting step for selecting either the first raster image or the second raster image to output the selected image; a first image processing step for compressing the first raster image; a second image processing step for decompressing the data compressed at the first image processing step to produce the second raster image; and an outputting step for outputting either the first raster image or the second raster image selected at the selecting step.

Preferably, in the aforementioned image processing methods 9-1 and 9-2, the first and second raster images are RGB color images each having the same bit-plane number with respect to each color of R, G and B signals, and the largest reduction is made in the bit-plane number of the B signal while the smallest reduction is made in the bit-plane number of the G signal.

Besides, it is desirable that any image processing method according to the ninth aspect of the present invention should further comprise a storing step after the first image processing step for storing data of the raster image obtained at the first image processing step in a storage, and the data of the raster image stored in the storage should be read out to carry out the image processing at the second image processing step. In addition, it is more desirable that the image processing method should further comprise a step for compressing the data of the raster image obtained at the first image processing step into equal to or less than the capacity of the storage when the amount of the data of the raster image obtained at the first image processing step exceeds the capacity of the storage before the storing step. Preferably, at the selecting step, the second raster image is selected when the original image is a still image, while the first raster image is selected when the original image is a moving image. Further, it is desirable that the image processing method should further comprise a processing stopping step after the selecting step for stopping the image processing of the first image processing step and the second image processing step when the first raster image is selected at the selecting step. Preferably, at the first image processing step and the second image processing step, the image processing is carried out so that the maximum value and minimum value of components of the second raster image match those of the first raster image, respectively.

In accordance with the ninth aspect of the present invention, for example, the raster image is directly output when the original image is a moving image, and an image whose bit-plane number has been reduced/increased or which has been compressed/decompressed is output when the original image is a still image. Consequently, it is possible to display an image without the intervention of the storage (e.g. a memory) when a moving image is being displayed.

That is, an apparatus that employs the image processing method of the ninth aspect of the present invention reduces/increases the bit-plane number and compresses/decompresses an image only if necessary, and stops the operation of the storage, etc. when these processes are not required (e.g. when a moving image is being displayed). Thereby, it is possible to reduce electric power consumption.

In accordance with the tenth aspect of the present invention, to achieve the above objects, there is provided an image processing method by which data for displaying an input image is stored in a storage, and the image is displayed on a prescribed display based on the data read out of the storage, comprising: a first image processing step for compressing at least one layer of a first raster image to produce a compressed layer(s) when the amount of data of a signal for displaying the first raster image, which has been divided into two or more layers when input, exceeds the capacity of the storage; a step for storing the compressed layer(s) and uncompressed layer (s) of the first raster image in the storage; a second image processing step for reading out the compressed layer(s) stored in the storage to decompress the compressed layer(s), and combining the decompressed layer(s) with the uncompressed layer(s) of the first raster image read out of the storage to generate a signal for displaying a second raster image; and a step for outputting the signal for displaying the second raster image to the display.

It is desirable that the aforementioned image processing method according to the tenth aspect of the present invention should further comprise a selecting step before the first image processing step for determining whether to store the signal in the storage without compression or to store the signal in the storage after compressing at least one layer when the amount of data of a signal for displaying the first raster image is within the capacity of the storage, and, in the case where it has been determined at the selecting step that at least one layer is to be compressed, the image processing is also carried out for the first raster image with the amount of data within the capacity of the storage at the first image processing step. Preferably, the image processing method further comprises an output switching step for selecting either a signal for displaying the first raster image or a signal for displaying the second raster image on the display to output the selected signal at the beginning, and, more preferably, further comprises a processing stopping step after the output switching step for stopping the image processing of the first image processing step and the second image processing step when the first raster image is selected at the output switching step. Moreover, it is desirable that the image processing is performed so that the maximum value and minimum value of components of the second raster image match those of the first raster image, respectively, at the first and second image processing steps.

In accordance with the tenth aspect of the present invention, at least one layer of an original image is compressed and decompressed in the case where a raster image, which has been divided into two or more layers when input, cannot be stored in the storage in its original form. Therefore, an input original image can be stored in the storage regardless of the amount of data or the size of the original image. That is, an apparatus that employs the image processing method of the tenth aspect of the present invention can produce the second raster image and output the image to the display regardless of the amount of data of the original image.

For example, when the image processing method of the tenth aspect is applied to the display for image processing, it is possible to provide a superimpose display without requiring more memory capacity by compressing and decompressing a natural image by 1 bit and using the obtained 1 bit for text information.

In accordance with the eleventh aspect of the present invention, to achieve the above objects, there is provided an image processing method for compressing and decompressing an original image in the case where an input raster image cannot be stored in a storage or displayed on a display in its original form.

The image processing method according to the eleventh aspect of the present invention is the following image processing method 11-1 or 11-2.

11-1: An image processing method by which input image data is stored in a storage, and an image is displayed on a prescribed display based on the image data read out of the storage, comprising: a first image processing step for compressing a first raster image, which is an original image, to produce a compressed raster image when the amount of data of the first raster image exceeds the capacity of the storage; a step for storing the compressed raster image in the storage; a second image processing step for reading out the compressed raster image stored in the storage, and decompressing the compressed raster image to produce a second raster image; and a step for outputting the second raster image to the display.

11-2: An image processing method by which input image data is stored in a storage, and an image is displayed on a prescribed display based on the image data read out of the storage, comprising: a first image processing step for compressing a first raster image, which is an original image, to produce a compressed raster image when the first raster image is larger than the largest image that the display can display; a step for storing the compressed raster image in the storage; a second image processing step for reading the compressed raster image out of the storage, and decompressing the compressed raster image to produce a second raster image; and a step for outputting the second raster image to the display.

Preferably, the aforementioned image processing method 11-1 further comprises a selecting step before the first image processing step for determining whether to store the first raster image in the storage without compression or to store the raster image after compressing it when the amount of data of the first raster image is within the capacity of the storage, and, in the case where it has been determined at the selecting step that the first raster image is to be compressed, the image processing is also carried out for the first raster image with the amount of data within the capacity of the storage at the first image processing step.

Besides, it is desirable that the aforementioned image processing method 11-2 should further comprise a selecting step before the first image processing step for determining whether to store the first raster image in the storage without compression or to store the raster image after compressing it when the first raster image is equal to or smaller than the largest image that the display can display, and, in the case where it has been determined at the selecting step that the first raster image is to be compressed, the image processing is also carried out for the first raster image which is equal to or smaller than the largest image that the display can display at the first image processing step.

Preferably, any image processing method according to the eleventh aspect of the present invention further comprises an output switching step for selecting either the first raster image or the second raster image to output the selected image to the display at the beginning, and, more preferably, further comprises a processing stopping step after the output switching step for stopping the image processing of the first image processing step and the second image processing step when the first raster image is selected at the output switching step.

In accordance with the eleventh aspect of the present invention, an original image is compressed and decompressed in the case where an input raster image cannot be stored in the storage or displayed on the display in its original form. Therefore, an input original image can be stored in the storage regardless of the amount of data or the size of the original image. That is, an apparatus that employs the image processing method of the eleventh aspect of the present invention can produce the second raster image and output the image to the display regardless of the amount of data or the size of the original image.

Additionally, in the case of displaying a large image such as a map, which is beyond the maximum resolution of the display, less memory capacity is required to store the image by decreasing and increasing the bit-plane number. Thereby, it is possible to scroll through the image on the display without reacquisition of the image from outside, which reduces electric power consumption. Furthermore, an image with the amount of data beyond the capacity of the storage, such as a map, is stored in the storage by compressing the image. Thus, it is possible to display the image on the display without reacquisition of the image from outside.

In accordance with the twelfth aspect of the present invention, to achieve the above objects, there is provided an image processing method applied to an image transmission apparatus in which a raster image being an original image is transmitted from a first unit to a second unit, comprising: a first image processing step for performing multi-valued dither processing by the first unit with the use of a two-dimensional dither matrix for the raster image, which is an original image; a transmitting step for transmitting the raster image whose bit-plane number has been reduced at the first image processing step to the second unit; and the second image processing step for performing bit addition processing by the second unit based on the two-dimensional dither matrix used for the multi-valued dither processing so that the bit-plane number of the raster image transmitted from the first unit matches the bit-plane number of the original image.

In accordance with the twelfth aspect of the present invention, the raster image whose bit-plane number has been reduced is transmitted at the transmitting step. Thereby, it is possible to improve the capacity of transmission. More specifically, multi-valued dither processing is performed with the use of a two-dimensional dither matrix for a raster image, which is an original image, so as to transmit the raster image whose bit-plane number has been reduced, and after that, bit addition processing is performed based on the two-dimensional dither matrix used for the multi-valued dither processing so that the bit-plane number of the raster image matches the bit-plane number of the original image. Thus, it is possible to improve the capacity of transmission.

Consequently, for example, in the case of transmitting an RGB raster image with 6 bits per color component (18 bits in total) via a transmission bus having a bus width of 16 bits, the raster image is compressed by reducing the bit-plane number. Thus, data can be transmitted in parallel.

BRIEF DESCRIPTION OF THE DRAWINGS

FIG. 3 is a list showing input signals and output signals in the second embodiment of the present invention.

FIG. 4 is a list showing input signals and output signals in the second embodiment of the present invention.

FIG. 5 is a list showing input signals and output signals in the second embodiment of the present invention.

FIG. 8 is a chart illustrating a method for generating output signals from a threshold value generator depicted in FIG. 7.

FIG. 9 is a diagram showing a frame format of processing in an image processing former stage depicted in FIG. 7.

FIG. 11 is a block diagram showing another configuration of the image processing former stage depicted in FIG. 7.

FIG. 15 is a block diagram showing the configuration of an image processing apparatus according to the third embodiment of the present invention.

FIG. 16 is a block diagram showing another configuration of the image processing apparatus according to the third embodiment of the present invention.

FIG. 18 is a circuit diagram showing the internal configuration of a bit addition section depicted in FIG. 17.

FIG. 19 is a list showing input signals and output signals in the fourth embodiment of the present invention.

FIG. 21 is a list showing input signals and output signals in the fourth embodiment of the present invention.

FIG. 22 is a chart illustrating changes in gray levels carried out by a gray level controller depicted in FIG. 17 based on the types of input signals.

FIG. 24 is a list showing input signals and output signals of the B component in the fifth embodiment of the present invention.

FIG. 25 is a list showing input signals and output signals of the B component in the fifth embodiment of the present invention.

FIG. 26 is a list showing input signals and output signals of the B component in the fifth embodiment of the present invention.

FIG. 28 shows lists illustrating input/output signals of a threshold value generator depicted in FIG. 27.

FIG. 31 is a state transition diagram showing transitions in a 2-bit counter depicted in FIG. 30.

FIG. 32 is a list illustrating input/output signals of a carry generator depicted in FIG. 30.

FIG. 33 is a list showing input signals and output signals in the sixth embodiment of the present invention.

FIG. 34 is a list showing input signals and output signals in the sixth embodiment of the present invention.

FIG. 35 is a list showing input signals and output signals in the sixth embodiment of the present invention.

Figure 1:
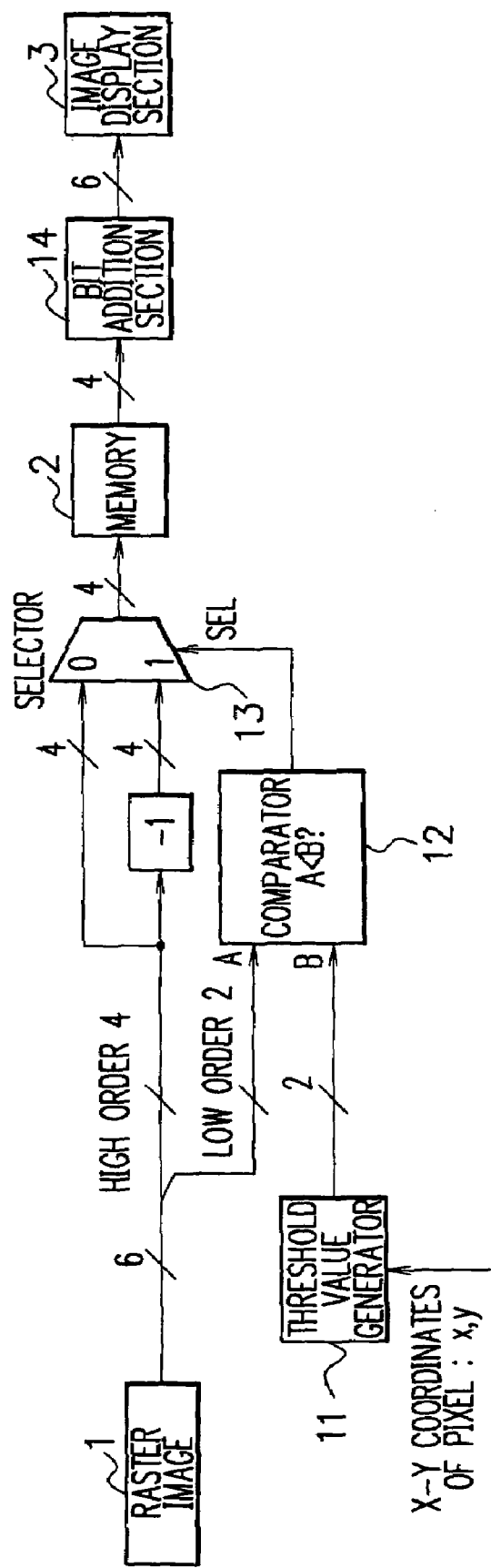
FIG. 1 is a block diagram showing a conventional image processing apparatus.
Figure 2:
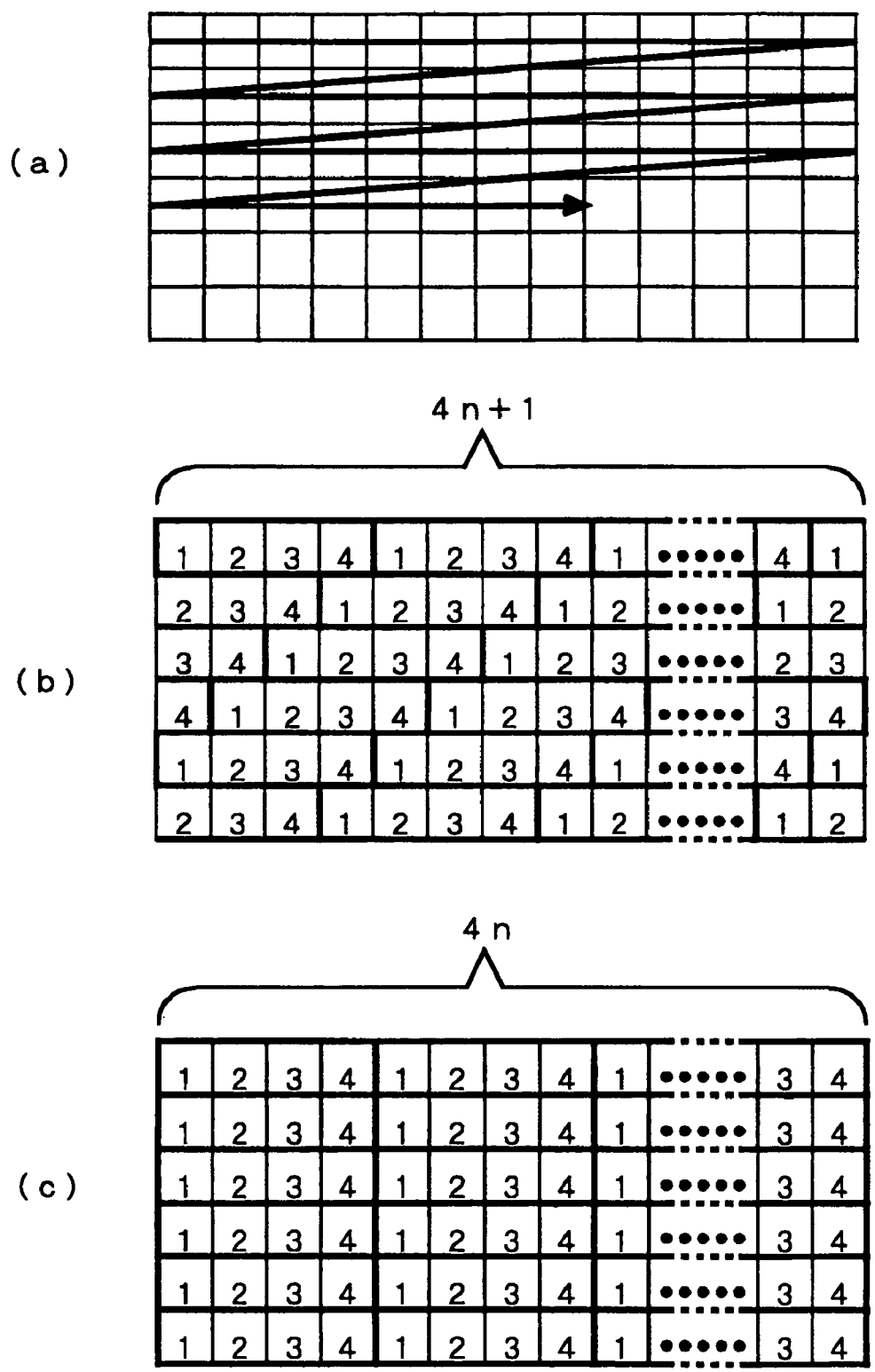
FIG. 2 shows charts illustrating problems which arises when the invention described in Japanese Patent Publication No. HEI2-8493(B) is applied to image processing.

Incidentally, the reference numeral 1 represents a raster image. The reference numeral 1A represents a raster image (image). The reference numeral 1B represents a raster image (text information). The reference numeral 2 represents a memory for storing display images. The reference numerals 3 and 3A represent image display sections. The reference numeral 4 represents an image processing former stage. The reference numeral 4A represents a compressor. The reference numeral 5 represents an image processing latter stage. The reference numeral 5A represents a decompressor. The reference numeral 6 represents a memory use switch controller. The reference numeral 7 represents a raster image transmitting end (a first unit). The reference numeral 8 represents a raster image receiving end (a second unit). The reference numeral 9 represents an FRC image processing latter stage. The reference numeral 10 represents a liquid crystal display section. The reference numerals 11, 11A and 11B represent threshold value generators. The reference numeral 12 represents a comparator. The reference numerals 13, 13A, 13B, 13C, 13D and 51 represent selectors. The reference numerals 14 and 14A represent bit addition sections. The reference numerals 15 and 52 represent demultiplexers. The reference numeral 16 represents an input/output switch controller. The reference numeral 17 represents an adder. The reference numeral 18 represents a quantizer. The reference numeral 19 represents a counter. The reference numeral 20 represents a carry generator. The reference numerals 21A and 21B represent sift registers. The reference numeral 22 represents a data register. The reference numeral 23 represents a latch. The reference numeral 24 represents a D/A converter. The reference numeral 25 represents a data line selector. The reference numeral 26 represents a memory controller. The reference numeral 27 represents a memory input signal switch controller. The reference numeral 28 represents an image compositor. The reference numeral 29 represents a control signal. The reference numeral 31 represents a picture element (pixel). The reference numeral 32 represents a thin film transistor. The reference numeral 33 represents a data line. The reference numeral 34 represents a gate line. The reference numeral 50 represents a bit-plane number reduction controller.

BEST MODE FOR CARRYING OUT THE INVENTION

In accordance with the principles of the present invention, for an image the bit-plane number of which has been reduced by performing noise addition processing known as dithering, reverse processing to the noise addition processing is carried out to increase the bit-plane number of the image, thereby minimizing difference components which have heretofore arisen by the addition of a dither noise. By this means, it is possible to suppress a grainy feeling and pseudo colors.

As an example, consider a case where a 6-bit signal is converted into a 4-bit signal by multi-valued dither processing, and then the 4-bit signal is expanded into a 6-bit signal. In this case, if a dither matrix used in the multi-valued dither processing is based on an ordered dithering, 6−4=2 bits of dither need to be added. Therefore, any of dither components or numbers expressed in binary form, 00, 01, 10, and 11 is added to an input signal. The multi-valued dither processing can be expressed by the following formula:

$$Y = int((X-D)/4)$$

where X is the input 6-bit signal, D the dither component, and int (X) the integer portion of X. Additionally, the division by 4 is corresponding to the conversion from 6 bits to 4 bits. When an input signal value is, for example, 37 (100101 in binary form), it is converted into 9 (1001) by the multi-valued dither processing when the dither component is 00, into 9 (1001) when the dither component is 01, into 8 (1000) when the dither component is 10, and into 8 (1000) when the dither component is 11.

Next, the 4-bit signal is expanded into a 6-bit signal. The conversion into the 6-bit signal can be shown by the following formula:

$$Z = 4 \times Y + D + 2$$

Here, if a constant 2 is removed, then $Y=(Z-D)/4$ is formed, which shows that the expansion is inverse processing to the multi-valued dither processing. When the aforementioned input signal of signal value 37 (100101 in binary form) is converted based on the above conversion formula, the signal is converted into 38 (100110) when the dither component is 00, into 39 (100111) when the dither component is 01, into 36 (100100) when the dither component is 10, and into 37 (100101) when the dither component is 11. The constant 2 in the conversion formula is an offset value which is added so that the average of the converted signals can be a value that is closest to the input signal.

By way of comparison, when 4 to 6 bits conversion is carried out making use of multi-valued dithering according to the conventional conversion technique, the input signal is converted into 38 (100110) when the dither component is 00, into 38 (100110) when the dither component is 01, into 34 (100010) when the dither component is 10, and into 34 (100010) when the dither component is 11 since the component of high order 2 bits of 4 bits is attached as low order 2 bits.

From this it is to be understood that, according to the conversion processing of the present invention, the converted signals are close in value to the input signal on the whole. That is, according to the present invention, it is possible to suppress a grainy feeling and pseudo colors.

Incidentally, a description has been made of a case where a 6-bit signal of a raster image is converted into a 4-bit signal, and then the 4-bit signal is expanded into a 6-bit signal by way of example and without limitation. The 4-bit signal may be expanded into a 5-bit signal. In this case, the operation is performed with the use of a high order bit of the respective dither components. More specifically, the operation as $Z=2 \times Y+\text{int}(D/2)+1$ is carried out. With this construction, it is possible to suppress a grainy feeling and pseudo colors in the raster image even when the 4-bit signal is expanded into a 5-bit signal.

Besides, in this multi-valued dither processing, quantization is carries out after subtracting a dither value, and then the dither value is added. By adding the dither value, the difference or variation is the minimum in the vicinity of "white" display, which is at the highest gray level. That is, as can be seen in FIGS. 3 to 5, since all the outputs larger or higher in gray level than a value which indicates "white" (gray level 63 in FIGS. 3 to 5) are made to indicate "white" due to the addition of the dither value, the difference is the minimum in the vicinity of "white" of all tones. By virtue of this construction, the difference is minimized in the vicinity of "white" display, which is on the highest gray level, thereby reducing a grainy feeling peculiar to dithering, and suppressing gray level distortion or alleviating the shortage of tones in the vicinity of "white" display.

In characters or a geometrical figure like a map, such colors as "red", "blue", "green" and "yellow", some of whose signal components are of the highest gray level, as well as "white", all of whose signal components are at the highest gray level, are often in heavy usage. According to the present invention, the display quality of such image is improved. This is the novel and characteristic aspect or effect of the present invention, which cannot be achieved by the first prior art.

Besides, in accordance with the present invention, the quality of images can be improved by performing processes as simple as the multi-valued dithering with respect to each picture element (pixel).

As for the signal structure or component of a raster image according to the present invention, in addition to the aforementioned RGB signal, a variety of signals such as a YCbCr signal composed of a brightness signal and a color signal, and HSV, LCH signals, etc. composed of hue, saturation, brightness signals are applicable.

While the multi-valued dithering has been described as an example of image processing, one is not limited to using this. In fact, one could use any other image processing so long as the above-mentioned effects can be achieved. In particular, such image processing method as involving image processing performed in reverse ways when increasing and reducing the bit-plane number is effective.

Referring now to the drawings, a description will be presented in detail of embodiments of an image processing apparatus, an image transmission apparatus and an image processing method in accordance with the present invention. The embodiments of the image processing apparatus, the image transmission apparatus and the image processing method of the present invention are illustrated in FIGS. 6 to 47.

FIRST EMBODIMENT

Figure 6:
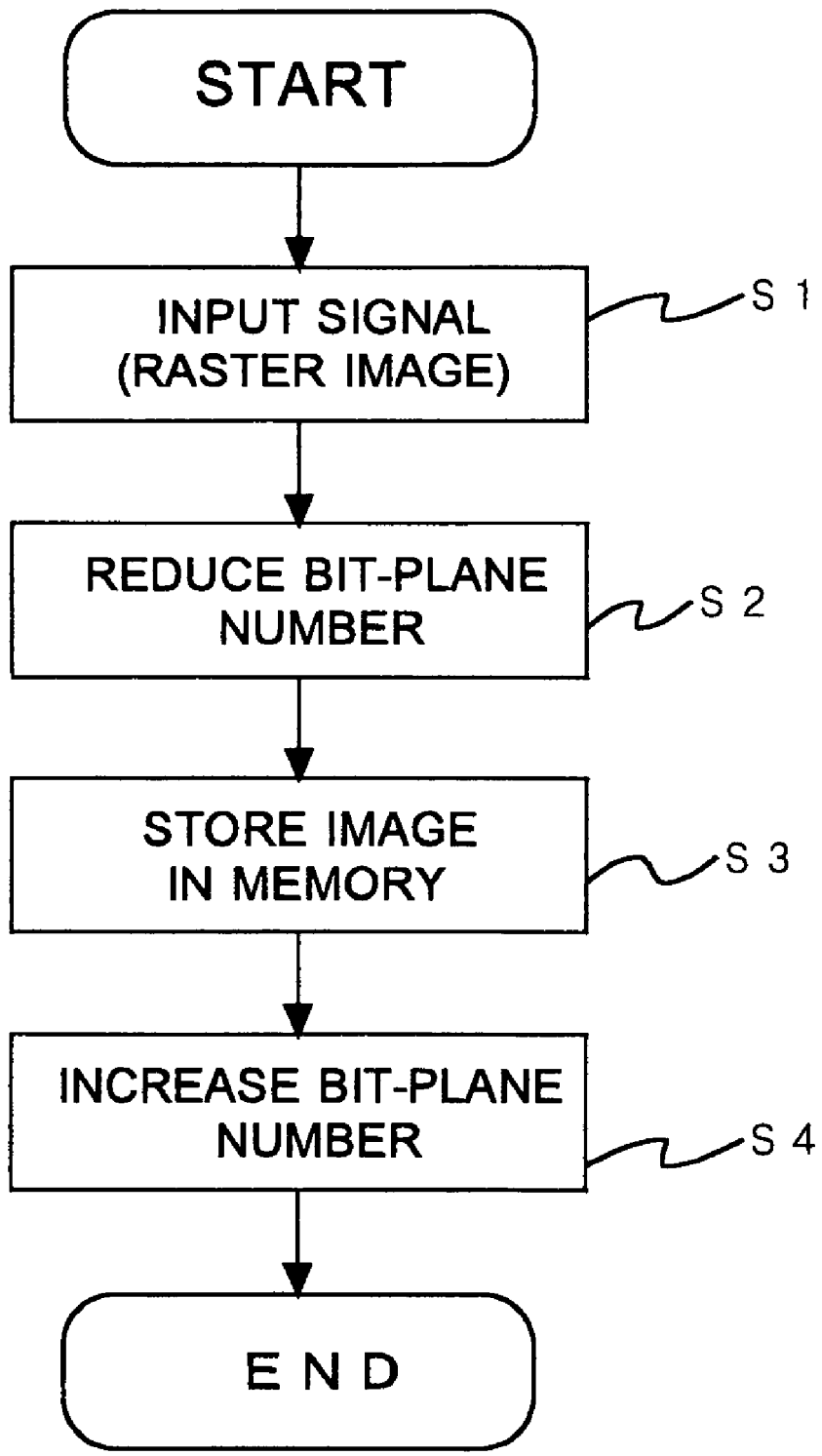
FIG. 6 is a flow chart showing the flow of processing according to an image processing method of the first embodiment of the present invention.

FIG. 6 is a flow chart showing the flow of processing according to the image processing method of the first embodiment of the present invention.

In the following, the image processing method according to this embodiment will be described. When a raster image is input into an image processing apparatus (step S1), the bit-plane number of the input raster image is reduced (step S2). The raster image whose bit-plane number has been reduced is stored in a memory or the like (step S3). After that, the raster image stored in the memory is read out, and the bit-plane number of the raster image is increased (step S4).

On this occasion, it is preferable to perform the processing for reducing and increasing the bit-plane number with less logic elements. More specifically, it is desirable that the image processing should involve a sufficiently small number of logic elements as compared to the number of logic elements (the number of transistors, cells, etc.) of the memory, which can be reduced by the processing. Generally, the processing for reducing and increasing the bit-plane number requires the small number of logic elements, and therefore, the bit-plane number can be suitably reduced/increased. As a process for reducing the bit-plane number, there is cited as an example "bit dropping", that is, "truncation of specific bits". In this case, calculation or computing is not necessary.

According to the above-described image processing method, it is made possible to reduce the memory capacity that is required in image display processing. Moreover, the bit-number reduction/addition is carried out at a constant data compression rate ((amount of data before compression−amount of data after compression)/amount of data before compression). Consequently, it is possible to facilitate various types of image processing in an image processing apparatus (a display system), which compresses data of an original image to store the image data in a memory, and decompresses the stored image data to display the image.

In this embodiment, a description has been made of a case where the process for storing data of the raster image in the memory is performed between the processes for reducing and increasing the bit-plane number by way of example and without limitation. The data of a raster image may be transmitted via a transmission bus having a prescribed bus width instead of storing the data of the raster image in the memory.

As an example, consider that a transmission bus between an operation section or part for reducing the bit-plane number and an operation section for increasing the bit-plane number does not have a width sufficient to transmit a raster image in its original form. In this case, the bit-plane number of the raster image is reduced to the number within the capacity of the transmission bus, and the raster image whose bit-plane number has been reduced is transmitted. After that, the bit-plane number of the raster image is increased by bit addition processing, and then the image is output to an image display section or the like. Thus, the raster image can be displayed on the image display section.

As just described, according to the image processing method by which the bit-plane number is reduced and increased when a raster image cannot be treated in its original form, it is possible to achieve effects as set out above.

Besides, while several examples of methods for reducing and increasing the bit-plane number will hereinafter be described in other embodiments of the present invention, it is desirable to employ dithering for reducing the bit-plane number, and to perform inverse processing to the dithering for increasing the bit-plane number because images can be compressed/decompressed with less deterioration in image quality.

SECOND EMBODIMENT

Figure 7:
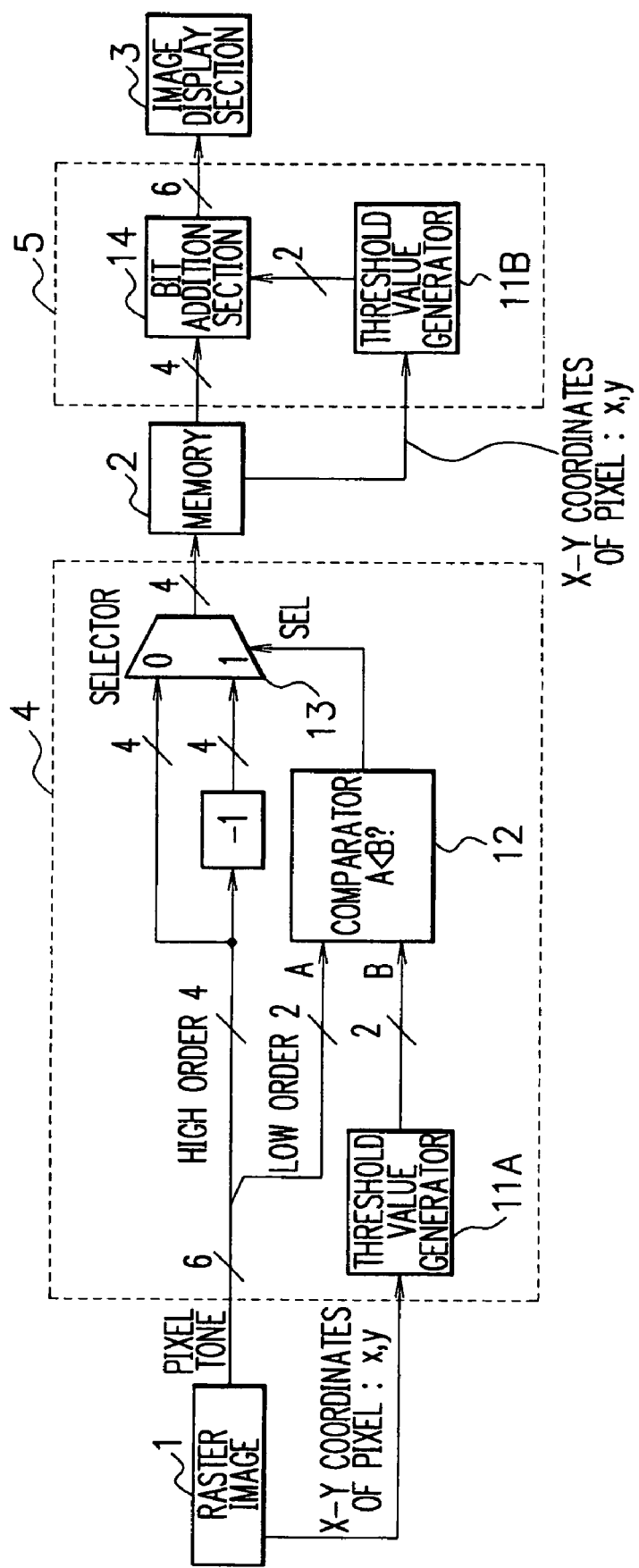
FIG. 7 is a block diagram schematically showing the configuration of an image processing apparatus according to the second embodiment of the present invention.

FIG. 7 is a block diagram schematically showing the configuration of an image processing apparatus according to the second embodiment of the present invention. Referring to FIG. 7, an RGB raster image 1 with 6 bits per color component output from a computer is processed in an image processing former stage 4. Subsequently, a raster image with 4 bits per color component is stored in a memory 2. After that, the stored raster image with 4 bits per color component is converted into an image with 6 bits per color component in an image processing latter stage 5, and the image is output to an image display section 3 capable of 6-bit display. Incidentally, FIG. 7 shows a block configuration for one color of R, G and B, and the image processing apparatus has the same configurations for the other two colors in parallel.

The image processing former stage 4 comprises a threshold value generator 11A, a comparator 12, a selector 13 and a subtracter. Low order 2 bits of 6-bit gray level data of the input raster image 1 are sent to the comparator 12, and compared with a 2-bit signal output from the threshold value generator 11A in the comparator 12.

FIG. 8 is a chart illustrating a method for generating output signals from the threshold value generator.

Here, a dither matrix based on ordered dithering is utilized as threshold values. The threshold value generator 11A generates an output signal based on X-Y coordinate values (x, y) of an input pixel. In FIG. 8, [x mod 2] indicates the remainder when an X coordinate value (x) of the pixel is divided by 2, while [y mod 2] indicates the remainder when a Y coordinate value (y) of the pixel is divided by 2. An output value is obtained according to these [x mod 2] and [y mod 2].

When A<B, where the value of the low order 2 bits of 6-bit gray level data of the input raster image 1 is A, and the output value of the threshold value generator 11A is B, the comparator 12 outputs "1", and otherwise, the comparator 12 outputs "0" as a SEL signal to the selector 13. The SEL signal is a select signal of the selector 13.

The value of high order 4 bits of 6-bit gray level data of the input raster image 1 and a value obtained by subtracting 1 therefrom by the subtracter are input into the selector 13. The selector 13 directory outputs the value of the high order 4 bits when the SEL signal output from the comparator 12 is "0", while the selector 13 outputs the value obtained from the subtracter when the SEL signal is "1". Thus, a 4-bit output signal of the image processing former stage 4 is obtained.

FIG. 9 is a diagram showing a frame format of processing in the image processing former stage.

In FIG. 9, input 6-bit gray level data indicated on the left side by the vertical axis are converted into output 4-bit gray level data indicated on the left side with respect to each pixel (pixel position) indicated by the horizontal axes. For example, "♦" in the leftmost pixel position indicates that an input gray level is "011110". Since the value is in between threshold values "011111" and "011011", it is rounded up or down to a value indicated by a horizontal line between them. On the other hand, "■" indicates output gray level, and in this case, output gray level is "0110". The above-described processing is performed with respect to each pixel position, to thereby convert the 6-bit gray level data of the raster image 1 into 4-bit output gray level.

Incidentally, in the case where an input gray level value is the same as a threshold value, the input value is converted into a 4-bit value that is larger than and closest to the threshold value. In other words, in the case where an input gray level value is the same as a threshold value, one of 4-bit gray level values over the threshold value in the drawing, which is closest to the threshold value, is selected as an output gray level value.

In FIG. 9, in the image processing former stage 4, 6-bit gray level data is converted into 4-bit gray level data based on thresholds which vary according to the X-Y coordinate values (x, y) of an input pixel. By converting 6 bits per color component into 4 bits per color component, the bit-plane number of a raster image is reduced, and the raster image is stored in the memory 2.

The raster image with less bit-plane number stored in the memory 2 is converted into an image with 6 bits per color component in the image processing latter stage 5, and sent to the image display section 3. The image processing latter stage 5 comprises a bit addition section 14 and a threshold value generator 11B. The threshold value generator 11B is of the same construction as the threshold value generator 11A.

Figure 10:
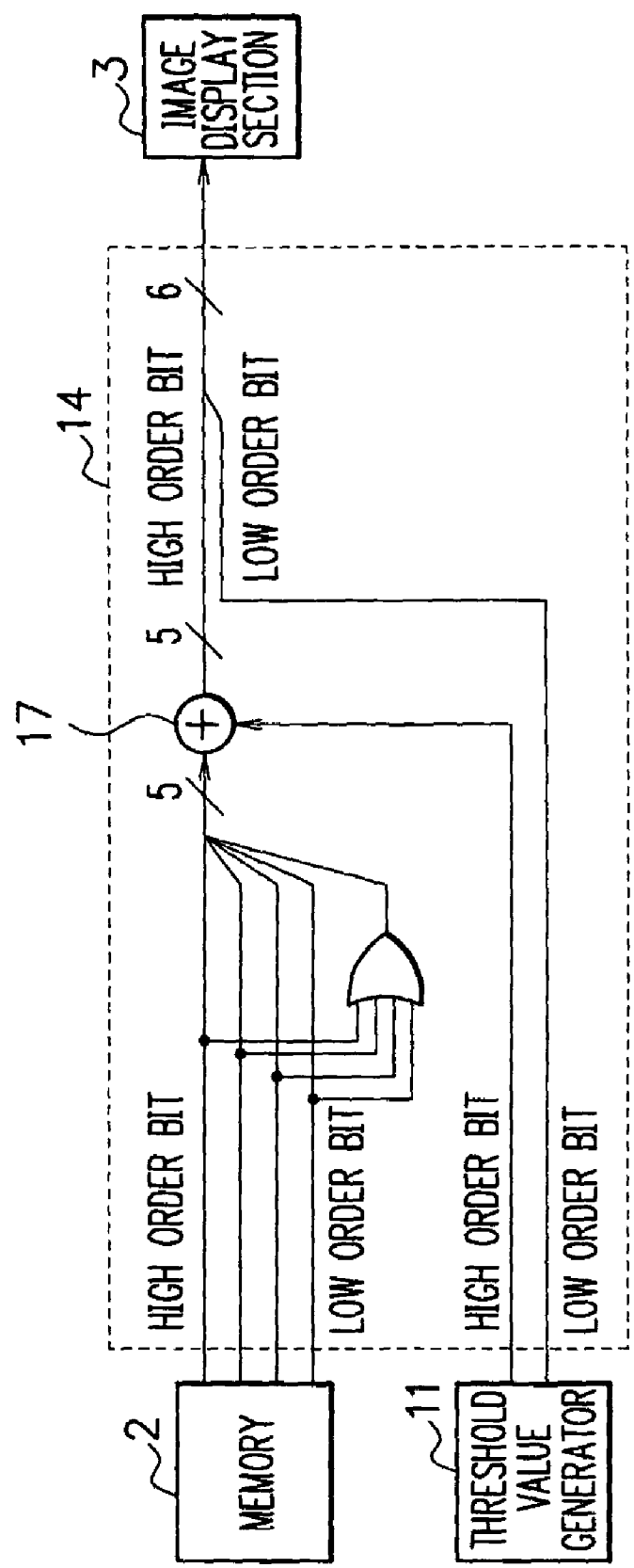
FIG. 10 is a circuit diagram showing the internal configuration of a bit addition section depicted in FIG. 7.

FIG. 10 is a circuit diagram showing the internal configuration of the bit addition section.

The bit addition section 14 attaches a value obtained by applying OR logic to a 4-bit signal output from the memory 2 as a low order bit to the 4-bit signal to produces a 5-bit signal. After that, the bit addition section 14 adds a high order bit of 2 bits output from the threshold value generator 11B by an adder 17. In addition, the bit addition section 14 attaches a low order bit output from the threshold value generator 11B to the 5-bit signal as high order bits obtained from the adder 17 to produce a 6-bit signal. Thus, the 6-bit signal is sent to the image display section.

A concrete example will be given. In the case where a memory signal is 1000 and a threshold value signal is 11, a 5-bit signal input to the adder 17 is 10001 and a 1-bit signal is 1. Therefore, the output of the adder 17 is 10010. When attaching a low order bit signal 1 of the threshold value signal to the output value, then 6-bit output signal is 100101.

Here, a value obtained by applying OR logic to the 4-bit signal is attached as a low order bit to the 4-bit signal in order to minimize the difference between an input signal and an output signal. FIGS. 3 to 5 are lists showing input signals, signals (4-bit value) stored in the memory 2 based on the output value of the threshold value generator, and output signals (6-bit value).

In the drawings, respective input signals and the signal values of the threshold value generator are expressed in decimal numbers. Each signal stored in the memory indicates a 4-bit gray level value expressed in a decimal number, and each output signal indicates a 6-bit gray level value expressed in a decimal number.

As can be seen in the drawings, when an input signal is equal to or larger than 7, the maximum difference is 2, while when an input signal is 6 or less, the maximum difference is 3. Besides, FIGS. 3 to 5 also shows output signals, average output signal values corresponding to respective input signals, differences between the respective average values and input signal values, and standard deviations in the output signals by multi-valued dithering (prior art).

The less difference between the average value and the input signal value, the less variations are produced in colors and brightness, thereby showing excellent tone reproduction. That is, as the standard deviation becomes smaller on the whole, a grainy feeling is lessened. In comparison with the difference between the average value and input signal value according to the prior art, the difference between those of the present invention is substantially improved. The standard deviation is reduced in almost all gray levels, and is a stably low value. From this it is to be understood that, according to the present invention, color differences and a grainy feeling, which are produced by the prior art, can be suppressed.

Incidentally, if the output of the threshold value generator 11 as low order 2 bits is combined with the output of the memory 2 as high order 4 bits into 6 bits without implementing OR operation for the 4-bit signal, then the difference between the average value and the input signal value is −1.5. Consequently, more variations are shown in colors and brightness as compared to the case of applying OR. Nevertheless, the difference between the two values is made smaller with regard to input signals 2 to 40 as compared to the prior art.

Besides, referring to FIGS. 3 to 5, the same signals are stored in the memory for respective input signals 0 to 3, and, therefore, the same signals are output. If it is required to produce distinct shades on a gray scale corresponding to the respective input signals, the gray level conversion of the input signals is usable. The gray level conversion of the input signals means the conversion of the input signals, for example, as follows:

(new input signal)=$INT$((input signal before conversion)×60/63+3))

where INT (A) is the integer portion of A.

Further, it is desired that the highest gray level and the lowest gray level with respect to each of all dither values after the above-described processing should be the same as before. This can be realized by setting the condition where, for example, when a signal value stored in the memory is 0, the dither value is not to be added to the output value in addition to the aforementioned gray level conversion of the input signal. It is obvious that any other processing method can be employed so long as the aforementioned conditions are satisfied.

Still further, while the image processing former stage 4 has been described as including the comparator 12 and the selector 13, it may be implemented by a subtracter and a quantizer 18 as shown in FIG. 11 to obtain the same output. The quantizer 18 has a function for directly outputting high order 4 bits of 6 bits of an input.

Concerning a series of processing of the image processing former stage 4 and the image processing latter stage 5, as can be seen in FIGS. 10 and 11, a value reduced by the output of the threshold value generator 11A in the image processing former stage 4 is increased in the image processing latter stage 5. By minimizing effects on image quality resulting from dithering, it is possible to suppress a grainy feeling and pseudo colors.

Incidentally, in this embodiment, ordered dithering is utilized in the threshold value generator by way of example and without limitation. More specifically, the above-mentioned effects can be achieved with the use of a two-dimensional dither matrix, by which the same pattern is repeated for a micro-length as one cycle in both vertical and horizontal directions of an image. As the cycle of the dither matrices becomes smaller, the frequency of cyclic noise gets higher, and the noise is made virtually imperceptible. For this reason, it is most desirable to use a two-dimensional dither matrix of 2-pixel cycle for both vertical and horizontal directions.

Figure 12:
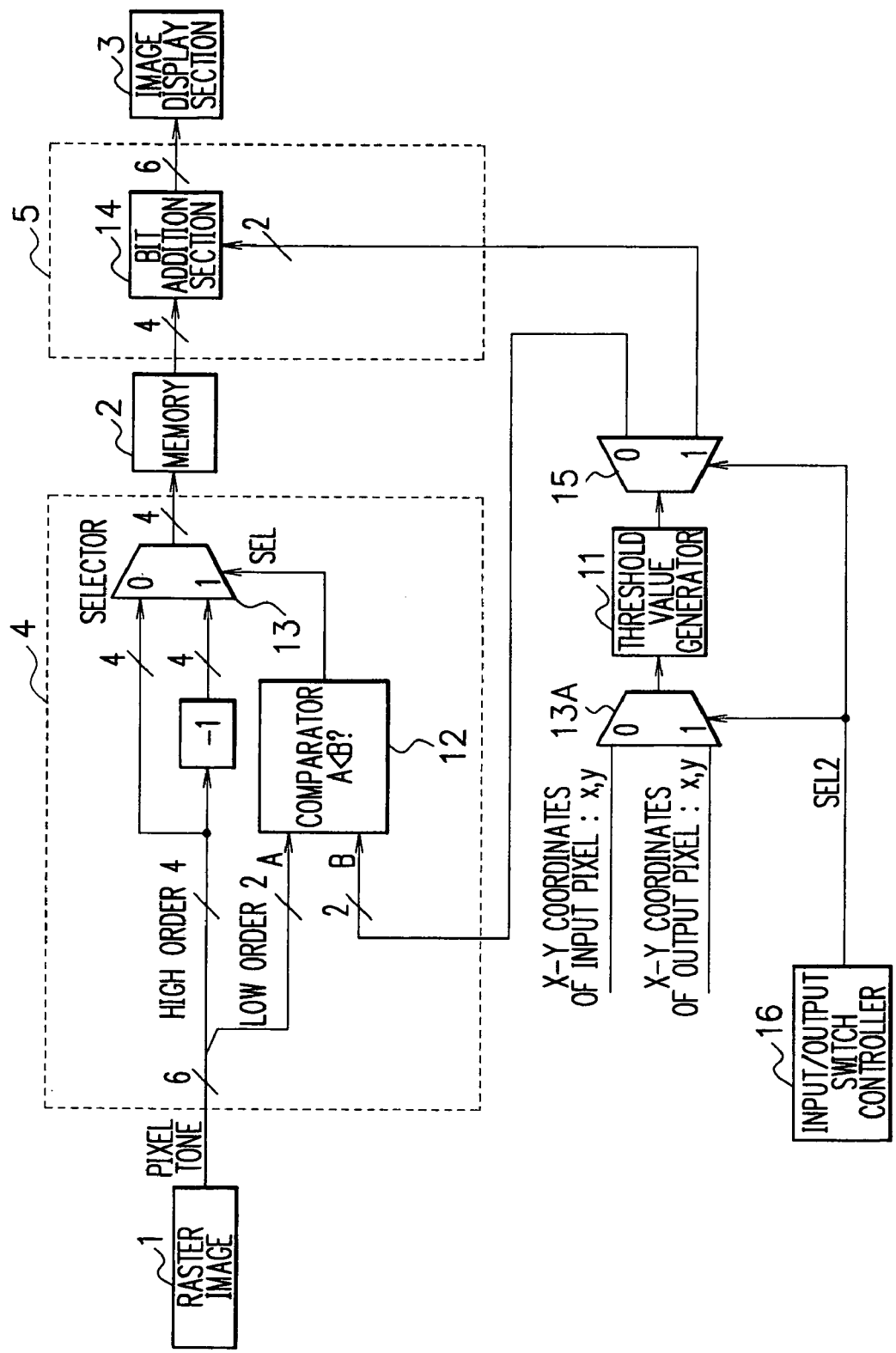
FIG. 12 is a block diagram showing another configuration of the image processing apparatus according to the second embodiment of the present invention.

In addition, the threshold value generator 11B is of the same construction as the threshold value generator 11A. Therefore, there may be provided only one threshold value generator, which switches from the threshold value generator 11A to 11B and vice versa as shown in FIG. 12. In this case, control is required for determining whether the output of the threshold value generator 11 is input to the comparator 12 or to the bit addition section 14. An example of the control method is illustrated in FIG. 12.

Referring to FIG. 12, an input/output switch controller 16 outputs a control signal SEL 2 to a selector 13A and a demultiplexer 15. The input/output switch controller 16 selects and outputs "0" as the SEL 2 when sending the output of the threshold value generator 11 to the comparator 12, and selects and outputs "1" when sending the output to the bit addition section 14.

As described above, the image processing apparatus of the second embodiment comprises the image processing former stage 4 for performing image processing to reduce the bit-plane number of the raster 1, the memory 2 for storing output signals (raster image) of the image processing former stage 4, and the image processing latter stage 5 for restoring the bit-plane number of the raster image sent from the memory 2 to the original number, and image processing is performed in reverse ways in the respective image processing former stage 4 and the image processing latter stage 5. With this construction, effects on image quality are minimized. Moreover, it is possible to reduce electric power consumption and chip size.

Besides, since the bit-plane number is reduced and increased in the image processing former stage 4 and the image processing latter stage 5, respectively, by multi-valued dithering, it is possible to obtain an image processing apparatus having an image processing section of a simple structure.

Incidentally, image processing can be performed by software.

Figure 13:
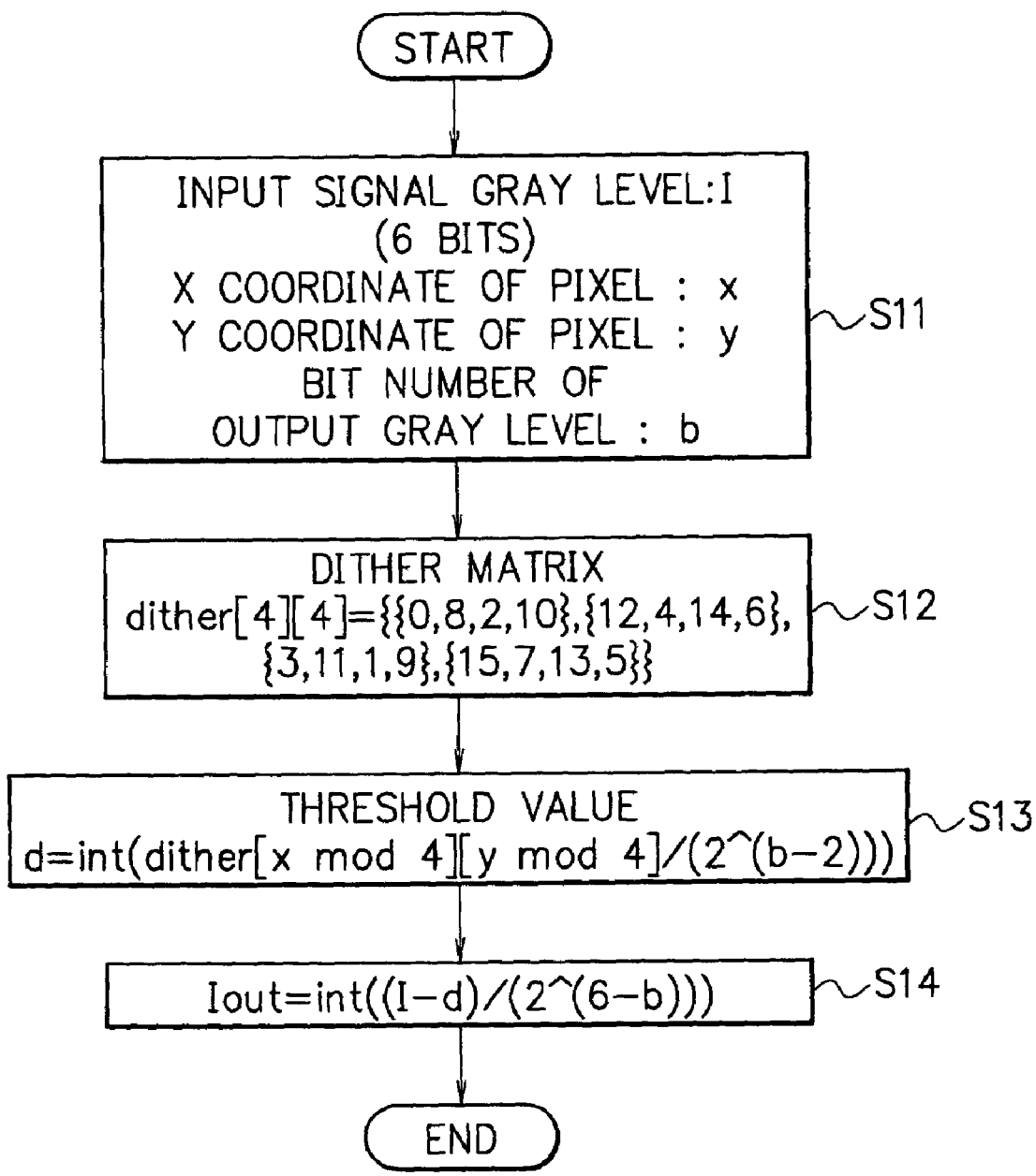
FIG. 13 is a flow chart illustrating an image processing method in the image processing former stage.
Figure 14:
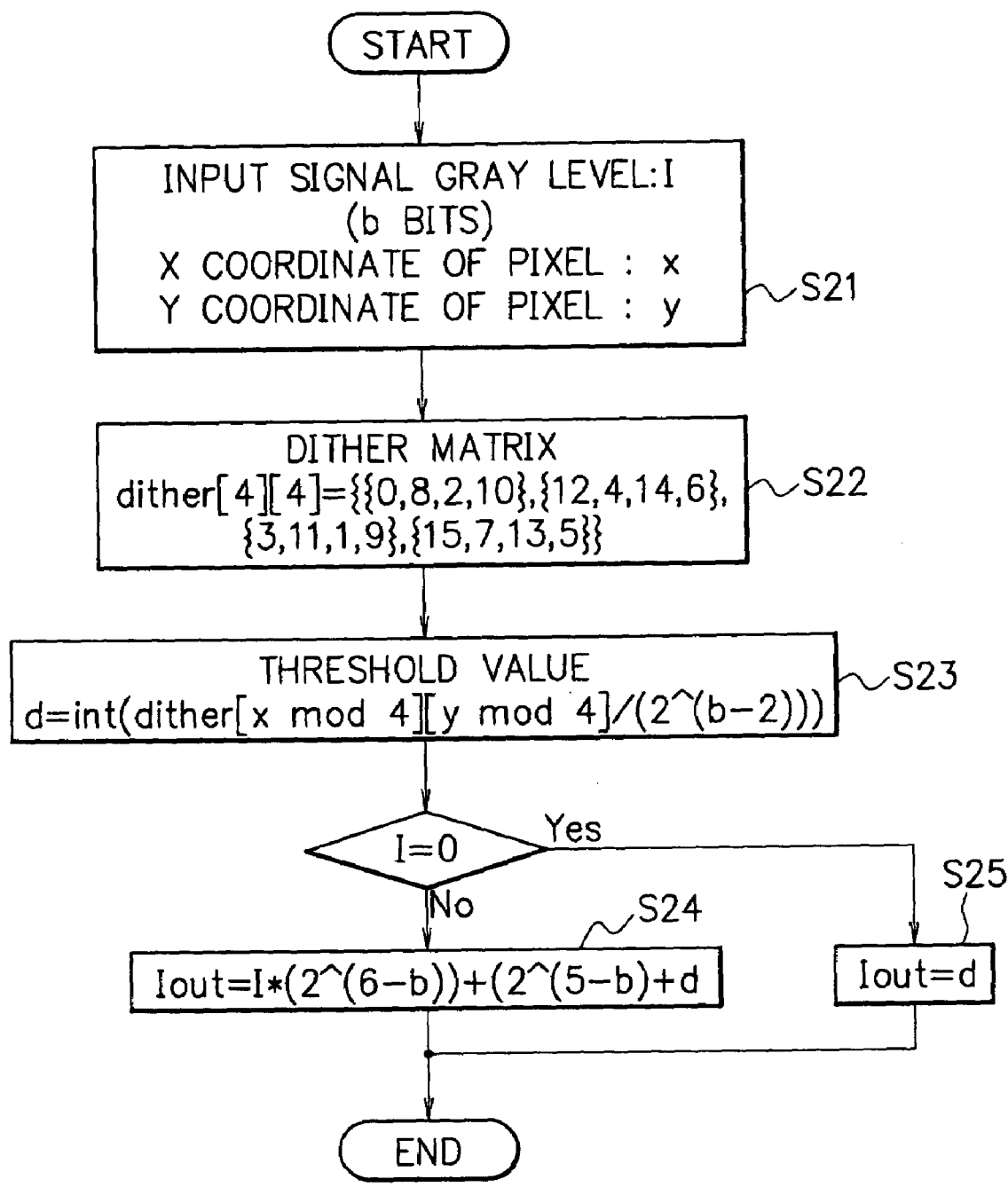
FIG. 14 is a flow chart illustrating an image processing method in the image processing latter stage.

FIG. 13 is a flow chart illustrating an example of an image processing method in the image processing former stage, while FIG. 14 is a flow chart illustrating an example of an image processing method in the image processing latter stage according to this embodiment. In FIGS. 13 and 14, operations in both the image processing former stage and the image processing latter stage are executed through software, it does not matter if only one of them is implemented by software and the other is implemented by hardware.

FIG. 13 shows an image processing method on the occasion when an input signal is composed of 6 bits, and the bit-plane number of the signal after compression is b bits (b: an integer 2 to 6). A gray level signal: I (6 bits), the X coordinate of a pixel: x, and the Y coordinate of the pixel: y are input in the image processing former stage 4 (step S11). Subsequently, a dither matrix necessary to generate threshold values is defined (step S12). Here, among four-by-four ordered dither matrices, a matrix called Bayer ordered dither matrix, [[0, 8, 2, 10], [12, 4, 14, 6], [3, 11, 1, 9], [15, 7, 13, 5]], is employed.

Then, a threshold value is generated based on the pixel coordinate values x and y (step S13). The method of generating the threshold value is as shown in the drawing. [x mod 4] indicates the remainder when an X coordinate value x is divided by 4. The dither matrix is divided by a power of 2 in order to generate a threshold value corresponding to each bit number because the threshold value varies according to the bit number b of an output gray level. For example, if b=4, then the threshold value is a 2-bit value. Since the dither matrix value is a 4-bit value, it is divided by $2^{(4-2)}=4$ so as to make it a 2-bit value.

After that, a threshold value d is subtracted from input gray level signal, and low order bits are truncated at step S14. In this example, b=4, and 6−4=2, and therefore, low order 2 bits are truncated. Thus, high order 4 bits are output.

In FIG. 14, an gray level signal: I of b bits, the X coordinate of a pixel: x, and the Y coordinate of the pixel: y are input in the image processing latter stage 5 (step S21). At steps S22 and 23, the same operations as described previously for the image processing former stage 4 are carried out. If the input signal I is "0", then output Iout=d. Otherwise, a value, which is obtained by setting I as high order bits and b as low order bits and adding 2 ^ (5−b) thereto so as to reduce the difference with the original signal, is output at step S 24. This 2 ^ (5−b) corresponds to OR output signals shown in FIG. 10.

By the algorithm as above described, it is possible to realize an image processing apparatus, which has a configuration to perform software-based image processing, and is equal in quality to the image processing apparatus shown in FIG. 7.

Incidentally, the flow charts of FIGS. 13 and 14 are given only as examples and without limitation. Any other process is applicable so long as it satisfies this embodiment.

THIRD EMBODIMENT

FIG. 15 is a block diagram showing the first example of the configuration of an image processing apparatus according to the third embodiment of the present invention. The image processing apparatus according to the third embodiment differs from that of the second embodiment in the presence of a selector 13B for determining whether to send the raster image 1 directly to the image display section 3 or to send the raster image 1 from the memory 2 to the display section 3 and a memory use switch controller 6 for conducting the selection control in the selector 13B between the image processing former stage 4 and the image processing latter stage 5.

The memory use switch controller 6 controls the selector 13B according to images to be sent to the image display section 3. For example, when a still image is being displayed, the image remains unchanged. Therefore, the memory use switch controller 6 outputs "1" so as to display an image stored in the memory 2. Accordingly, the selector 13B sends a raster image output from the image processing latter stage 5 to the image display section 3. On the other hand, when a moving image is being displayed, the memory use switch controller 6 outputs "0" to the selector 13B so as to directly display the raster image 1 on the image display section 3 without storing it in the memory.

By virtue of this construction, it is possible to make a switch from displaying a still image to displaying a moving image and vice versa. Moreover, a still image can be displayed with a smaller sized chip and less electric power consumption.

FIG. 16 is a block diagram showing the second example of the configuration of the image processing apparatus according to the third embodiment of the present invention. Referring to FIG. 16, when the memory use switch controller 6 outputs "0", that is, when the raster image 1 is directly displayed on the image display section 3 without the intervention of the memory 2, processing in the image processing former stage 4, the memory 2 and the image processing latter stage 5 is stopped with the use of a processing ON/OFF controller 7. By stopping processing in the image processing former stage 4, the memory 2 and the image processing latter stage 5 as just described, it is possible to reduce electric power consumption.

FOURTH EMBODIMENT

Figure 17:
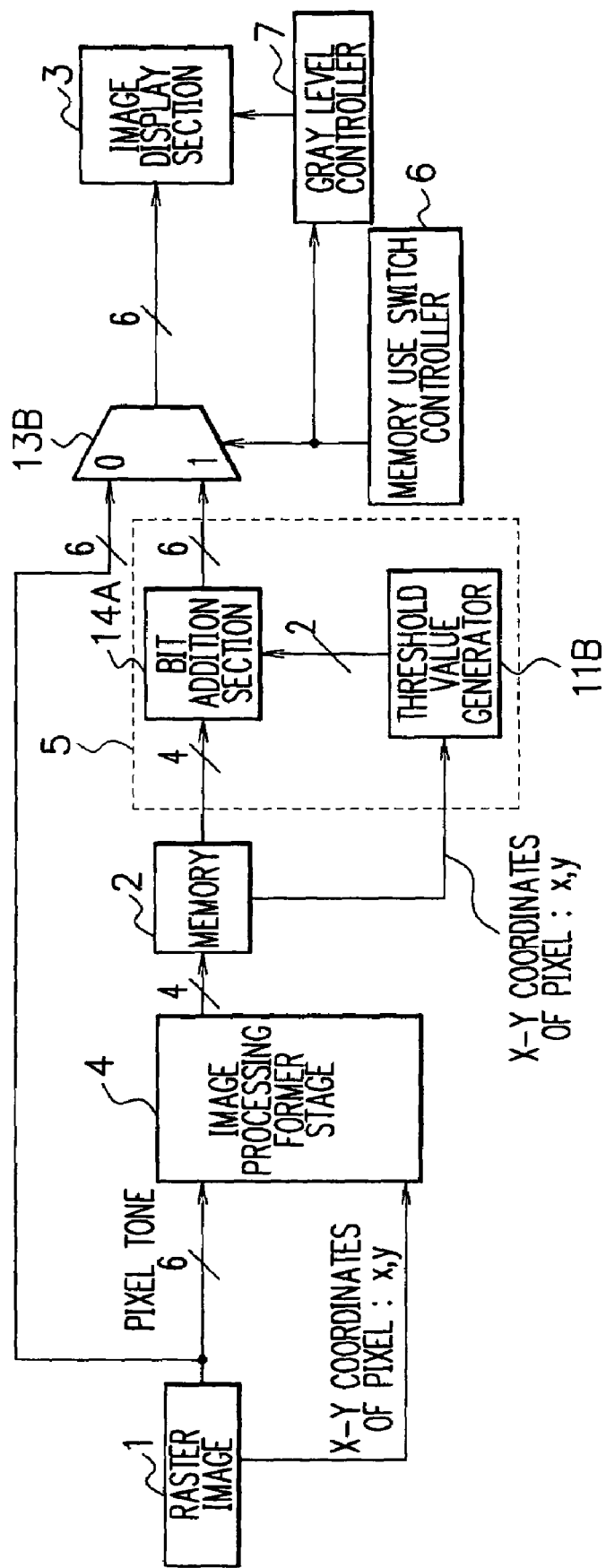
FIG. 17 is a block diagram showing the configuration of an image processing apparatus according to the fourth embodiment of the present invention.

FIG. 17 is a block diagram schematically showing the configuration of an image processing apparatus according to the fourth embodiment of the present invention. The image processing apparatus according to the fourth embodiment differs from that of the third embodiment shown in FIG. 15 in the configuration of a bit addition section 14A, and in that the output of the memory use switch controller 6 is input into a gray level controller 7 which provides gray level control in the image display section 3.

FIG. 18 is a block diagram schematically showing the configuration of the bit addition section according to the fourth embodiment of the present invention. The bit addition section 14A combines the output of the memory 2 with the output of the threshold value generator 11B as high order 4 bits and low order 2 bits, respectively, to output them to the selector 13B. The configuration of the bit addition section 14A is considerably simplified as compared with that of the bit addition section 14 according to the second embodiment of the present invention shown in FIG. 10

Figure 20:
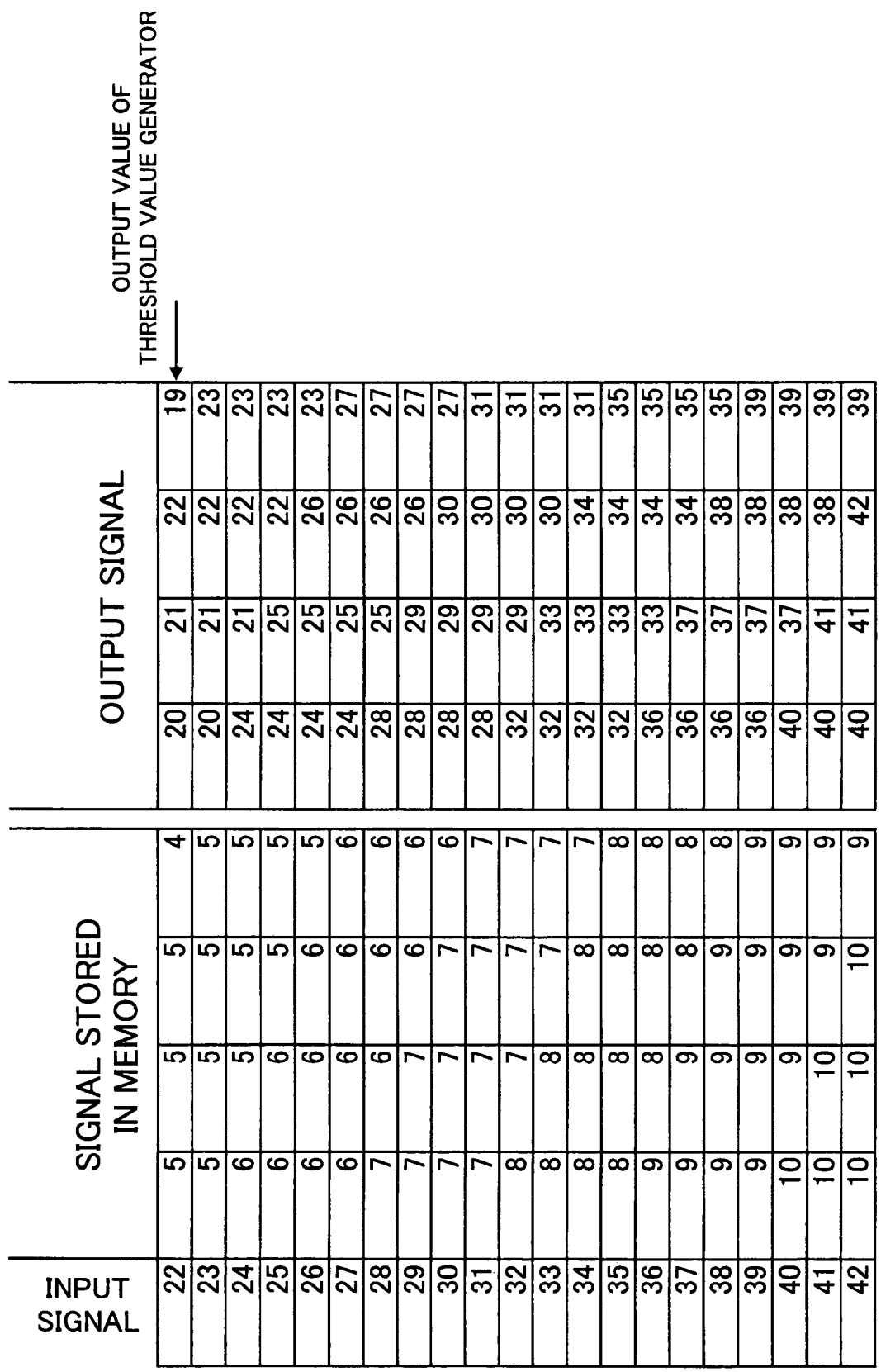
FIG. 20 is a list showing input signals and output signals in the fourth embodiment of the present invention.

FIGS. 19 to 21 are lists showing input signals, signals stored in the memory and output signals from the image processing latter stage in the fourth embodiment of the present invention. As can be seen in FIGS. 19 to 21, the average of the output signal values is smaller than the input signal value when the configuration of FIG. 10 is changed into that of FIG. 18. This causes a difference or variation in the brightness of a display image when the selector 13B carries out display switching. Therefore, the gray level controller 7 controls or changes displayed tones or shades on a gray scale. That is, when the memory use switch controller 6 outputs "0", the gray level controller 7 provides normal gray level control. On the other hand, when the memory use switch controller 6 outputs "1", the gray level controller 7 adjusts an output gray level signal as shown in FIG. 22 so that it becomes higher in gray level than the output signal shown in FIGS. 19 to 21. By this means, an image of much the same brightness can be obtained even when the selector 13B has carried out display switching (in other words, when the memory 2 is in use).

Examples of the gray level controller 7 include one in which a look-up table is constructed to carry out the conversion of input signals. Besides, if the gray level controller 7 is realized in hardware, the reference voltage of liquid crystal may be changed so that the V-T characteristics of liquid crystal vary according to the values output from the memory use switch controller 6 when an LCD (liquid crystal display) which uses analog supply to display an image or an organic EL (electroluminescent) display is employed as the image display section.

By virtue of this construction, it is possible to provide the image processing apparatus in which the image processing latter stage 5 carries out little processing as compared to the first and second embodiments.

FIFTH EMBODIMENT

Figure 23:
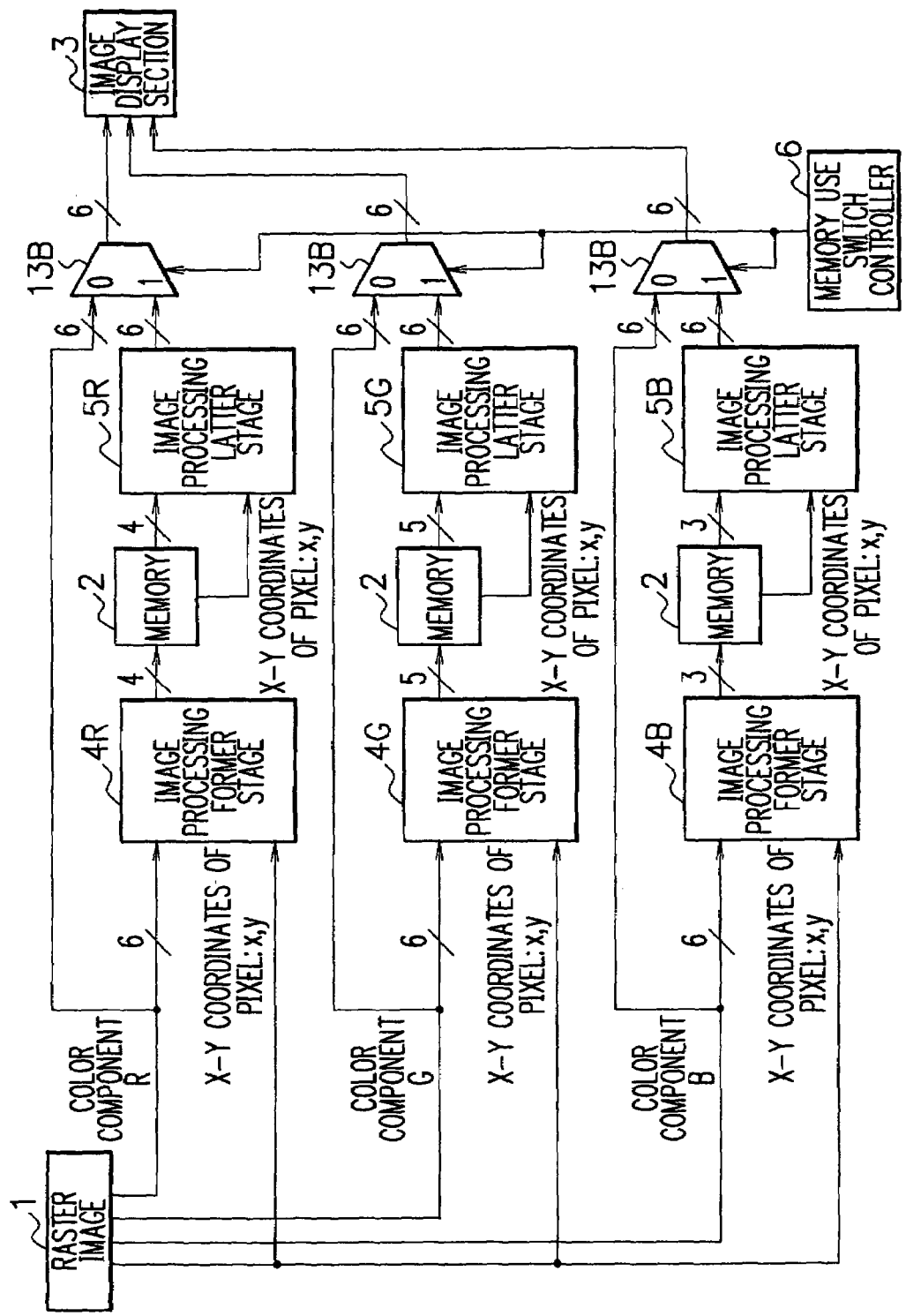
FIG. 23 is a block diagram showing the configuration of an image processing apparatus according to the fifth embodiment of the present invention.

FIG. 23 is a block diagram schematically showing the configuration of an image processing apparatus according to the fifth embodiment of the present invention. The image processing apparatus according to the fifth embodiment differs from that of the third embodiment shown in FIG. 15 in that the bit-plane numbers for color components R, G and B, which are stored in the memory 2, are 4, 5 and 3, respectively. In this construction, the memory has the same capacity as that of the third embodiment of the present invention.

As just described, the large bit-plane number is allocated for G, while the small bit-plane number is allocated for B. This is because, in multi-valued dither processing, a grainy feeling that deteriorates image quality is largely a result of brightness differences rather than color differences. G has the greatest effect on brightness components, while B has the least effect. With this construction, a grainy feeling can be more suppressed. Incidentally, in general multi-valued dither processing, if the bit-plane number is set as above described, color differences in B are increased, thereby deteriorating the quality of flesh-colored part of an image.

FIGS. 24 to 26 are lists showing input signals, signals stored in the memory and output signals from the image processing latter stage for the color component B in the fifth embodiment of the present invention. Besides, the drawings also shows output signals, average output signal values corresponding to respective input signals, differences between the respective average values and input signal values, and standard deviations in the output signals by multi-valued dithering (prior art). In comparison with the standard deviation according to the prior art, the standard deviation of this embodiment is reduced in almost all gray levels, and is a stably low value. From this it is to be understood that, according to this embodiment, color differences and a grainy feeling can be suppressed even when the bit-plane number for each color component is changed.

Figure 27:
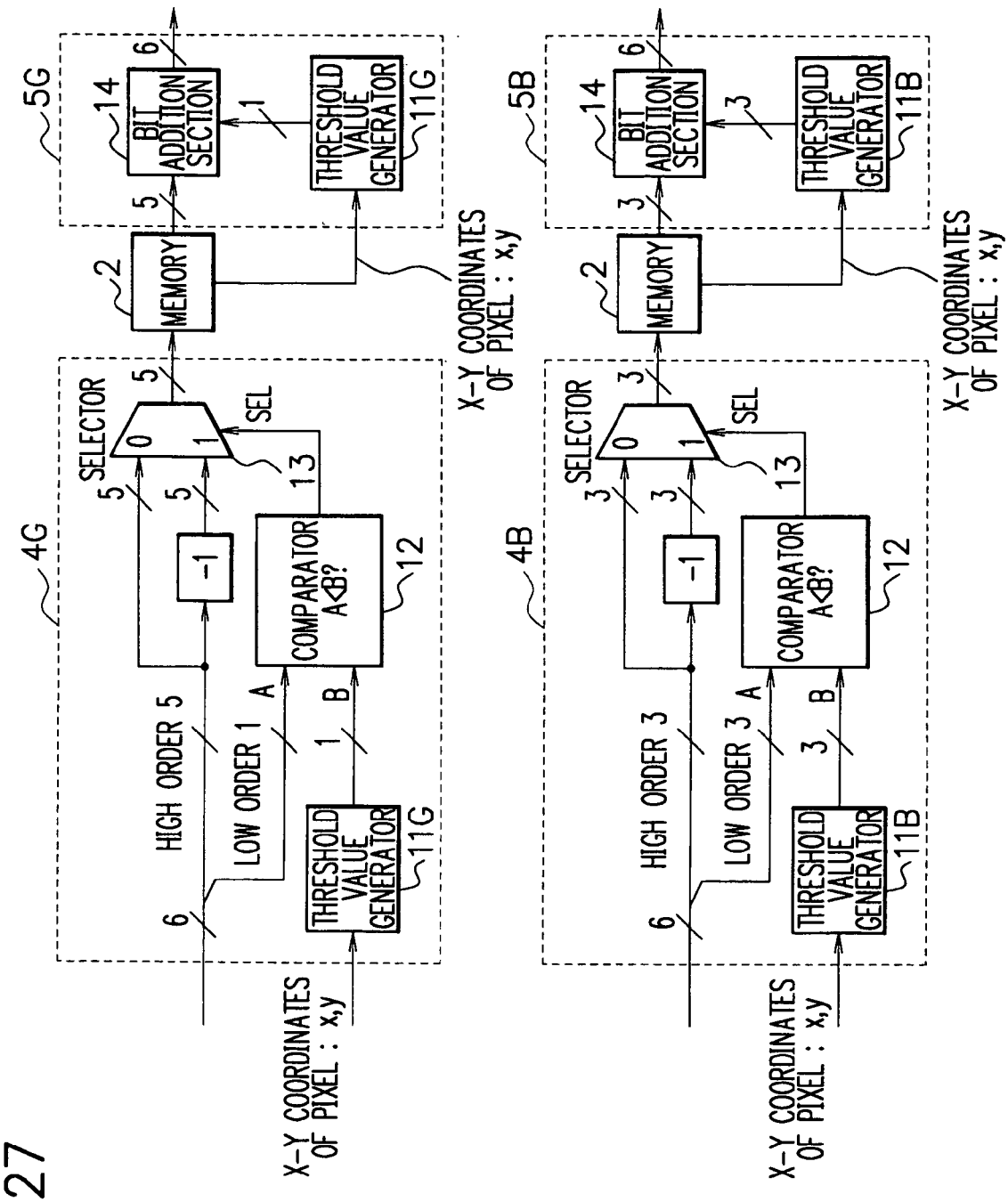
FIG. 27 is a block diagram showing the detailed configurations of the image processing former stages and the image processing latter stages depicted in FIG. 23.

As shown in FIG. 23, since a 4-bit memory is utilized for the R component of a raster image, the same processing as described previously for the image processing former stage 4 and the image processing latter stage 5 of the second embodiment is performed. As to the G component and B component, however, there are differences in the configuration of the threshold value generator and the number or width of bits sent to each part. FIG. 27 shows the configurations of image processing former stages 4G and 4B, and image processing latter stages 5G and 5B. In FIG. 27, threshold value generators 11G and 11B generate output signals by a generation method illustrated in FIG. 28.

With this construction, brightness differences in the RGB color display can be reduced. Moreover, it is possible to obtain an image with less grainy feeling, being comparable in quality to ordinal 6-bit display.

Figure 29:
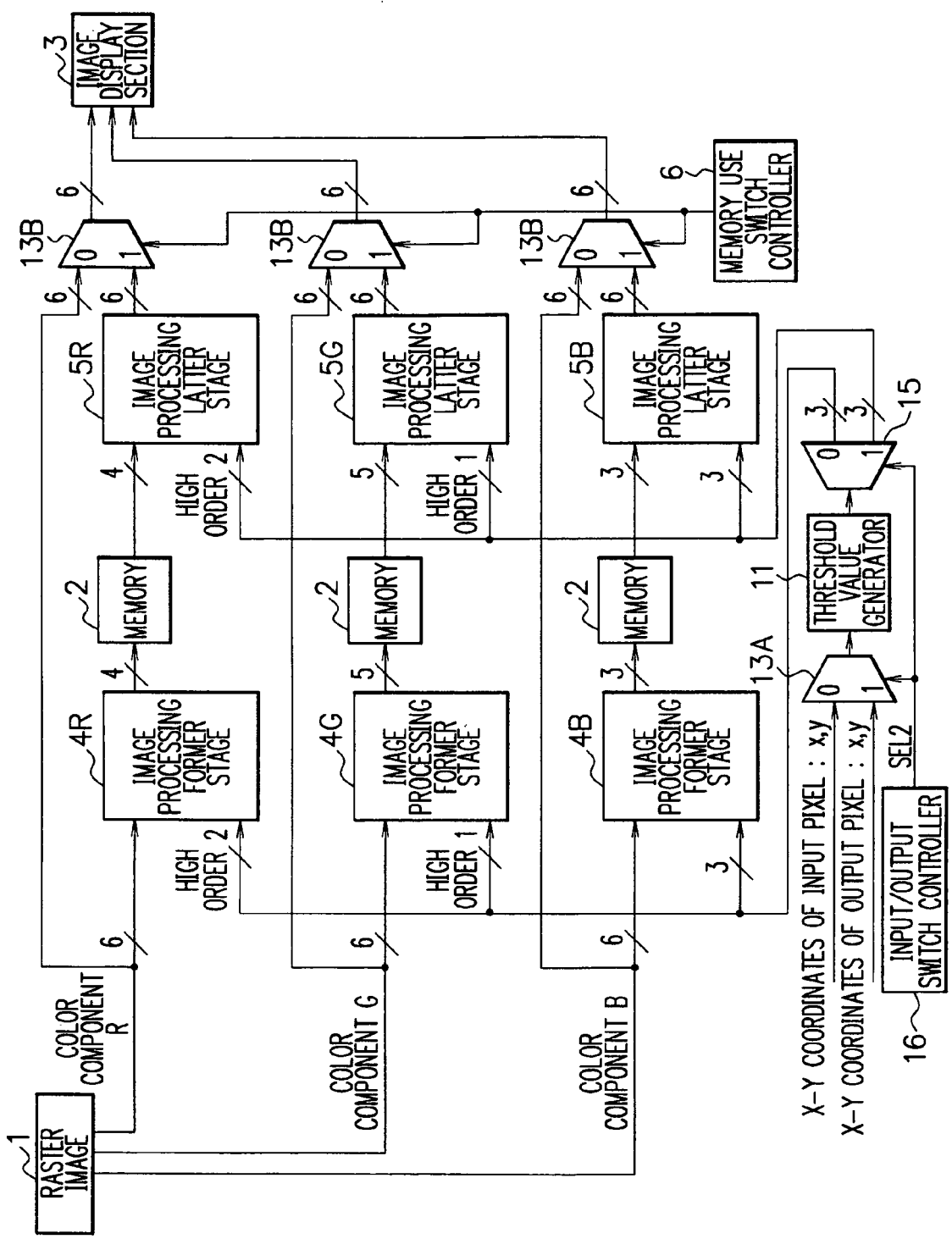
FIG. 29 is a block diagram showing another configuration of the image processing apparatus according to the fifth embodiment of the present invention.

Additionally, in FIG. 23, there may be provided only one threshold value generator as in the second embodiment of the present invention. FIG. 29 shows an example of this configuration. The threshold value generator 11 shown in FIG. 29 employs the generation method for the threshold value generator 11B shown in FIG. 28, and utilizes high order 2 bits as the output for the R component and only one high order bit as an output for the G component. This eliminates the need for the setting of the threshold value generator 11 with respect to each of the color components R, G and B, thus increasing the efficiency.

SIXTH EMBODIMENT

A description has been made of an image processing apparatus, which stores a raster image with 6 bits per color component in a 4-bit memory, and, on the basis of its data, displays a high quality image on an image display unit capable of displaying an image with 6 bits per color component. In the following, an image processing apparatus, which enables 6-bit worth of display on an image display section that displays an image with 4 bits per color component making use of FRC (Frame Rate Control), will be described.

FRC is a method for increasing the number of generable tones or shades on a gray scale by periodically changing tones in an image processing apparatus restricted in tone display. For example, in an image processing apparatus capable of displaying an image with a 0 to 15-step gray scale, if displayed tones are periodically changed, by defining 4 frames as 1 cycle, like 14, 14, 14, 15, then a display of 15×4+1=61 tones can be realized. This is substantially equivalent to 6-bit display.

Figure 30:
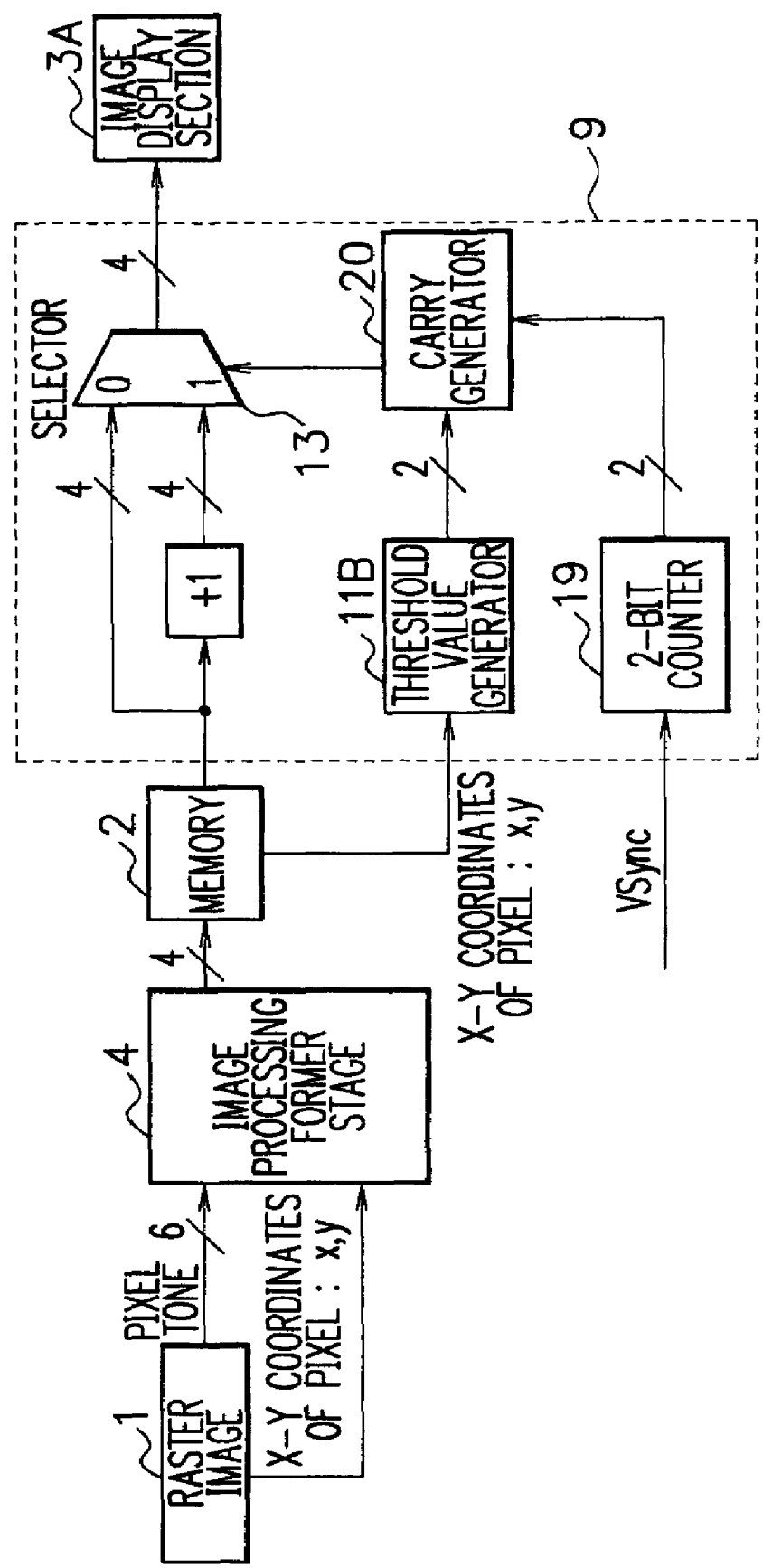
FIG. 30 is a block diagram showing the configuration of an image processing apparatus according to the sixth embodiment of the present invention.

FIG. 30 is a block diagram schematically showing the configuration of an image processing apparatus according to the sixth embodiment of the present invention. The image processing apparatus according to the sixth embodiment differs from that of the second embodiment shown in FIG. 7 in the presence of an FRC image processing latter stage 9 instead of the image processing latter stage 5 in FIG. 7, and in that VSync indicating the start of a frame is input into the FRC image processing latter stage 9, and an image display section 3A can display an image with 4 bits per color component. Incidentally, only one block of those of R, G and B is seen in the drawing for simplicity.

In the following, a description will be mainly made of the FRC image processing latter stage 9. The FRC image processing latter stage 9 comprises the threshold value generator 11B for generating a threshold value based on X-Y coordinates of a pixel, a 2-bit counter 19 for counting VSync, a carry generator 20 for generating a carry based on the output of the threshold value generator 11B and the 2-bit counter 19, and the selector 13 for determining whether to output a value obtained by adding 1 to the output of the memory 2 or to directory output the output value to the image display section 3 according to the carry value.

The threshold value generator 11B generates the output as shown in FIG. 8. The output values are the same as those in the second embodiment of the present invention. The 2-bit counter 19 counts VSync each time VSync is input, and output values therefrom change as 00→11→01→10→00→. . . . FIG. 31 is a state transition diagram showing the transitions. As can be seen in FIG. 31, output values are made as hereinafter described.

The carry generator 20 sets a carry value based on a threshold value, which is the output of the threshold value generator 11B, and the output value of the 2-bit counter 19. FIG. 32 shows relations among the threshold values, the counter output values and the carry output values. The carry generator 20 outputs "1" when the threshold value>the counter output value. Otherwise, the carry generator 20 outputs "0". In this manner, by defining 4 frames as 1 cycle, the carry generator 20 generates a carry corresponding to the threshold in the cycle.

After that, the selector 13 selects a signal to be output based on the carry value. The selector 13 outputs an output value from the memory 2 to the image display section 3 when the carry value is "0". On the other hand, the selector 13 outputs a value obtained by adding 1 to the output value from the memory 2 when the carry value is "1".

FIGS. 33 to 35 are lists showing input signals, signals stored in the memory and output signals from the FRC image processing latter stage 9 in the sixth embodiment of the present invention. Besides, the drawings also shows output signals, average output signal values corresponding to respective input signals, differences between the respective average values and input signal values, and standard deviations in the output signals by multi-valued dithering (prior art). Here, while the respective output signals are of 4 actually bits, values obtained through 4 to 6 bits conversion are utilized so that the differences between the input and output signals can be compared with each other. The output signal from the FRC image processing latter stage 9 is an average value for 4 frames (1 cycle) obtained by the FRC image processing latter stage 9. In comparison with the standard deviation according to the prior art, the standard deviation of this embodiment is reduced in almost all gray levels, and is a stably low value. The standard deviation also bears comparison with that of FIGS. 3 to 5. From this it is to be understood that, according to the present invention, an image equivalent in quality to a 6-bit image can be obtained with a 4-bit memory and a 4-bit display.

By virtue of this construction, it is possible to provide the image processing apparatus, which can produce higher quality images as compared to those obtained through conventional multi-valued dithering, and dose not need a 6-bit memory differently from that using conventional FRC.

SEVENTH EMBODIMENT

Figure 36:
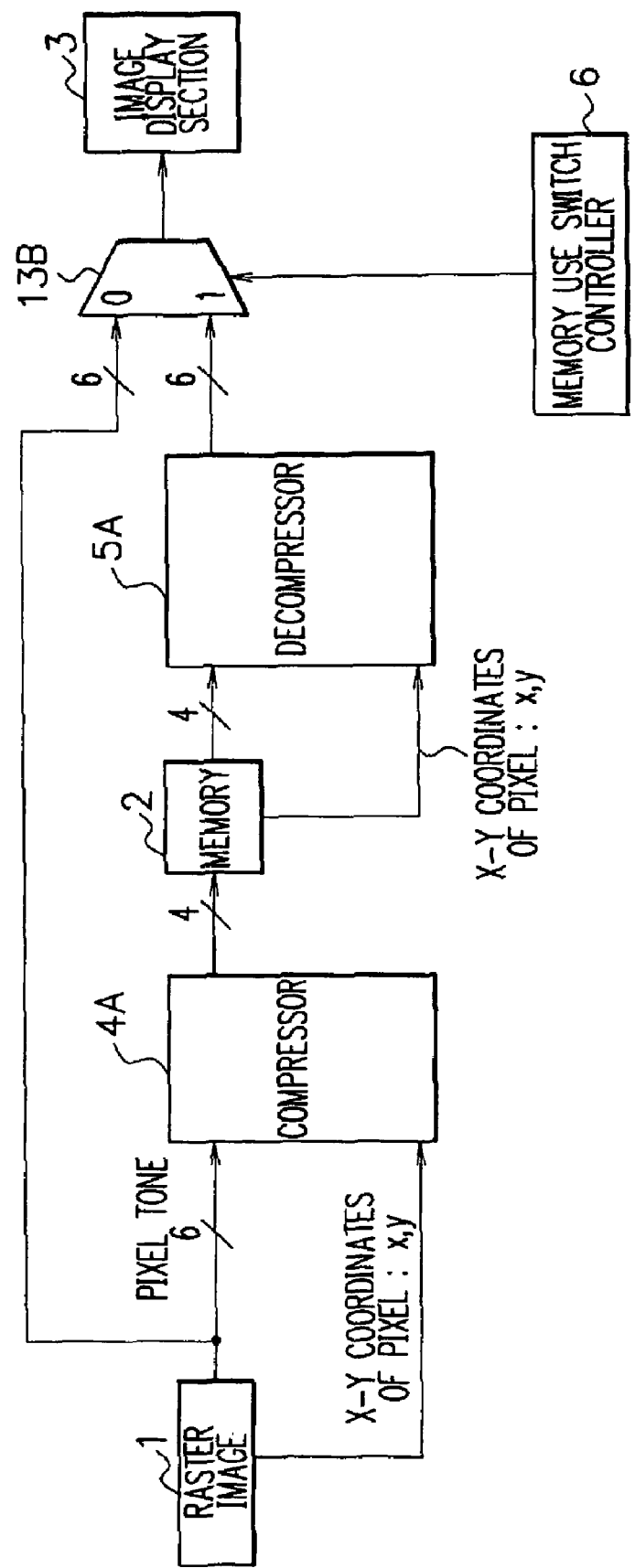
FIG. 36 is a block diagram showing the configuration of an image processing apparatus according to the seventh embodiment of the present invention.

In the following, the seventh embodiment of the present invention will be described. FIG. 36 is a block diagram showing an example of the configuration of an image processing apparatus according to the seventh embodiment of the present invention. The image processing apparatus according to the seventh embodiment differs from that of the third embodiment in the presence of a compressor 4A and a decompressor 5A instead of the image processing former stage 4 and the image processing latter stage 5.

The memory use switch controller 6 controls the selector 13B according to an image to be sent to the image display section 3. For example, when a still image is being displayed, the image remains unchanged. Therefore, the memory use switch controller 6 outputs "1" so as to display an image stored in the memory 2. Accordingly, the selector 13B sends a raster image output from the decompressor 5A to the image display section 3. On the other hand, when a moving image is being displayed, the memory use switch controller 6 outputs "0" to the selector 13B so as to directly display the raster image 1 on the image display section 3 without storing it in the memory 2.

By virtue of this construction, it is possible to make a switch from displaying a still image to displaying a moving image and vice versa. Moreover, a still image can be displayed with a smaller sized chip and less electric power consumption. In this display switching, specific compression/decompression processing is not required as in the image processing former stage 4 and the image processing latter stage 5, and any compressor 4A and decompressor 5A are applicable with a considerable effect.

More specifically, the compressor 4A and the decompressor 5A need not perform compression/decompression processing having a special relationship (for example, the same two-dimensional dither matrix should be used) for image signals input into the memory 2 and image signals read out therefrom.

For example, the compressor 4A and the decompressor 5A may use different two-dimensional dither matrices to perform compression/decompression processing for image signals input into the memory 2 and image signals read out of the memory 2, respectively.

Further, it is obvious that the compressor 4A and the decompressor 5A may perform other compression/decompression processing without using a two-dimensional dither matrix to achieve the same effects as above described.

EIGHTH EMBODIMENT

Figure 37:
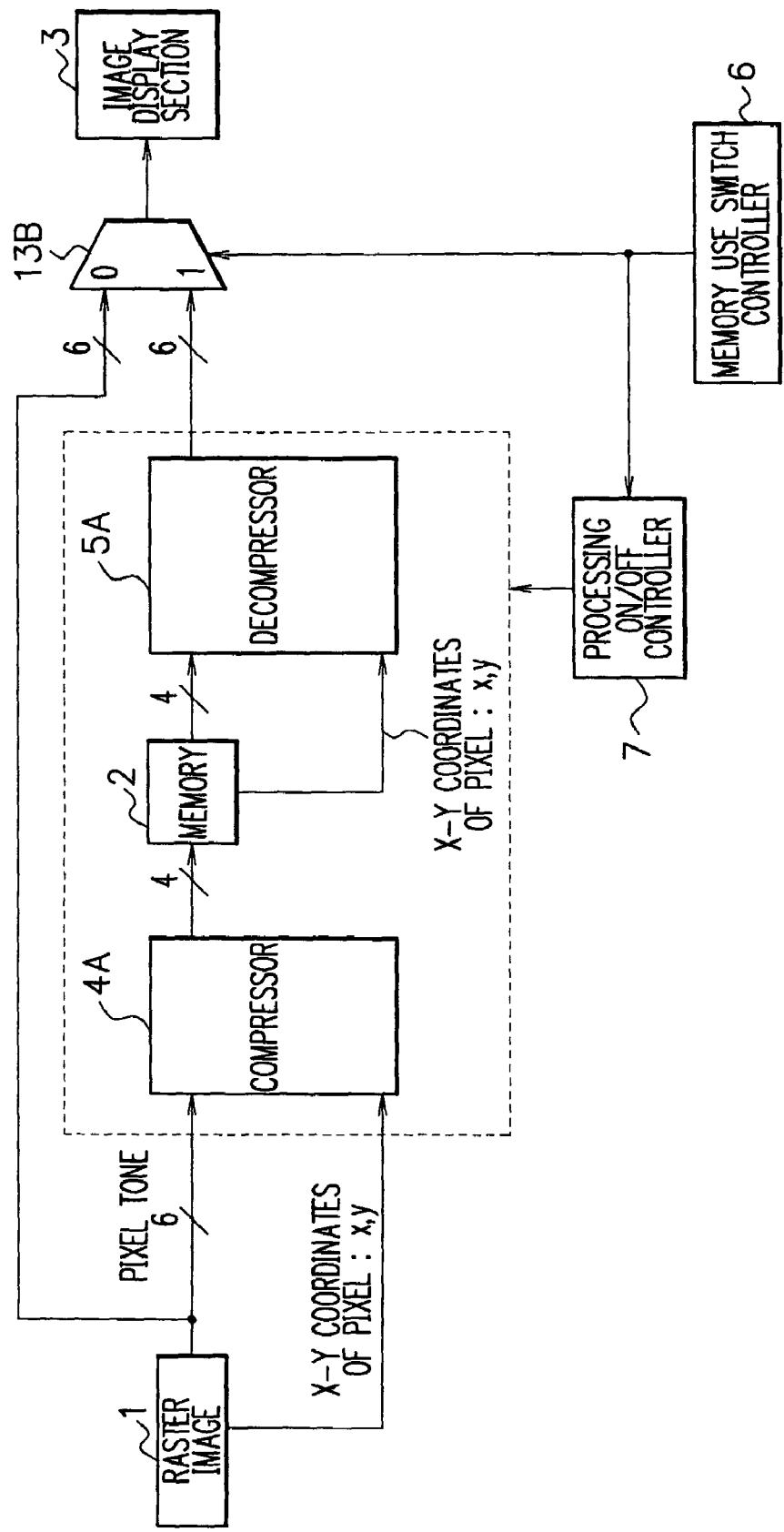
FIG. 37 is a block diagram showing the configuration of an image processing apparatus according to the eighth embodiment of the present invention.

In the following, the eighth embodiment of the present invention will be described. FIG. 37 is a block diagram showing an example of the configuration of an image processing apparatus according to the eighth embodiment of the present invention. The image processing apparatus according to the eighth embodiment further comprises the processing ON/OFF controller 7 in addition to the configuration of the image processing apparatus in the seventh embodiment. The processing ON/OFF controller 7 stops processing in the compressor 4A, the memory 2 and the decompressor 5A when the memory use switch controller 6 outputs "0", that is, when the raster image 1 is directly displayed on the image display section 3 without the intervention of the memory 2.

In the image processing apparatus of this embodiment, the processing ONI OFF controller 7 stops processing in the compressor 4A, the memory 2 and the decompressor 5A when the memory use switch controller 6 outputs "0", that is, when the memory 2 is not to be used. By this means, it is possible to achieve the same effects as obtained by the image processing apparatus of the tenth embodiment. Moreover, electric power consumption can be reduced.

NINTH EMBODIMENT

Figure 38:
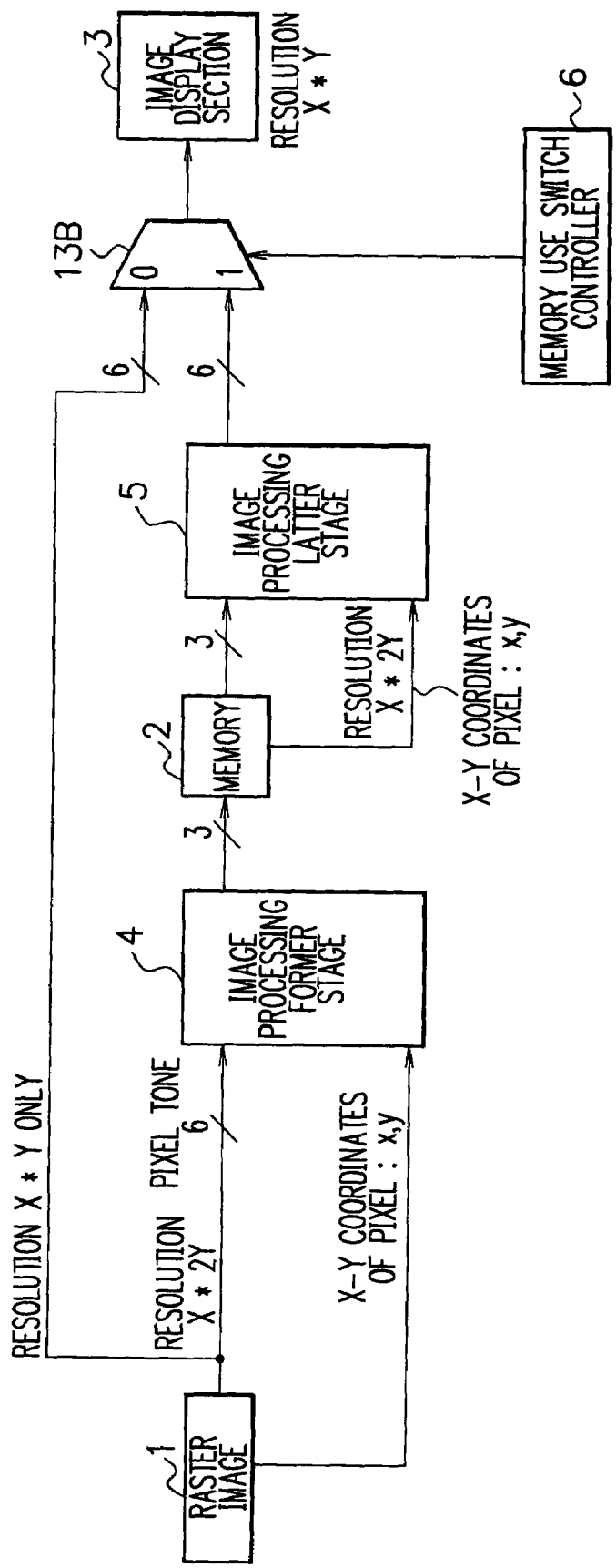
FIG. 38 is a block diagram showing the configuration of an image processing apparatus according to the ninth embodiment of the present invention.

In the following, the ninth embodiment of the present invention will be described. FIG. 38 is a block diagram showing an example of the configuration of an image processing apparatus according to the ninth embodiment of the present invention. The image processing apparatus according to the ninth embodiment differs from that of the third embodiment in that the memory 2 has a capacity equivalent to that of the image display section 3 which is capable of displaying an image with 6 bits per color component with a resolution of X*Y pixels (namely, the memory 2 can store an image of X*Y pixels).

In this description, "the resolution of a display unit" means the maximum number of pixels which the display unit (e.g. the image display section 3) can represent horizontally and vertically on the screen at once. For example, if the resolution of a display unit is 640 by 480 (pixels), it is provided with 640 pixels in a horizontal direction and 480 pixels in a vertical direction. Namely, the display unit has the ability to display an image formed of less than 640 by 480 pixels on the screen at once.

Additionally, "the resolution of an image" means the total number of pixels that form an image, and is represented as the product of the number of pixels in a vertical direction and that in a horizontal direction. For example, if the resolution of an image is 640 by 480 (pixels), the image occupies an area in the shape of a rectangle represented by 640 pixels in a horizontal direction and 480 pixels in a vertical direction.

In this case, as shown in FIG. 38, if an image resolution of which (X*2Y) is twice as high as the resolution of the image display section 3 (X*Y) in a vertical direction is input as the raster image 1, the image is compressed at a compression rate of 1/2, that is, the bit-plane number of the image is reduced by half in the image processing former stage 4. Thereby, the entire image can be stored in the memory 2. In other words, the image composed of pixels twice the resolution of the image display section 3 in a vertical direction is input as the raster image 1 can be entirely stored in the memory 2. After that, an arbitrary area of the X*Y area of the input image is expanded in the image processing latter stage 5. Accordingly, the image display section 3 can display the arbitrary area of the image whose resolution is higher or greater than that of the display section 3. By this means, even if the image stored in the memory 2 is a high-resolution image such as a scrolling image (namely, an image composed of pixels more than the resolution of the image display section 3), the image can be displayed without receiving the image from the outside in every frame cycle.

In the case of displaying an image without the intervention of the memory 2, the highest resolution of an input image is X*Y. More specifically, when an image input as the raster image 1 is smaller than the area of X*Y pixels, the memory use switch controller 6 outputs "0" to the selector 13B so as to directly display the raster image 1 on the image display section 3 without the intervention of the memory 2.

While a contiguous two screenfuls of image has been cited as the input image by way of example and without limitation, it is obvious that the same effects can be achieved when two or more different images are input into the image processing apparatus.

For example, in the case of storing two raster images each consisting of X*Y pixels in the memory 2, the respective images can be stored in the memory 2 by compressing them in the image processing former stage 4 in the same manner as described hereinbefore. Besides, the respective raster images can be displayed on the image display section 3 after reading them out of the memory 2 and expanding them in the image processing latter stage 5.

As is described above, according to this embodiment of the present invention, when an image which is m times (m: an arbitrary positive number) higher or greater in resolution than the image display section 3 is input as the raster image 1, the input image is compressed to one-mth of its original size, and stored in the memory 2. Thus, even when an input image is a raster image which is composed of pixels more than the resolution of the image display section 3, the image can be stored in the memory 2.

Moreover, it is possible to display an arbitrary area of the image whose resolution is higher or greater than that of the display section 3 by performing expansion or decompression processing in the image processing latter stage 5 for image signals of the image stored in the memory 2.

Furthermore, even if the image stored in the memory 2 is a high-resolution image such as a scrolling image (namely, an image composed of pixels more than the resolution of the image display section 3), the image can be displayed without receiving the image from the outside in every frame cycle.

TENTH EMBODIMENT

Figure 39:
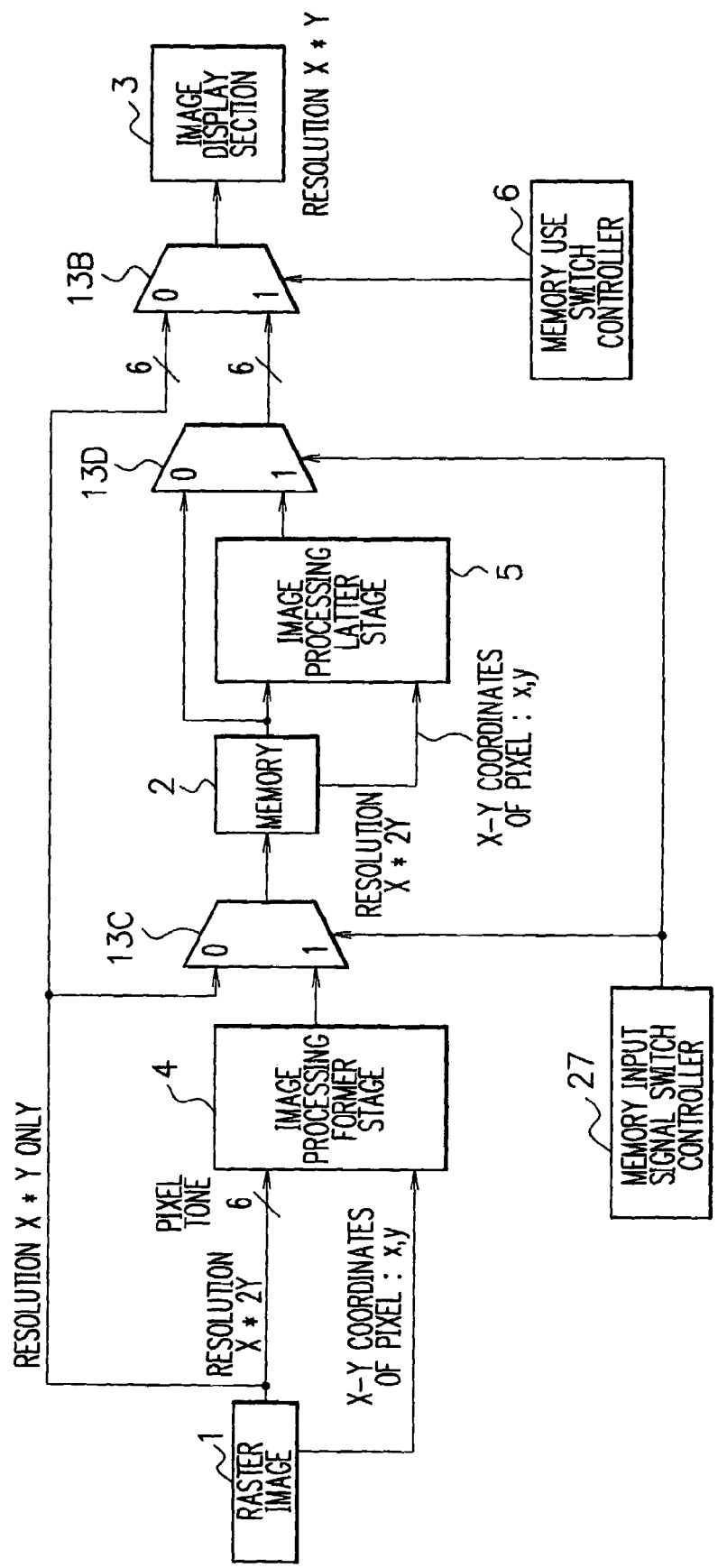
FIG. 39 is a block diagram showing the configuration of an image processing apparatus according to the tenth embodiment of the present invention.

In the following, the tenth embodiment of the present invention will be described. FIG. 39 is a block diagram showing an example of the configuration of an image processing apparatus according to the tenth embodiment of the present invention. The image processing apparatus according to the tenth embodiment further comprises a selector 13C in between the image processing former stage 4 and the memory 2, a selector 13D in between the image processing latter stage 5 and the selector 13B, and a memory input signal switch controller 27 for controlling the selectors 13C and 13D differently to that of the ninth embodiment.

The memory input signal switch controller 27 selects or determines whether an image to be stored in the memory 2 is a compressed image or an uncompressed image with reference to the resolution of the input image and the like. In the following description, while a compressed image or an uncompressed image is selected referring to resolution, the selection between them may be carried out with reference to the volume of data of an image such as the bit-plane number.

For example, when the memory 2 is utilized for storing the raster image 1 formed with X*Y pixels, the memory input signal switch controller 27 outputs "0" to the selectors 13C and 13D, while the memory use switch controller 6 outputs "1" to the selector 13B. Consequently, an uncompressed image is stored in the memory 2, and displayed on the image display section 3.

On the other hand, when the memory 2 is utilized for storing the raster image 1 formed with X*2Y pixels, the memory input signal switch controller 27 outputs "1" to the selectors 13C and 13D, and the memory use switch controller 6 outputs "1" to the selector 13B. Accordingly, an image compressed in the image processing former stage 4 is stored in the memory 2. After that, the image is read out of the memory 2 to be expanded in the image processing latter stage 5, and the expanded image is displayed on the image display section 3.

Incidentally, in the case where the memory 2 is not used for storing the raster image 1 formed with X*Y pixels, the memory use switch controller 6 outputs "0" to the selector 13B so as to directly display the raster image 1 on the image display section 3 without the intervention of the memory 2 as in the ninth embodiment.

By virtue of this construction, it is possible to select a compressed image or an uncompressed image as an image to be stored in the memory 2. When the size of a displayed image is placed ahead of image quality, an image which cannot be displayed on a screen at once, such as a map, can be stored in the memory by selecting a compressed image. On the other hand, if priority is given to image quality as for example when displaying a still image of a natural image, an uncompressed image is selected. Thus it is possible to provide the applicable or flexible image processing apparatus capable of improving image quality and the efficiency of the memory.

ELEVENTH EMBODIMENT

Figure 40:
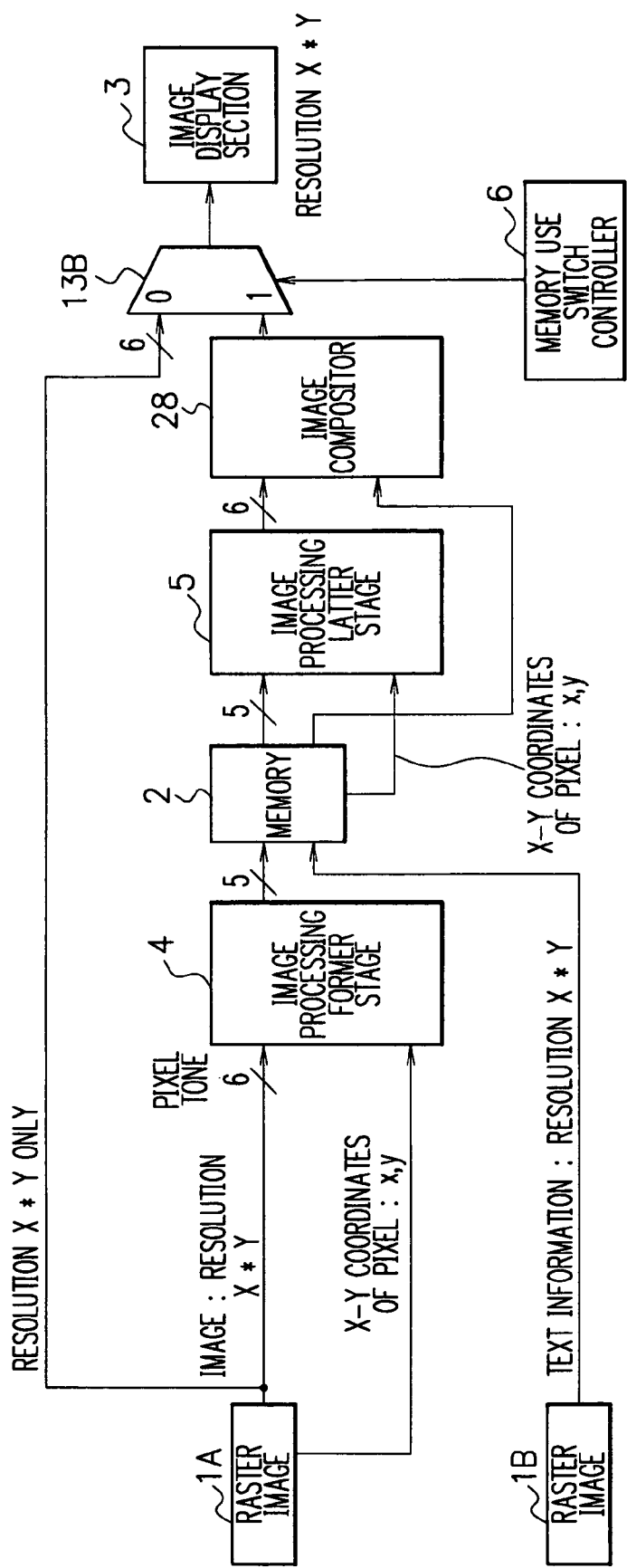
FIG. 40 is a block diagram showing the configuration of an image processing apparatus according to the eleventh embodiment of the present invention.

In the following, the eleventh embodiment of the present invention will be described. FIG. 40 is a block diagram showing an example of the configuration of an image processing apparatus according to the eleventh embodiment of the present invention. In this embodiment, the raster image 1, which is an original image, is divided into an image 1A and text information 1B, and then input to the image processing apparatus.

The image processing apparatus according to this embodiment differs from that of the ninth embodiment in the presence of an image compositor 28. The image compositor 28 generates a composite image of the image 1A whose bit-plane number has been increased in the image processing latter stage 5 and the text information 1B.

It is proposed to consider a case where a raster image which has been divided into two layers, the image 1A (the number of pixels: X*Y; 6 bits) and the text information 1B (the number of pixels: X*Y; 1 bit), is input. When uncompressed, a composite image of them contains 6 bits+1 bit=7 bits of data with respect to each of X*Y pixels. Since the memory 2 can store, at the maximum, 6 bits of data with respect to each of the X*Y pixels, the uncompressed composite image cannot be stored in the memory 2.

In such a case, the memory use switch controller 6 outputs "1" to the selector 13B to input the image 1A into the image processing former stage 4. In the image processing former stage 4, the image 1A is compressed in the same manner as previously described so that the bit-plane number of the image 1A is reduced from "6" to "5". Consequently, the total amount of data of the image 1A, whose bit-plane number has been reduced, and the text information 1B is 5 bits+1 bit=6 bits with respect to each of X*Y pixels, and therefore, they can be stored in the memory 2.

Thereafter, the image 1A, whose bit-plane number has been reduced to "5", is read out of the memory 2, and expanded in the image processing latter stage 5 in the same manner as described above so that the bit-plane number is increased from "5" to "6". The image compositor 28 generates a composite image of the image 1A whose bit-plane number has been increased in the image processing latter stage 5 and the text information 1B read out of the memory 2. The composite image is displayed on the image display section 3.

As is described above, according to this embodiment of the present invention, a raster image is divided into two layers, and input in the image processing apparatus. When the raster image cannot be stored in the memory 2 unless it is compressed, at least data of one of the layers is compressed or the bit-plane number is reduced to store the image in the memory 2. After expanding the compressed data or increasing the reduced bit-plane number, the two layers are combined. Thus, a composite image can be displayed.

For example, when the image 1A is an ordinary 6-bit image and the text information 1B is 1-bit information as shown in FIG. 40, an overlay display of text can be implemented by the image compositor 28. In addition, there is no need for the setting of a new memory to display overlay images.

Besides, the image processing apparatus of this embodiment can changes the image 1A and the text information 1B independently. For example, assuming that the image 1A is a still image and the text information 1B is a clock for indicating the time, only the text information 1B may be obtained at a regular interval (e.g. every second or every minute), and stored in the memory 2 to dispense with processing in the image processing former stage 4, the memory 2 and the image processing latter stage 5. Thus, it is possible to reduce electric power consumption when displaying the raster image 1 on the image display section 3.

Incidentally, in this embodiment, a multiple tone image and text information are cited as the two layers that form a raster image by way of example and without limitation. As another example, superimpose display of two images may be applicable.

TWELFTH EMBODIMENT

Figure 41:
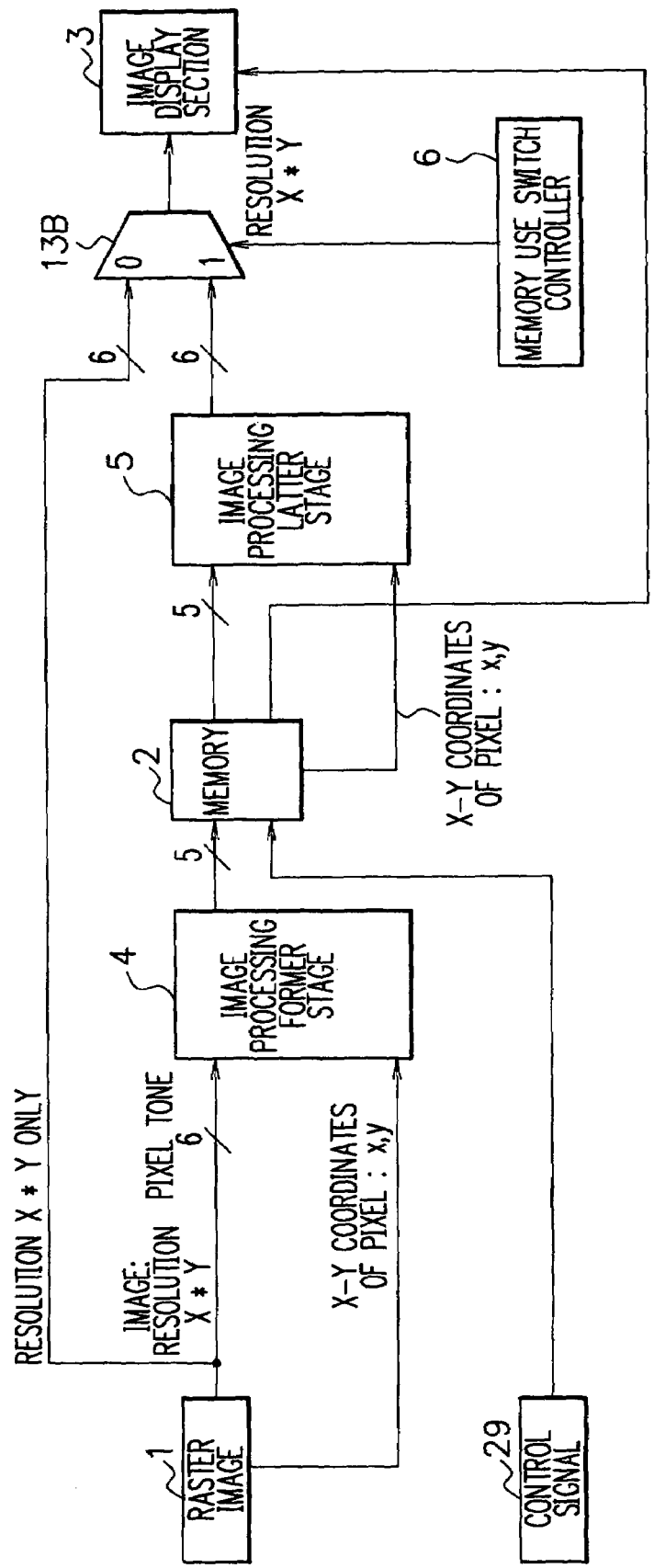
FIG. 41 is a block diagram showing the configuration of an image processing apparatus according to the twelfth embodiment of the present invention.

In the following, the twelfth embodiment of the present invention will be described. FIG. 41 is a block diagram showing an example of the configuration of an image processing apparatus according to the twelfth embodiment of the present invention. In this embodiment, a signal for displaying the raster image 1 is divided into two layers, the image 1A and a control signal 29 for each pixel, and input into the image processing apparatus.

The image processing apparatus according to the twelfth embodiment differs from that of the ninth embodiment in that when the image 1A and the control signal 29 cannot be stored in the memory 2 without compression, the image 1A is compressed or the bit-plane number thereof is reduced to store them in the memory 2, and an image obtained by expanding the compressed image or increasing the reduced bit-plane number is displayed on the image display section 3 based on the control signal 29.

It is proposed to consider a case where a signal for displaying the raster image 1 which has been divided into two layers, the image 1A (the number of pixels: X*Y; 6 bits) and the control signal 29 for each pixel (1 bit), is input. The total amount of data of the image 1A and the control signal 29 is 6 bits+1 bit=7 bits of data with respect to each of X*Y pixels. Since the memory 2 can store, at the maximum, 6 bits of data with respect to each of the X*Y pixels, the signal for displaying raster image 1 cannot be stored in the memory 2 without compression.

In such a case, the memory use switch controller 6 outputs "1" to the selector 13B to input the signal for displaying the raster image 1 into the image processing former stage 4. In the image processing former stage 4, the image 1A is compressed in the same manner as previously described so that the bit-plane number of the image 1A is reduced from "6" to "5". Consequently, the total amount of data of the image 1A, whose bit-plane number has been reduced, and the control signal 29 for each pixel is 5 bits+1 bit=6 bits of data with respect to each of X*Y pixels, and therefore, they can be stored in the memory 2.

Thereafter, the image 1A, whose bit-plane number has been reduced to "5", is read out of the memory 2, and expanded in the image processing latter stage 5 in the same manner as described above so that the bit-plane number is increased from "5" to "6". The image 1A whose bit-plane number has been increased is displayed on the image display section 3 based on the control signal 29 for each pixel read out of the memory 2.

As is described above, according to the twelfth embodiment of the present invention, a signal for displaying the raster image 1 is divided into at least one image and at least one control signal, and input in the image processing apparatus. When they cannot be stored in the memory 2 without compression, at least one image is compressed or the bit-plane number thereof is reduced to store the signal in the memory 2. An image obtained by expanding the compressed image or increasing the reduced bit-plane number can be displayed based on the control signal.

Besides, the image processing apparatus of this embodiment can changes the image 1A and the control signal 29 independently as in the eleventh embodiment. For example, only the control signal 29 may be updated to dispense with processing in the image processing former stage 4, the memory 2 and the image processing latter stage 5. Thus, it is possible to reduce electric power consumption when displaying the raster image 1 on the image display section 3.

THIRTEENTH EMBODIMENT

In the first to twelfth embodiments, a description has been made of an image processing apparatus provided with a memory, enabling reductions in memory capacity as well as electric power consumption, and capable of offering image quality comparable to that achieved by the prior art. Besides, according to the thirteenth and fourteenth embodiments of the present invention, a raster image is transmitted from a first unit to a second unit, where transmission capacity can be reduced. In the following, this construction will be described.

Figure 42:
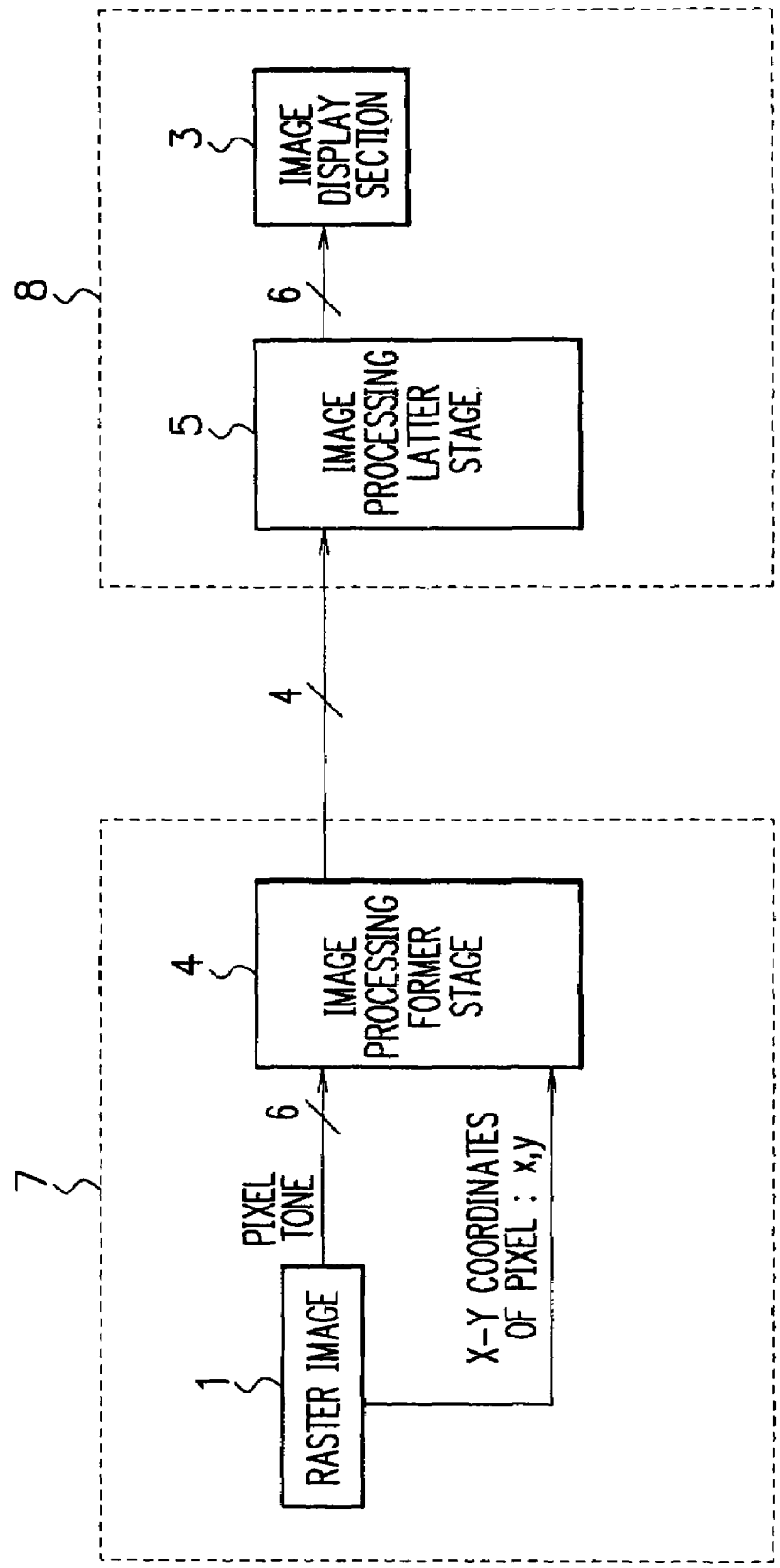
FIG. 42 is a block diagram schematically showing the configuration of an image transmission apparatus according to the thirteenth embodiment of the present invention.

FIG. 42 is a block diagram schematically showing the configuration of an image transmission apparatus according to the thirteenth embodiment of the present invention. Referring to FIG. 42, the image transmission apparatus according to the thirteenth embodiment of the present invention comprises a first unit 7 for sending a raster image and a second unit 8 for receiving the raster image. In the first unit 7, the raster image 1 with 6 bits per color component is converted into an image with 4 bits per color component at the image processing former stage 4, and sent to the second unit 8. In the second unit 8, the raster image received from the first unit 7 is restored to the image with 6 bits per color component at the image processing latter stage 5, and output to the image display section 3. Here, the image processing former stage 4 and the image processing latter stage 5 have the same construction as described previously for those in the above embodiments.

By virtue of this construction, a raster image can be transmitted from the first unit to the second unit without any appreciable decrease in image quality, and image transmission can be performed with less transmission capacity. This form is advantageous where transmission capacity is insufficient for an image or the number of transmission buses between the first unit and second unit is to be reduced.

Incidentally, the second unit 8 provided to the image transmission apparatus of this embodiment also represents an image reception apparatus according to a preferred embodiment of the present invention.

The image reception apparatus of the present invention receives a raster image whose bit-plane number has been reduced as compared to an original image, and increases the bit-plane number of the received image as with the second unit 8. Thus, it is possible to produce an image that is comparable in quality to the original image. In addition, since the bit-plane number of an image is reduced to the number less than that of an original image at the transmitting end, the image reception apparatus can receive the image efficiently.

For example, in the case of receiving a raster image with 6 bits per color component (18 bits in total) through an apparatus provided with a transmission bus for receiving images, which is only 16 bits wide, the bit-plane number of the raster image is reduced at the transmitting end so that the apparatus can receive the raster image with less bit-plane number, and thereafter, the apparatus increases the bit-plane number of the image. Thereby, the apparatus can receive the respective color components of the image comparable in quality to the original image in parallel.

FOURTEENTH EMBODIMENT

Figure 43:
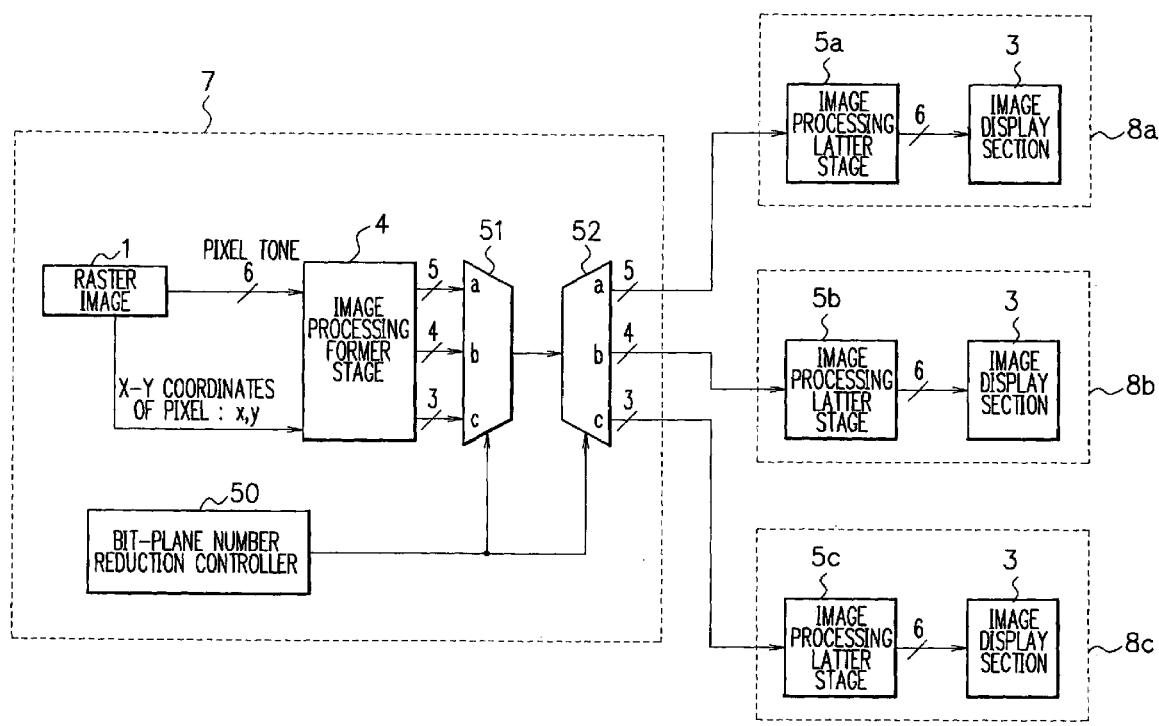
FIG. 43 is a block diagram schematically showing the configuration of an image transmission apparatus according to the fourteenth embodiment of the present invention.

FIG. 43 shows an image transmission apparatus according to the fourteenth embodiment of the present invention. The image transmission apparatus comprises a first unit 7 for sending a raster image and second units 8a, 8b and 8c for receiving the raster image. Incidentally, transmission buses between the first unit 7 and the second units 8a, 8b and 8c have bus widths of 15 bits, 12 bits and 9 bits, respectively.

The first unit 7 includes the image processing former stage 4, a bit-plane number reduction controller 50, a selector 51 and a demultiplexer 52. The bit-plane number of the raster image 1 (6 bits per color component) is reduced to a prescribed number in the image processing former stage 4, and a raster image with the bit-plane number corresponding to an instruction from the bit-plane number reduction controller 50 is output to the selector 51. The bit-plane number reduction controller 50 controls the selector 51 depending on which of the second units 8a to 8c the raster image 1 is to be transmitted to, and instructs the image processing former stage 4 to output an image with the bit-plane number suitable for the receiving end. Besides, the bit-plane number reduction controller 50 controls the demultiplexer 52 to select one of the transmission buses for the raster image whose bit-plane number has been reduced in the image processing former stage 4.

The second unit 8a includes an image processing latter stage 5a and an image display section 3a. In the image processing latter stage 5a, the raster image with 5 bits per color component transmitted from the first unit 7 is processed in the same manner as previously set forth to restore it to the raster image with 6 bits per color component. The image display section 3a displays the restored raster image with 6 bits per color component.

Additionally, the second unit 8b restores the raster image with 4 bits per color component to the image with 6 bits per color component in the image processing latter stage 5b, while the second unit 8c restores the raster image with 3 bits per color component to the image with 6 bits per color component in the image processing latter stage 5c. Otherwise the second units 8b and 8c operate in the same manner as the second unit 8a.

A description will be made of the operation of the image transmission apparatus according to this embodiment. As an example, a case where the raster image 1 is transmitted to the second unit 8a will be described. In the image processing former stage 4, a raster image with 6 bits per color component is processed so as to produce raster images with 5 bits, 4 bits and 3 bits per color component, respectively. The bit-plane number reduction controller 50 controls the selector 51 to input a raster image suitable for the receiving unit, that is, to input the raster image with 5 bits per color component into the demultiplexer 52. On this occasion, the bit-plane number reduction controller 50 sends a control signal "a" to the selector 51. Since the control signal output from the bit-plane number reduction controller 50 is "a", the raster image input into the demultiplexer 52 is output to the transmission bus leading to the second unit 8a.

The second unit 8a processes the raster image received from the first unit 7 in the image processing latter stage 5a to restore it to the raster image with 6 bits per color component, and displays the restored image on the display section 3a.

As is described above, the image transmission apparatus according to this embodiment can determine the number of bit-planes reduced from a raster image depending on a receiving unit. Consequently, it is possible to transmit a raster image with the bit-plane number corresponding to the bus width of a transmission bus to the receiving unit and the capacity of the image processing latter stages 5a to 5c. Thus, the efficiency of transmission capacity is improved.

FIFTEENTH EMBODIMENT

Since the present invention is aimed at reducing chip size and electric power consumption, the image processing section is not required to perform any complicated processing, and has a simple construction. Therefore, the present invention can achieve the above-described effects when applied to the driver and controller chip of a display unit having a built-in memory. Further, the present invention is applicable to a polysilicon circuit in which such driver and controller is set on a glass substrate.

Figure 44:
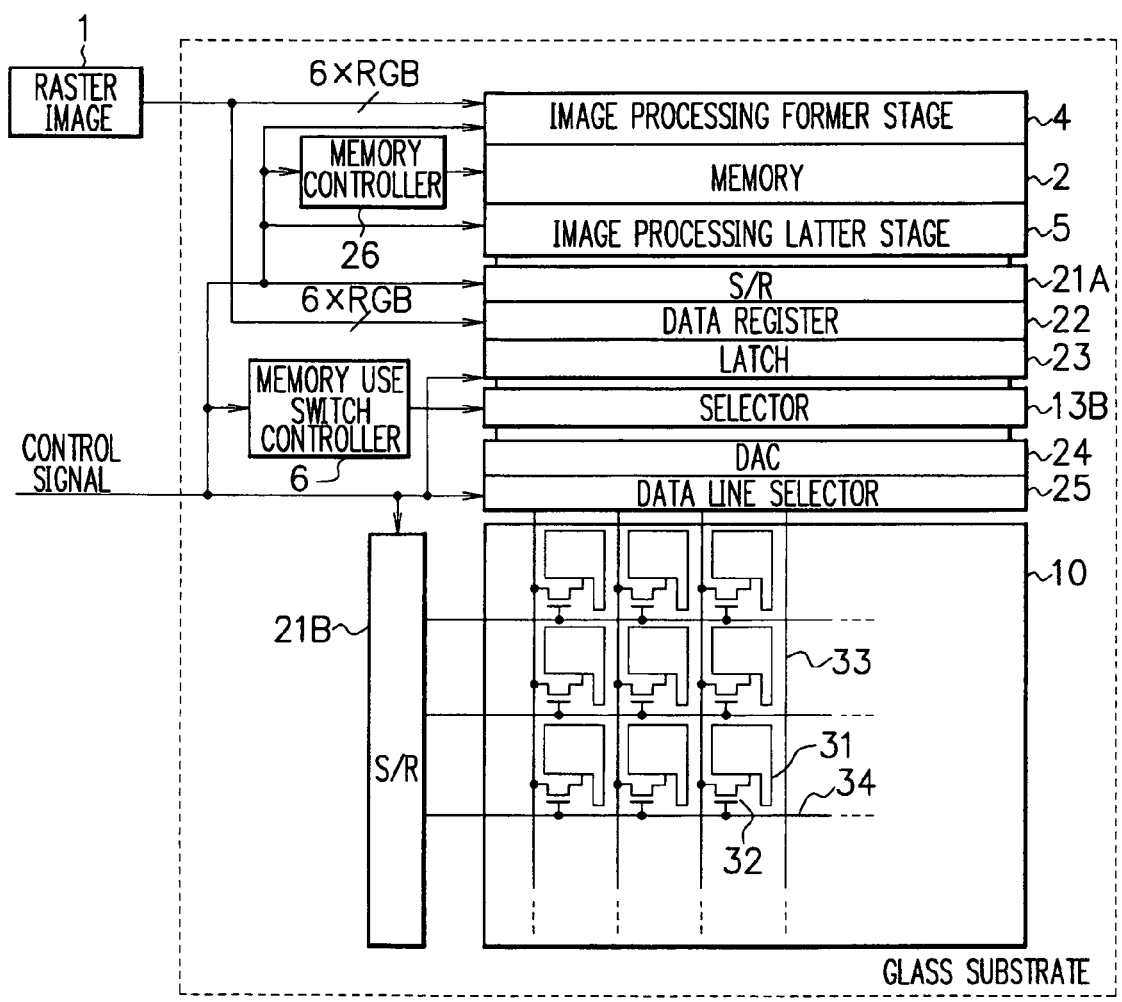
FIG. 44 is a block diagram showing the configuration of a liquid crystal display (LCD).

FIG. 44 shows a liquid crystal display (LCD) in which an image processing section and a drive circuit section are formed on a glass substrate with the use of a polysilicon thin film transistor circuit. An input signal is composed of 6 bits per color component, R, G and B, the memory has a capacity of 4 bits per color component, R, G and B, and an output is of 6 bits per color component, R, G and B. The raster image 1 from the outside is displayed on a liquid crystal display section 10. The liquid crystal display section 10 includes a matrix of pixels 31, thin film transistors 32, a plurality data lines 33 and a plurality of gate lines 34, which are arranged so as to form a lattice with respect to each pair of the pixel 31 and the thin film transistor 32, each connecting to the thin film transistor 32. A signal of the data line 33 connected to the thin film transistor 32 is written to each pixel 31 when the thin film transistor 32 has entered into the ON state according to a signal from the gate line 34.

The raster image 1 is sent to the image processing former stage 4 and data registers 22. The raster image input to the image processing former stage 4 undergoes image processing as previously described for the first to twelfth embodiments, and stored in the memory 2 having a capacity of 12 bits in total for the color components R, G and B. Thereafter, data is read out of the memory 2 if necessary, and image processing is performed in the image processing latter stage 5. The output of the image processing latter stage 5 is sent to the selector 13B. Here, image processing of the image processing former stage 4, the memory 2 and the image processing latter stage 5 is performed in the same manner as previously described for the first to twelfth embodiments. Therefore, as a control signal input into the image processing former stage 4 and the image processing latter stage 5, the X-Y coordinates of a pixel are required when data is written to or read out of the memory 2. Incidentally, the control signal is not limited to the X-Y coordinates of a pixel. A control signal from which the X-Y coordinates of a pixel can be derived, such as VSync, Hsync and CLK, may be used. A memory controller 26 makes a switch between reading and writing, and controls the addresses of data input/output for the memory 2. At least the X-Y coordinates of a pixel are input in the memory controller 26 as with the image processing former stage 4 and the image processing latter stage 5.

Figure 45:
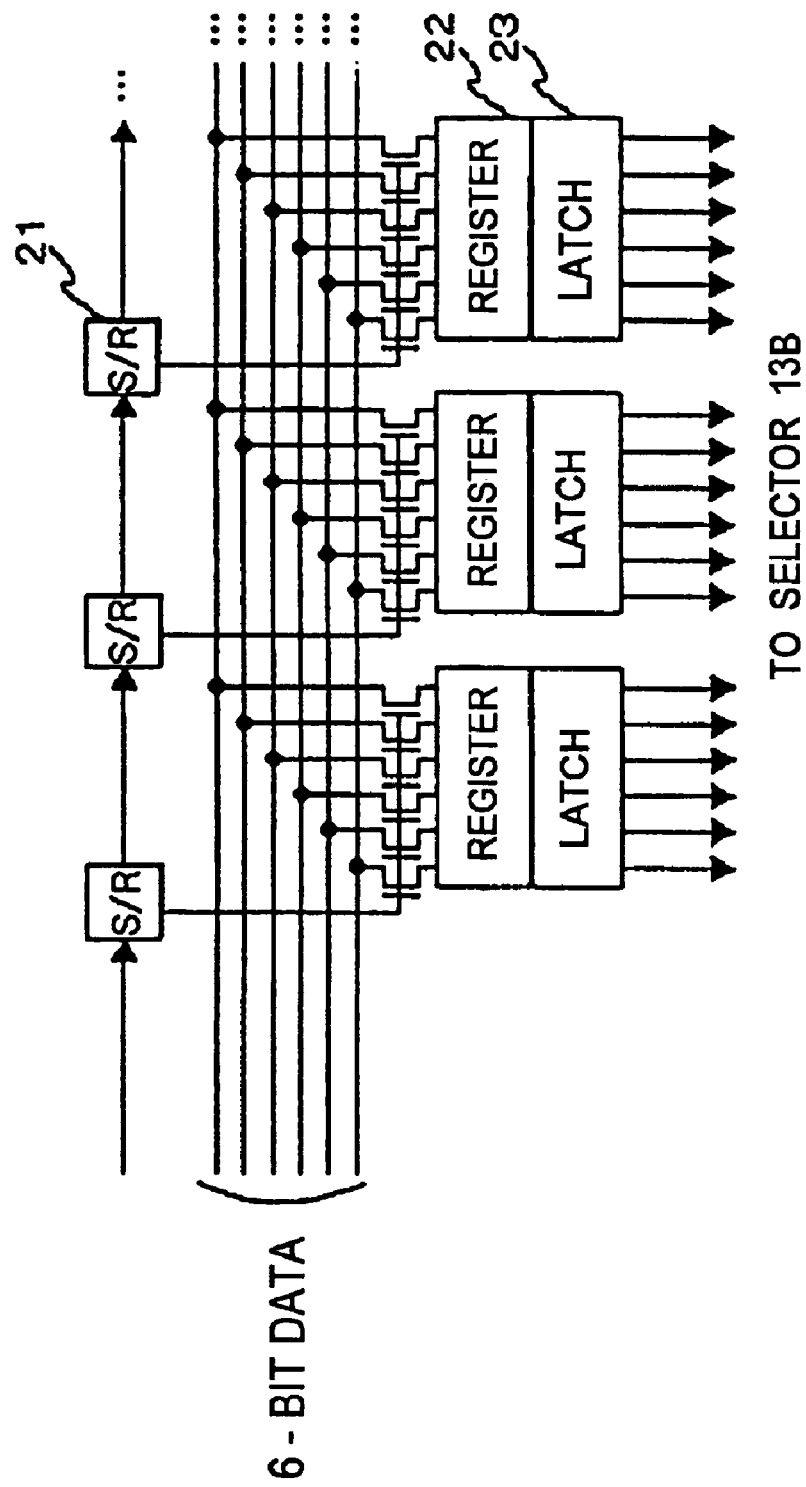
FIG. 45 is a block diagram showing sift registers and data registers depicted in FIG. 44.

FIG. 45 is a circuit diagram showing sift registers 21A and the data registers 22 of the LCD. Concerning a raster image input to the data registers 22, 6-bit data is sequentially stored on the basis of an output signal from the respective sift registers (S/R) 21A, and latched by latches 23. The outputs of the latches 23 are sent to the selector 13B.

Figure 46:
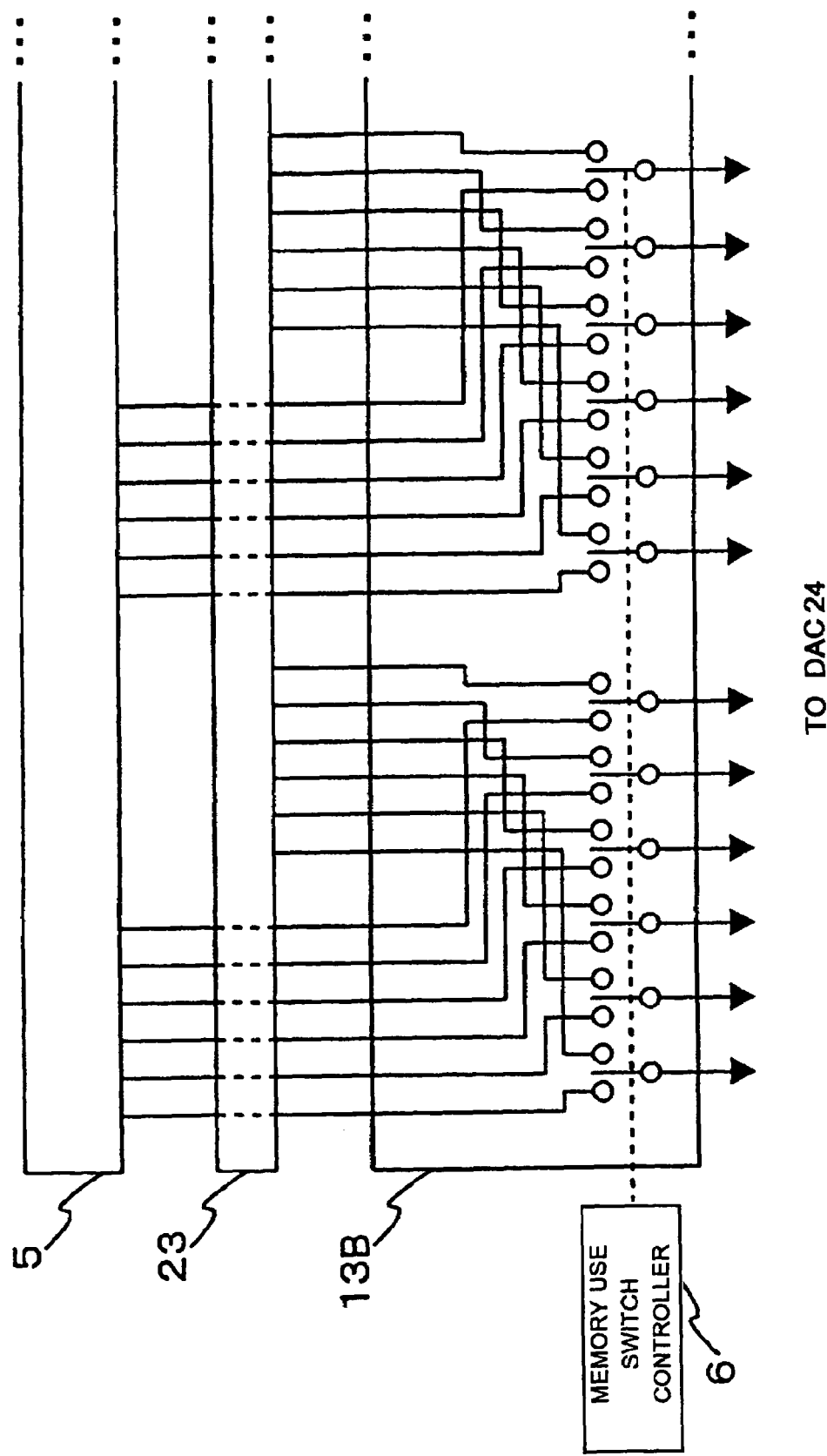
FIG. 46 is a circuit diagram showing the internal configuration of a selector depicted in FIG. 44.

FIG. 46 is a circuit diagram showing the configuration of the selector 13B of the LCD. The selector 13B selects data to be sent to the a DAC 24 depending on whether an image stored in the memory 2 having passed through the image processing latter stage 5 is displayed or an image from the outside is directly displayed based on control data from the memory use switch controller 6. The DAC 24 converts the digital signal with 6 bits per color component from the selector 13B into an analog signal, and outputs the signal to a desired data line through a data line selector 25.

The output of the data line selector 25 is sent to the liquid crystal display section 10, and written to the pixel 31 through the thin film transistor 32 corresponding to the gate line 34 selected by the sift register 21B.

With this construction, according to the fifteenth embodiment of the present invention, it is possible to obtain an LCD having a built-in image processing circuit as previously described for the first to twelfth embodiments on a glass substrate. In addition, the respective image processing former stage 4 and the image processing latter stage 5 can be formed of fewer transistors.

Figure 47:
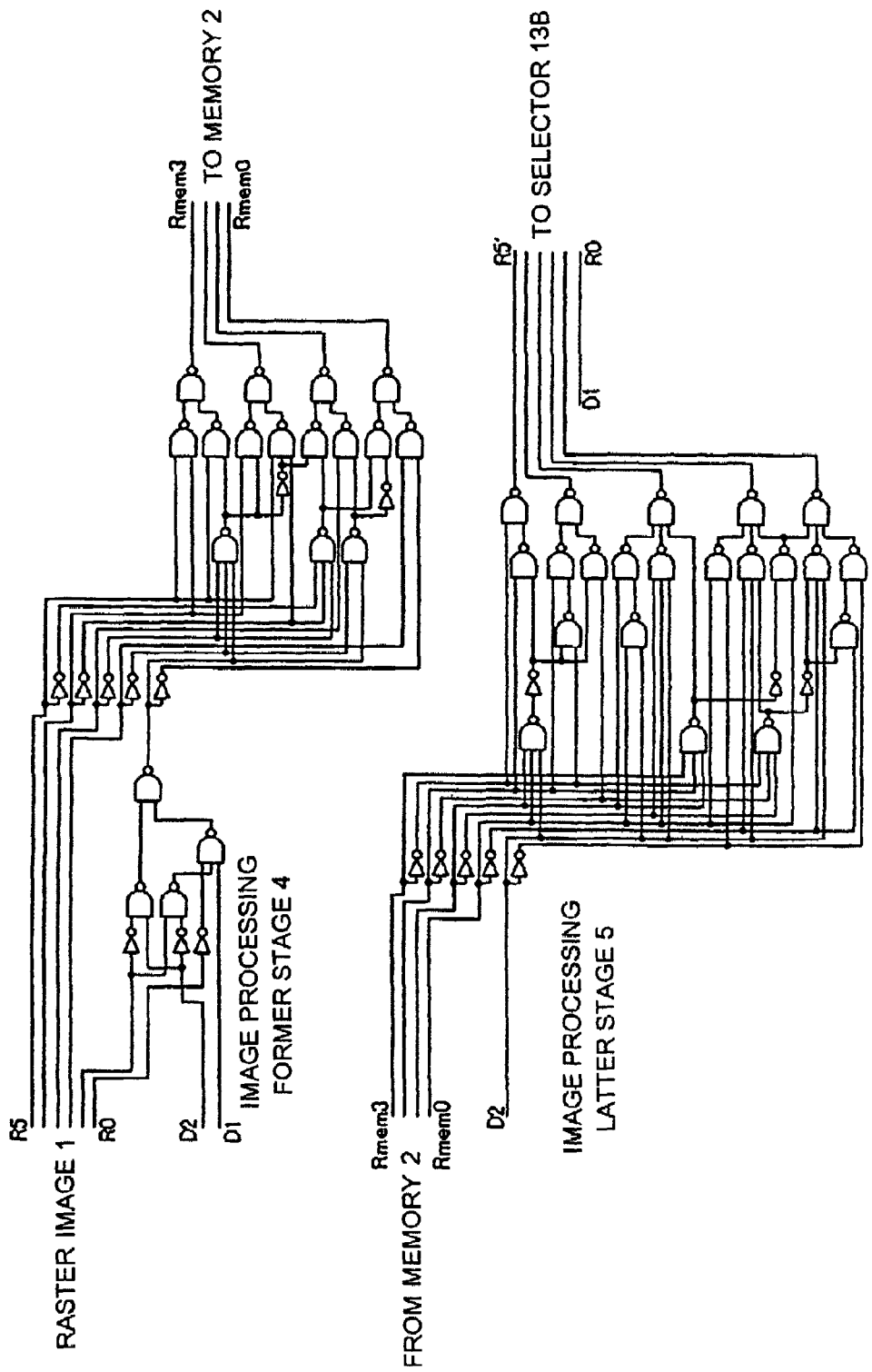
FIG. 47 is a diagram showing the logical configurations of the image processing former stage and the image processing latter stage in the LCD in FIG. 44.

FIG. 47 shows an example of the logical configurations of the image processing former stage 4 and the image processing latter stage 5 for storing a 6-bit signal in a 4-bit memory and expanding the signal to a 6-bit signal. In FIG. 47, the image processing former stage 4 and the image processing latter stage 5 include only 2-input/3-input NAND circuits and inverters. From this it is to be understood that the size of the image processing circuit is sufficiently smaller than the memory area, and the size of the circuit section can be reduced.

While the present invention has been described with reference to the particular illustrative embodiments, it is obvious to those skilled in the art that it is not so limited but is susceptible of various changes and modifications without departing from the spirit and scope of the present invention.

For example, in the above-described embodiments, multi-valued dither processing with the use of a two-dimensional dither matrix and bit addition processing based on the two-dimensional dither matrix are performed as a way of image processing. However, the present invention is not to be restricted by those embodiments but it will suffice so long as aforementioned pseudo outlines, pseudo colors and a grainy feeling can be suppressed.

Besides, in the above-described embodiments, multi-valued dither processing is performed with the use of a two-dimensional dither matrix when reducing the bit-plane number of a raster image, and bit addition processing is performed based on the two-dimensional dither matrix used for the multi-valued dither processing when increasing the bit-plane number. However, other image processing methods by which image processing is performed in reverse ways when increasing and reducing the bit-plane number may be applicable, as for example by using a random dither instead of a two-dimensional dither matrix to perform multi-valued dither processing.

Additionally, in the second embodiment, a description has been given of the construction in the case where image processing is performed by software. Image processing may be performed through software in the image processing apparatus and the image transmission apparatus according to the other embodiments as in the second embodiment.

As just described, the present invention is susceptible of various changes and modifications.

INDUSTRIAL APPLICABILITY

As set forth hereinabove, in accordance with the present invention, a bit-mapped image to be sent to a display unit can be compressed/decompressed with fewer logic elements, thereby enabling reductions in memory capacity and transmission capacity.

Moreover, in accordance with the present invention, the difference between an image which has undergone bit addition processing and an original image is small as compared to multi-valued dithering. Thus, it is possible to suppress a grainy feeling and pseudo colors, which are observed when there is a significant difference, and high quality display can be realized.

Further, in accordance with the present invention, for example, a compressed image is selected when a still image is being displayed, while when a moving picture is being displayed, the image is directly displayed without image processing. Since an image can be displayed without the intervention of a storage (e.g. memory) when displaying a moving picture, electric power consumption can be reduced by stopping the operation of the storage.

Further, in accordance with the present invention, in the case of superimpose display, a natural image is compressed/decompressed by 1 bit, and the obtained capacity of 1 bit is used for text information. Consequently, superimposing can be performed without any increase in memory capacity.

Still further, in the case of displaying an image which exceeds the maximum resolution of a display unit, such as a map, the image can be stored with insufficient memory capacity by compression/decompression of the bit-plane number. Thereby, it is possible to scroll through the image on the display without reacquisition of the image from outside, which reduces electric power consumption associated with image display.

Still further, in accordance with the present invention, it is possible to realize an image transmission apparatus and an image processing method for improving the efficiency of transmission capacity. For example, in the case of transmitting an RGB raster image with 6 bits per color component (18 bits in total) via a transmission bus which is only 16 bits wide, the raster image is compressed by reducing the bit-plane number. Thus, data can be transmitted in parallel.

Still further, in accordance with the present invention, it is possible to realize an image reception apparatus for improving the capacity of a transmission bus for receiving images.

In other words, it is possible to reduce the number of transmission buses for receiving images and improve the efficiency of transmission since the image reception apparatus receives an image whose bit-plane number has been reduced to the number less than that of an original image. Besides, an image comparable in quality to the original image can be produced by increasing the bit-plane number of the received image.

Furthermore, in accordance with the present invention, in a display unit in which a drive circuit is formed on a substrate (e.g. glass substrate), the image processing apparatus can be formed on the substrate by the same process. Therefore, by the application of the present invention to a display unit, the size of the display unit can be reduced due to less memory, and also electric power consumption can be reduced.

The invention claimed is:

1. An image processing apparatus that reduces the bit-plane number of a raster image, which is an original image, and after that, increases the reduced bit-plane number of the raster image to the number equal to or less than the bit-plane number of the original image, comprising:
    a first image processing means for performing multi-valued dither processing with the use of a two-dimensional dither matrix when reducing the bit-plane number of the raster image; and
    a second image processing means for performing bit addition processing based on the two-dimensional dither matrix used by the first image processing means and the gray level of the raster image whose bit-plane number has been reduced when increasing the reduced bit-plane number of the raster image.

2. An image processing apparatus that reduces the bit-plane number of a raster image, which is an original image, and after that, increases the reduced bit-plane number of the raster image to the number equal to or less than the bit-plane number of the original image, comprising:
    a first image processing means for performing multi-valued dither processing with the use of a two-dimensional dither matrix when reducing the bit-plane number of the raster image; and
    a second image processing means for performing frame rate control processing to periodically change tones based on the two-dimensional dither matrix used by the first image processing means when increasing the reduced bit-plane number of the raster image.

3. An image processing apparatus that reduces the bit-plane number of a raster image, which is an original image, and after that, increases the reduced bit-plane number of the raster image to the number equal to or less than the bit-plane number of the original image, comprising:
    a first image processing means for performing multi-valued dither processing with the use of a two-dimensional dither matrix when reducing the bit-plane number of the raster image; and
    a second image processing means for performing bit addition processing based on the two-dimensional dither matrix used by the first image processing means when increasing the reduced bit-plane number of the raster image, and adding an offset value in order that the difference between the signal value of the original image and the average of all the dither values of the raster image whose bit-plane number has been increased will be the minimum.

4. The image processing apparatus claimed in claim 1, wherein the raster image whose bit-plane number has been reduced is transmitted via a transmission bus having a bus width less than the bit-plane number of the original image.

5. The image processing apparatus claimed in claim 1, further comprising:
    a storage for storing data of the raster image whose bit-plane number has been reduced by the first image processing means,
    wherein the second image processing means reads out the data of the raster image stored in the storage to increase the bit-plane number.

6. An image processing apparatus that reduces the bit-plane number of a first raster image, which is an original image, and after that, produces a second raster image by increasing the reduced bit-plane number of the raster image to the number equal to or less than the bit-plane number of the original image, comprising:
    a first image processing means for performing multi-valued dither processing with the use of a two-dimensional dither matrix when reducing the bit-plane number of the first raster image;
    a second image processing means for performing bit addition processing based on the two-dimensional dither matrix used by the first image processing means when increasing the reduced bit-plane number of the raster image; and
    a selecting means for selecting either the first raster image or the second raster image, and outputting the selected image,
    wherein by the selecting means, the second raster image is selected when the original image comprises a still image, and the first raster image is selected when the original image comprises a moving image.

7. An image processing apparatus that reduces the bit-plane number of a first raster image, which is an original image, and after that, produces a second raster image by increasing the reduced bit-plane number of the raster image to the number equal to or less than the bit-plane number of the original image, comprising:
    a first image processing means for performing multi-valued dither processing with the use of a two-dimensional dither matrix when reducing the bit-plane number of the raster image;
    a second image processing means for performing bit addition processing based on the two-dimensional dither matrix used by the first image processing means when increasing the reduced bit-plane number of the raster image, and adding an offset value in order that the difference between the signal value of the original image and the average of all the dither values of the raster image whose bit-plane number has been increased will be the minimum; and
    a selecting means for selecting either the first raster image or the second raster image, and outputting the selected image.

8. An image processing apparatus that compresses data of a first raster image, which is an original image, and after that, produces a second raster image by decompressing data of the raster image, comprising:
    a first image processing means for compressing the data of the first raster image;
    a second image processing means for decompressing the data compressed by the first image processing means to produce the second raster image; and a selecting means for selecting either the first raster image or the second raster image, and outputting the selected image, wherein by the selecting means, the second raster image is selected when the original image comprises a still image, and the first raster image is selected when the original image comprises a moving image.

9. The image processing apparatus claimed in claim 6, further comprising:

a storage for storing data of the raster image obtained by the first image processing means, wherein the second image processing means reads out the data of the compressed raster image stored in the storage to carry out the image processing.

10. The image processing apparatus claimed in claim 1, wherein the first and second image processing means perform the image processing in a manner such that the maximum value and minimum value of components of the raster image after the image processing are the same as before.

11. An image processing apparatus in which input image data is stored in a storage, and an image is displayed on a prescribed display based on the image data read out of the storage, comprising:

a first image processing means for compressing a first raster image, which is an original image, to produce a compressed raster image;

a means for storing the compressed raster image in the storage;

a second image processing means for reading out the compressed raster image stored in the storage, and decompressing the compressed raster image to produce a second raster image; and a means for outputting the second raster image to the display, wherein the compressed raster image is produced when the amount of data of the first raster image exceeds the capacity of the storage and the resolution of the first raster image is greater than a prescribed resolution.

12. An image processing apparatus in which data for displaying an input image is stored in a storage, and an image is displayed on a prescribed display based on the data read out of the storage, comprising:

a first image processing means for compressing at least one layer of a signal for displaying a first raster image, which has been divided into two or more layers when input, to produce a compressed layer;

a means for storing the compressed layer and uncompressed layer of the first raster image in the storage;

a second image processing means for reading out the compressed layer stored in the storage to decompress the compressed layer, and combining the decompressed layer with the uncompressed layer of the first raster image read out of the storage to generate a signal for displaying a second raster image; and a means for outputting the signal for displaying the second raster image to the display, wherein the compressed layer is produced when the amount of data of the signal for displaying the first raster image exceeds the capacity of the storage.

13. The image processing apparatus claimed in claim 11, wherein the first and second image processing means perform the image processing in a manner such that the maximum value and minimum value of components of the second raster image match those of the first raster image.

14. An image processing apparatus in which input image data is stored in a storage, and an image is displayed on a prescribed display based on the image data read out of the storage, comprising:

a first image processing means for compressing a first raster image, which is an original image, to produce a compressed raster image;

a means for storing the compressed raster image in the storage;

a second image processing means for reading the compressed raster image out of the storage, and decompressing the compressed raster image to produce a second raster image; and a means for outputting the second raster image to the display, wherein the compressed raster image is produced when the first raster image, which is an original image, is larger than the largest image that the display can display.

15. The image processing apparatus claimed in claim 11, further comprising a selecting means for determining whether to store the first raster image in the storage without compression or to store the raster image in the storage after compressing it by the first image processing means when the amount of data of the first raster image is within the capacity of the storage.

16. The image processing apparatus claimed in claim 11, further comprising:

a means for outputting the first raster image to the display without the intervention of the first image processing means, the storage and the second image processing means; and a selecting means for selecting either the first raster image or the second raster image to output the selected image, wherein by the selecting means, the second raster image is selected when the original image comprises a still image, and the first raster image is selected when the original image comprises a moving image.

17. The image processing apparatus claimed in claim 16, further comprising a means for stopping the operation of the first image processing means, the storage and the second image processing means when outputting the first raster image to the display.

18. The image processing apparatus claimed in claim 1, wherein the second image processing means is formed on the substrate where the drive circuit of the display is formed.

19. The image processing apparatus claimed in claim 1, wherein the first image processing means is formed on the substrate where the drive circuit of the display is formed.

20. An image transmission apparatus, comprising:

a first unit for transmitting a raster image being an original image; to a second unit; and a second unit for receiving said raster image, wherein the first unit performs multi-valued dither processing with the use of a two-dimensional dither matrix for the raster image, which is an original image, and transmits the raster image whose bit-plane number has been reduced to the second unit, and wherein the second unit performs bit addition processing based on the two-dimensional dither matrix used for the multi-valued dither processing and the gray level of the raster image whose bit-plane number has been reduced such that the bit-plane number of the raster image transmitted from the first unit matches the bit-plane number of the original image.

21. An image transmission apparatus, comprising:
a first unit for transmitting a raster image being an original image; to a second unit; and a second unit for receiving said raster image, wherein the first unit performs multi-valued dither processing with the use of a two-dimensional dither matrix for the raster image, which is an original image, and transmits the raster image whose bit-plane number has been reduced to the second unit; and wherein the second unit performs bit addition processing based on the two-dimensional dither matrix used for the multi-valued dither processing so that the bit-plane number of the raster image transmitted from the first unit matches the bit-plane number of the original image, and adding an offset value in order that the difference between the signal value of the original image and the average of all the dither values of the raster image whose bit-plane number has been increased will be the minimum.

22. The image transmission apparatus claimed in claim 20, wherein the first and second units perform the processing in a manner such that the maximum value and minimum value of components of the raster image after the processing are the same as before.

23. An image reception apparatus, comprising:

a unit which receives a raster image whose bit-plane number has been reduced to less than that of a raster image being an original image by multi-valued dither processing with the use of a two-dimensional dither matrix, and performs bit addition processing based on the two-dimensional dither matrix used for the multi-valued dither processing and the gray level of the raster image whose bit-plane number has been reduced when increasing the reduced bit-plane number of the raster image such that the reduced bit-plane number of the raster image matches the bit-plane number of the original image.

24. An image reception apparatus which receives a raster image whose bit-plane number has been reduced to less than that of a raster image being an original image by multi-valued dither processing with the use of a two-dimensional dither matrix, performs bit addition processing based on the two-dimensional dither matrix used for the multi-valued dither processing so that the reduced bit-plane number of the raster image matches the bit-plane number of the original image, and adds an offset value in order that the difference between the signal value of the original image and the average of all the dither values of the raster image whose bit-plane number has been increased will be the minimum.

25. The image reception apparatus claimed in claim 23, wherein the processing is performed in a manner such that the maximum value and minimum value of components of the raster image after the processing are the same as before.

26. An image processing method for reducing the bit-plane number of a raster image, which is an original image, and after that, increasing the reduced bit-plane number of the raster image to the number equal to or less than the bit-plane number of the original image, comprising:

a first image processing for performing multi-valued dither processing with the use of a two-dimensional dither matrix when reducing the bit-plane number of the raster image; and a second image processing for performing bit addition processing based on the two-dimensional dither matrix used during the first image processing and the gray level of the raster image whose bit-plane number has been reduced when increasing the bit-plane number of the raster image which has undergone the first image processing.

27. An image processing method for reducing the bit-plane number of a raster image, which is an original image, and after that, increasing the reduced bit-plane number of the raster image to the number equal to or less than the bit-plane number of the original image, comprising:

a first image processing for performing multi-valued dither processing with the use of a two-dimensional dither matrix when reducing the bit-plane number of the raster image; and a second image processing for performing frame rate control to periodically change tones based on the two-dimensional dither matrix used during the first image processing when increasing the bit-plane number of the raster image which has undergone the first image processing.

28. An image processing method for reducing the bit-plane number of a raster image, which is an original image, and after that, increasing the reduced bit-plane number of the raster image to the number equal to or less than the bit-plane number of the original image, comprising:

a first image processing for performing multi-valued dither processing with the use of a two-dimensional dither matrix when reducing the bit-plane number of the raster image; and a second image processing for performing bit addition processing based on the two-dimensional dither matrix used during the first image processing when increasing the bit-plane number of the raster image which has undergone the first image processing, and adding an offset value in order that the difference between the signal value of the original image and the average of all the dither values of the raster image whose bit-plane number has been increased will be the minimum.

29. The image processing method claimed in claim 26, wherein the raster image whose bit-plane number has been reduced is transmitted via a transmission bus having a bus width less than the bit-plane number of the original image.

30. The image processing method claimed in claim 26, further comprising:

storing the first raster image whose bit-plane number has been reduced at the first image processing in a storage after the first image processing, wherein the raster image stored in the storage is read out to increase its bit-plane number at the second image processing.

31. An image processing method for reducing the bit-plane number of a first raster image, which is an original image, and after that, producing a second raster image by increasing the reduced bit-plane number of the raster image to the number equal to or less than the bit-plane number of the original image, comprising:

selecting either the first raster image or the second raster image to output the selected image;

a first image processing for performing multi-valued dither processing with the use of a two-dimensional dither matrix when reducing the bit-plane number of the first raster image;

a second image processing for performing bit addition processing based on the two-dimensional dither matrix used during the first image processing when increasing the bit-plane number of the raster image which has undergone the first image processing; and outputting either the first raster image or the second raster image selected at the selecting, wherein in said selecting said first or second raster image, the second raster image is selected when the original image comprises a still image, and the first raster image is selected when the original image comprises a moving image.

32. An image processing method for reducing the bit-plane number of a first raster image, which is an original image, and after that, producing a second raster image by increasing the reduced bit-plane number of the raster image to the number equal to or less than the bit-plane number of the original image, comprising:

selecting either the first raster image or the second raster image to output the selected image;

a first image processing for performing multi-valued dither processing with the use of a two-dimensional dither matrix when reducing the bit-plane number of the first raster image;

a second image processing for performing bit addition processing based on the two-dimensional dither matrix used during the first image processing when increasing the bit-plane number of the raster image which has undergone the first image processing, and adding an offset value in order that the difference between the signal value of the original image and the average of all the dither values of the raster image whose bit-plane number has been increased will be the minimum; and outputting either the first raster image or the second raster image selected at the selecting.

33. An image processing method for compressing data of a first raster image, which is an original image, and after that, producing a second raster image by decompressing the compressed data of the raster image, comprising:

selecting either the first raster image or the second raster image to output the selected image;

a first image processing for compressing the first raster image;

a second image processing for decompressing the data compressed at the first image processing to produce the second raster image; and outputting either the first raster image or the second raster image selected at the selecting, wherein in said selecting said first or second raster image, the second raster image is selected when the original image comprises a still image, and the first raster image is selected when the original image comprises a moving image.

34. The image processing method claimed in claim 31, further comprising:

after the first image processing, storing data of the raster image obtained at the first image processing in a storage, wherein the data of the raster image stored in the storage is read out to carry out the image processing at the second image processing.

35. The image processing method claimed in claim 34, further comprising compressing the data of the raster image obtained at the first image processing into equal to or less than the capacity of the storage when the amount of the data of the raster image obtained at the first image processing exceeds the capacity of the storage before the storing.

36. The image processing method claimed in claim 32, wherein the second raster image is selected when the original image comprises a still image, and the first raster image is selected when the original image comprises a moving image.

37. The image processing method claimed in claim 31, further comprising after the selecting, stopping the image processing of the first image processing and the second image processing when the first raster image is selected at the selecting.

38. An image processing method by which data for displaying an input image is stored in a storage, and the image is displayed on a prescribed display based on the data read out of the storage, comprising:

a first image processing for compressing at least one layer of a first raster image to produce a compressed layer when the amount of data of a signal for displaying the first raster image, which has been divided into two or more layers when input, exceeds the capacity of the storage;

storing the compressed layer and uncompressed layer of the first raster image in the storage;

a second image processing for reading out the compressed layer stored in the storage to decompress the compressed layer, and combining the decompressed layer with the uncompressed layer of the first raster image read out of the storage to generate a signal for displaying a second raster image; and outputting the signal for displaying the second raster image to the display.

39. The image processing method claimed in claim 38, further comprising:

before the first image processing, determining whether to store the signal in the storage without compression or to store the signal in the storage after compressing at least one layer when the amount of data of a signal for displaying the first raster image is within the capacity of the storage, wherein in the case where it has been determined at the selecting that at least one layer is to be compressed, the image processing is also carried out for the first raster image with the amount of data within the capacity of the storage at the first image processing.

40. The image processing method claimed in claim 38, further comprising an output switching for selecting either a signal for displaying the first raster image or a signal for displaying the second raster image on the display to output the selected signal at the beginning.

41. The image processing method claimed in claim 40, further comprising after the output switching, stopping the image processing of the first image processing and the second image processing step when the first raster image is selected at the output switching.

42. The image processing method claimed in claim 31, wherein the image processing is performed so that the maximum value and minimum value of components of the second raster image match those of the first raster image at the first image processing and second image processing.

43. An image processing method by which input image data is stored in a storage, and an image is displayed on a prescribed display based on the image data read out of the storage, comprising:

a first image processing for compressing a first raster image, which is an original image, to produce a compressed raster image when the amount of data of the first raster image exceeds the capacity of the storage and the resolution of the first raster image is greater than a prescribed resolution;

storing the compressed raster image in the storage;

a second image processing for reading out the compressed raster image stored in the storage, and decompressing the compressed raster image to produce a second raster image; and outputting the second raster image to the display.

44. The image processing method claimed in claim 43, further comprising:

before the first image processing, determining whether to store the first raster image in the storage without compression or to store the raster image after compressing it when the amount of data of the first raster image is within the capacity of the storage, wherein in the case where it has been determined at the determining that the first raster image is to be compressed, the image processing is also carried out for the first raster image with the amount of data within the capacity of the storage at the first image processing.

45. An image processing method by which input image data is stored in a storage, and an image is displayed on a prescribed display based on the image data read out of the storage, comprising:

a first image processing for compressing a first raster image, which is an original image, to produce a compressed raster image when the first raster image is larger than the largest image that the display can display;

storing the compressed raster image in the storage;

a second image processing for reading the compressed raster image out of the storage, and decompressing the compressed raster image to produce a second raster image; and outputting the second raster image to the display.

46. The image processing method claimed in claim 45, further comprising:

before the first image processing, determining whether to store the first raster image in the storage without compression or to store the raster image after compressing it when the first raster image is equal to or smaller than the largest image that the display can display, wherein in the case where it has been determined at the determining that the first raster image is to be compressed, the image processing is also carried out for the first raster image which is equal to or smaller than the largest image that the display can display at the first image processing.

47. The image processing method claimed in claim 43, further comprising an output switching for selecting either the first raster image or the second raster image to output the selected image to the display at the beginning.

48. The image processing method claimed in claim 47, further comprising after the output switching, stopping the image processing of the first image processing and the second image processing when the first raster image is selected at the output switching.

49. An image processing method applied to an image transmission apparatus in which a raster image being an original image is transmitted from a first unit to a second unit, comprising:

a first image processing for performing multi-valued dither processing by the first unit with the use of a two-dimensional dither matrix for the raster image, which is an original image;

transmitting the raster image whose bit-plane number has been reduced at the first image processing to the second unit; and a second image processing for performing bit addition processing by the second unit based on the two-dimensional dither matrix used for the multi-valued dither processing and the gray level of the raster image whose bit-plane number has been reduced when increasing the reduced bit-plane number of the raster image such that the bit-plane number of the raster image transmitted from the first unit matches the bit-plane number of the original image.

50. The image processing apparatus claimed in claim 1, wherein said first image processing means comprises a threshold value generator for generating a threshold value based on pixel coordinate values.

51. The image processing apparatus claimed in claim 50, wherein said first image processing means reduces the bit-plane number of the raster image by subtracting said threshold value from an input gray level signal comprising the gray level of the raster image and truncating low order bits.

* * * * *